US012278682B2

(12) United States Patent
Zhou et al.

(10) Patent No.: US 12,278,682 B2
(45) Date of Patent: Apr. 15, 2025

(54) SPATIAL MODULATION SYSTEM AND METHOD THEREOF

(71) Applicant: Agency for Science, Technology and Research, Singapore (SG)

(72) Inventors: Yijun Zhou, Singapore (SG); Yan Wah Michael Chia, Singapore (SG); Xianming Qing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 50 days.

(21) Appl. No.: 18/284,022

(22) PCT Filed: Mar. 28, 2022

(86) PCT No.: PCT/SG2022/050170
§ 371 (c)(1),
(2) Date: Sep. 25, 2023

(87) PCT Pub. No.: WO2022/203611
PCT Pub. Date: Sep. 22, 2022

(65) Prior Publication Data
US 2024/0162964 A1 May 16, 2024

(30) Foreign Application Priority Data
Mar. 26, 2021 (SG) .......................... 10202103162Q

(51) Int. Cl.
*H04B 7/06* (2006.01)
*H04B 7/0426* (2017.01)

(52) U.S. Cl.
CPC ......... *H04B 7/0691* (2013.01); *H04B 7/0426* (2013.01)

(58) Field of Classification Search
CPC .. H04B 7/0602; H04B 7/0608; H04B 7/0686; H04B 7/0691; H04B 7/0447;
(Continued)

(56) References Cited
U.S. PATENT DOCUMENTS 6,317,084 B1 * 11/2001 Chen ..................... H01Q 1/38
343/700 MS
6,404,404 B1 * 6/2002 Chen ..................... H01Q 23/00
381/92
(Continued)

FOREIGN PATENT DOCUMENTS

CN 112039565 A 12/2020

OTHER PUBLICATIONS

International Search Report for International Application No. PCT/SG2022/050170 dated May 26, 2022, pp. 1-4.
(Continued)

*Primary Examiner* — James M Perez
(74) *Attorney, Agent, or Firm* — Shackelford, McKinley & Norton, LLP

(57) ABSTRACT

A method of spatial modulation using an antenna array including radiating elements having power amplifiers communicatively coupled thereto. An amplitude of an output signal to be formed in space is determined by the antenna array based on an input signal. Output amplitude levels for the radiating elements are determined based on the amplitude of the output signal and a current output amplitude level of the antenna array. The first signal(s) for a first subarray of the antenna array and the second signal(s) for a second subarray of the antenna array are generated based on the input signal. The output amplitude levels are assigned to the power amplifiers of the radiating elements. The first signal(s) are sent to radiating elements of the first subarray and the second signal(s) are sent to radiating elements of the second subarray for transmission therefrom to form a combined signal in space as the output signal.

20 Claims, 36 Drawing Sheets

(58) Field of Classification Search
CPC ............... H04B 7/0634; H04B 7/0695; H04B 7/06952; H04B 7/06956; H04B 7/0413; H04B 7/0426; H04B 7/0434
See application file for complete search history.

(56) References Cited

U.S. PATENT DOCUMENTS

| | | | | |
|---|---|---|---|---|
| 6,693,599 | B1* | 2/2004 | Chia | G06K 19/0701 343/866 |
| 6,760,603 | B1* | 7/2004 | Scherzer | H04B 7/0408 343/893 |
| 6,914,563 | B2* | 7/2005 | Chen | H01Q 13/10 343/700 MS |
| 8,299,851 | B2* | 10/2012 | Zhou | H03F 3/24 330/10 |
| 8,396,153 | B1* | 3/2013 | Shen | H04L 1/0625 370/464 |
| 8,995,926 | B2* | 3/2015 | Mow | H04B 17/345 455/67.14 |
| 9,160,434 | B2 | 10/2015 | Garrett | H04B 7/0623 |
| 9,503,258 | B2* | 11/2016 | Ashrafi | H04J 14/06 |
| 9,595,766 | B2* | 3/2017 | Ashrafi | H01Q 15/0033 |
| 9,645,083 | B2* | 5/2017 | Ashrafi | G01N 33/4833 |
| 9,866,308 | B1 | 1/2018 | Bultan | G01S 3/74 |
| 9,912,040 | B2* | 3/2018 | Irci | H01Q 1/243 |
| 9,973,943 | B2* | 5/2018 | Lysejko | H01Q 3/02 |
| 10,070,325 | B2* | 9/2018 | Logothetis | H04W 16/28 |
| 10,425,140 | B2* | 9/2019 | Kim | H04B 7/0691 |
| 10,756,796 | B2* | 8/2020 | Ferrante | H04B 7/0626 |
| 10,756,936 | B2* | 8/2020 | Kato | H04L 27/0008 |
| 10,962,672 | B2* | 3/2021 | Chia | G01V 3/30 |
| 11,012,132 | B2* | 5/2021 | Hwang | H04L 25/0204 |
| 11,108,444 | B2* | 8/2021 | Varatharaajan | H04B 7/0634 |
| 11,133,854 | B1* | 9/2021 | Pratt | H04B 7/0639 |
| 11,163,116 | B2* | 11/2021 | Lopez | G02B 6/12004 |
| 11,177,990 | B1* | 11/2021 | Gil | H01Q 21/20 |
| 11,204,452 | B2* | 12/2021 | Paniagua Dominguez | G02B 5/1809 |
| 11,258,186 | B2* | 2/2022 | Kim | H01Q 9/0414 |
| 11,258,187 | B2* | 2/2022 | Tehran | H01Q 9/0407 |
| 11,296,428 | B2* | 4/2022 | Moon | H01Q 9/0407 |
| 11,451,270 | B2* | 9/2022 | Abu-Surra | H04B 7/0413 |
| 11,514,726 | B2* | 11/2022 | He | G07B 15/00 |
| 11,569,575 | B2* | 1/2023 | Klemmer | H04B 7/0617 |
| 11,664,601 | B2* | 5/2023 | Irci | H01Q 1/243 343/770 |
| 11,762,051 | B2* | 9/2023 | Moon | H04B 7/0695 342/359 |
| 11,799,213 | B2* | 10/2023 | Moon | H04B 7/0691 |
| 11,894,889 | B2* | 2/2024 | Zhang | H04B 7/0695 |
| 11,984,659 | B2* | 5/2024 | Zhang | H01Q 21/29 |
| 11,984,961 | B2* | 5/2024 | Zhu | H04B 7/0617 |
| 12,082,111 | B2* | 9/2024 | Horn | H04B 7/0691 |
| 2003/0076274 | A1* | 4/2003 | Phelan | H01Q 3/26 343/895 |
| 2004/0066338 | A1* | 4/2004 | Chen | H01Q 13/10 343/700 MS |
| 2005/0192058 | A1* | 9/2005 | Jung | H04W 16/28 455/562.1 |
| 2009/0211079 | A1* | 8/2009 | Toso | H01P 11/00 29/600 |
| 2010/0026439 | A1* | 2/2010 | Qing | H01Q 21/28 336/200 |
| 2010/0119090 | A1* | 5/2010 | Graber | H04R 1/44 381/190 |
| 2012/0275426 | A1* | 11/2012 | Suzuki | H04B 7/0617 370/329 |
| 2012/0281783 | A1* | 11/2012 | Cheng | H04B 7/0456 375/295 |
| 2012/0299765 | A1* | 11/2012 | Huang | H01Q 21/20 342/81 |
| 2012/0314570 | A1* | 12/2012 | Forenza | H04W 72/541 370/252 |
| 2013/0109448 | A1* | 5/2013 | Garrett | H04B 7/0695 455/575.7 |
| 2013/0142136 | A1* | 6/2013 | Pi | H04B 7/15507 370/329 |
| 2013/0237272 | A1* | 9/2013 | Prasad | H04B 7/0617 342/372 |
| 2013/0301454 | A1* | 11/2013 | Seol | H04B 7/0695 370/252 |
| 2014/0087668 | A1* | 3/2014 | Mow | H04W 24/08 455/67.14 |
| 2015/0311579 | A1* | 10/2015 | Irci | H01Q 13/10 343/702 |
| 2015/0357709 | A1* | 12/2015 | Kim | H01Q 21/065 342/371 |
| 2016/0254897 | A1* | 9/2016 | Berretta | H04L 5/02 375/267 |
| 2016/0285481 | A1* | 9/2016 | Cohen | H03F 1/02 |
| 2016/0285530 | A1* | 9/2016 | Panah | H04B 7/0452 |
| 2016/0315680 | A1* | 10/2016 | Braun | H04B 7/0695 |
| 2016/0372836 | A1* | 12/2016 | Ashrafi | H01Q 15/16 |
| 2016/0380363 | A1* | 12/2016 | Logothetis | H04W 72/23 343/853 |
| 2016/0381591 | A1* | 12/2016 | Lysejko | H01Q 21/00 370/252 |
| 2017/0062910 | A1* | 3/2017 | Iida | H04B 5/72 |
| 2017/0117626 | A1* | 4/2017 | Sajuyigbe | H01Q 1/523 |
| 2017/0126459 | A1* | 5/2017 | Dutronc | H04L 27/2659 |
| 2017/0343750 | A1* | 11/2017 | Ashrafi | H04J 14/07 |
| 2018/0088210 | A1* | 3/2018 | Garrec | H03C 3/08 |
| 2019/0041540 | A1* | 2/2019 | Chia | E21B 17/003 |
| 2019/0257986 | A1* | 8/2019 | Paniagua Dominguez | G02B 5/1847 |
| 2020/0052755 | A1* | 2/2020 | Hwang | H04B 7/0695 |
| 2020/0099555 | A1* | 3/2020 | Kato | H04L 27/3488 |
| 2020/0119785 | A1* | 4/2020 | Varatharaajan | H04B 7/0617 |
| 2020/0145069 | A1* | 5/2020 | Ferrante | H04B 7/0608 |
| 2020/0358205 | A1* | 11/2020 | Sun | H01Q 1/48 |
| 2020/0382198 | A1* | 12/2020 | Ashrafi | H04B 7/155 |
| 2020/0395664 | A1* | 12/2020 | Athley | H04B 7/0617 |
| 2020/0395680 | A1* | 12/2020 | Kim | H01Q 9/045 |
| 2020/0412018 | A1* | 12/2020 | Tehran | H01Q 9/0407 |
| 2021/0058131 | A1* | 2/2021 | Zhu | H04B 7/088 |
| 2021/0111781 | A1* | 4/2021 | Sasaki | H04B 10/516 |
| 2022/0029690 | A1* | 1/2022 | Alavi | H01Q 3/34 |
| 2022/0038142 | A1* | 2/2022 | Abu-Surra | H01Q 1/2283 |
| 2022/0078780 | A1* | 3/2022 | Choi | H04B 7/0456 |
| 2022/0092883 | A1* | 3/2022 | He | H04N 7/18 |
| 2022/0102867 | A1* | 3/2022 | Irci | H01Q 13/10 |
| 2022/0116872 | A1* | 4/2022 | Horn | H04B 7/0608 |
| 2022/0224380 | A1* | 7/2022 | Lee | H04B 7/0413 |
| 2022/0271806 | A1* | 8/2022 | Zhu | H04B 7/0456 |
| 2022/0320727 | A1* | 10/2022 | Molla Aghajanzadeh | H01Q 3/2694 |
| 2022/0416417 | A1* | 12/2022 | Zhang | H01Q 3/2605 |
| 2022/0416848 | A1* | 12/2022 | Zhang | H01Q 3/36 |
| 2023/0035971 | A1* | 2/2023 | Girnyk | G06N 3/08 |
| 2023/0171056 | A1* | 6/2023 | Huang | H04L 5/0048 370/328 |
| 2023/0217268 | A1* | 7/2023 | Ganesan | H04W 52/245 370/329 |
| 2023/0344506 | A1* | 10/2023 | Saab | H04B 7/0617 |
| 2023/0395994 | A1* | 12/2023 | Zhang | H01Q 21/205 |
| 2023/0421214 | A1* | 12/2023 | Mengnan | H04B 7/0469 |
| 2024/0014550 | A1* | 1/2024 | Zhang | H04B 7/0874 |
| 2024/0031007 | A1* | 1/2024 | Huang | H04B 7/0615 |
| 2024/0048192 | A1* | 2/2024 | Saab | H04B 7/0617 |
| 2024/0056145 | A1* | 2/2024 | Saab | H04B 7/0691 |
| 2024/0056834 | A1* | 2/2024 | Huang | H04W 64/003 |
| 2024/0088990 | A1* | 3/2024 | Zhang | H04W 4/08 |
| 2024/0162964 | A1* | 5/2024 | Zhou | H04B 7/0426 |
| 2024/0204833 | A1* | 6/2024 | Zhang | H04B 7/086 |
| 2024/0258701 | A1* | 8/2024 | Dave | H01Q 9/045 |
| 2024/0305018 | A1* | 9/2024 | Chin | H01Q 21/065 |
| 2024/0305355 | A1* | 9/2024 | Zhang | H04L 27/2601 |

(56) References Cited

U.S. PATENT DOCUMENTS

2024/0333349 A1* 10/2024 Ibrahim .............. H04B 7/0469
2024/0356600 A1* 10/2024 Zhang ................ H04B 7/0617

OTHER PUBLICATIONS

Zhou et al., "RF Spatial Modulation Using Antenna Arrays," IEEE Transactions on Antennas and Propagation, vol. 61, No. 10, Oct. 2013, pp. 5229-5236.
Written Opinion of the International Searching Authority for International Application No. PCT/SG2022/050170 dated May 26, 2022, pp. 1-6.

* cited by examiner

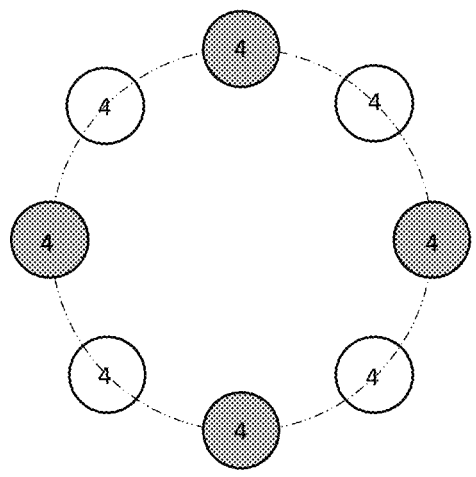
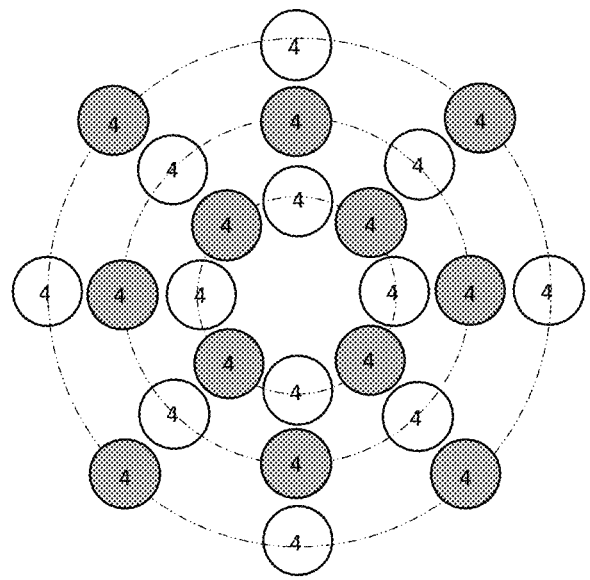
FIG. 14A                FIG. 14B
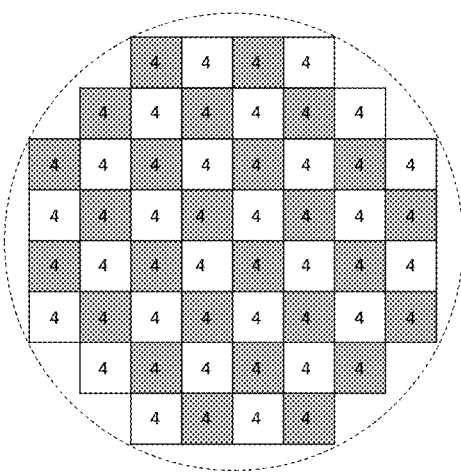
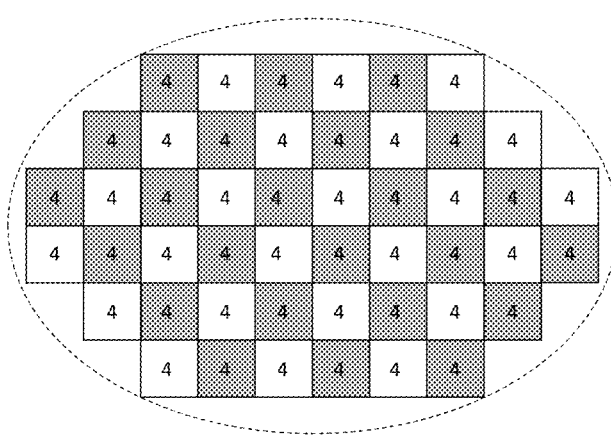
FIG. 14C                FIG. 14D

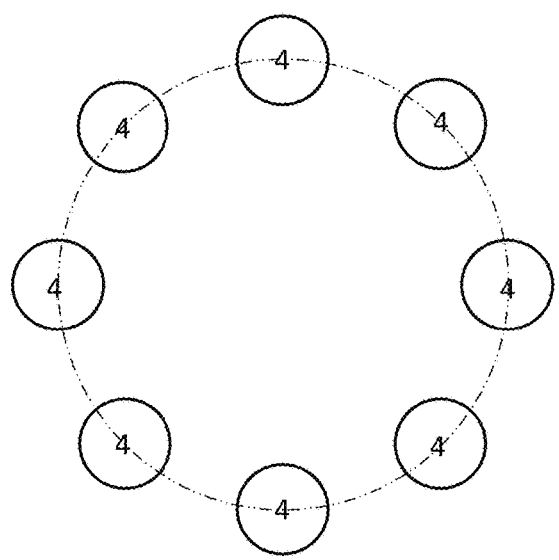
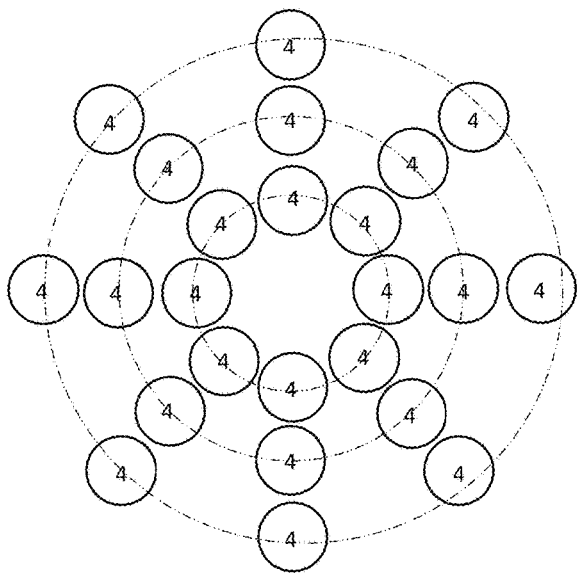
FIG. 24A  FIG. 24B
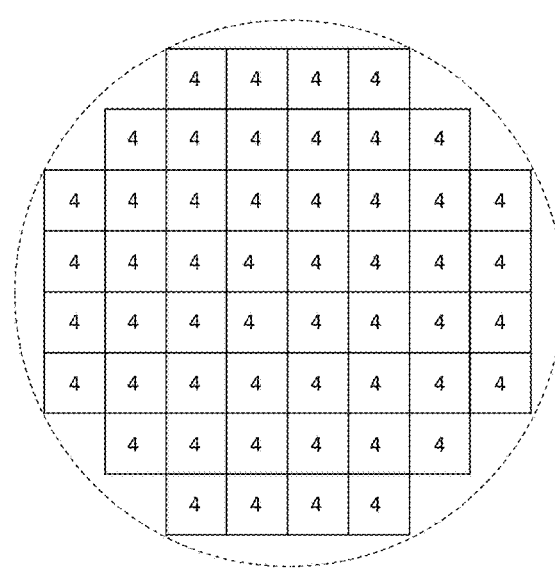
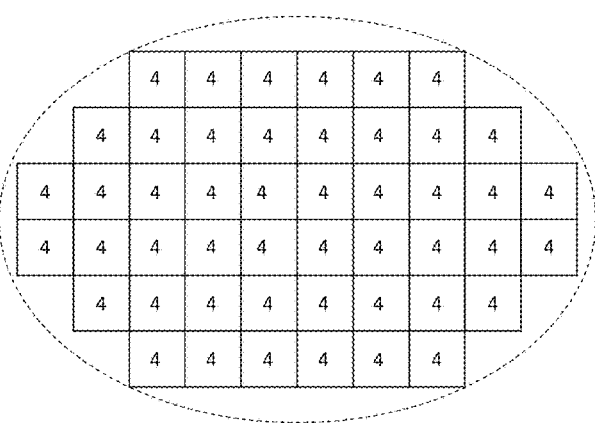
FIG. 24C  FIG. 24D

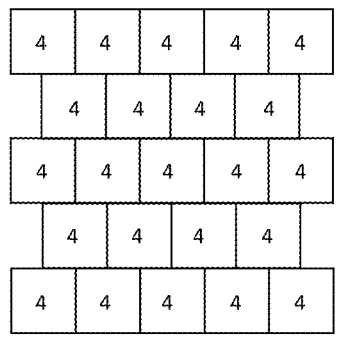
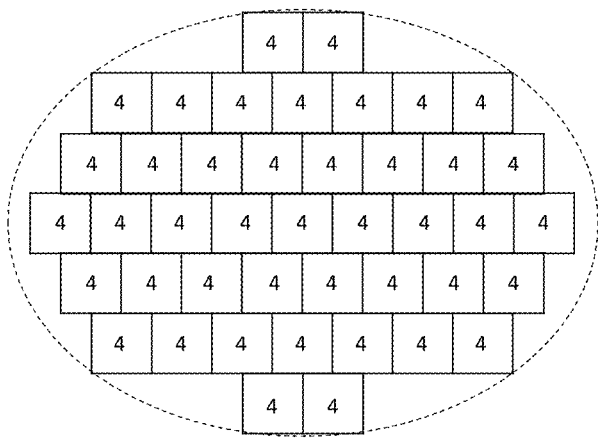
FIG. 24E              FIG. 24F
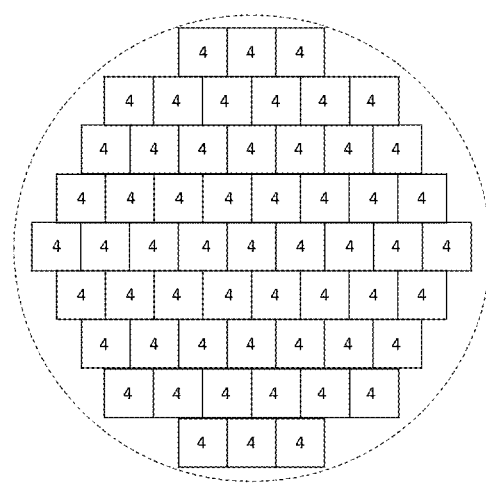
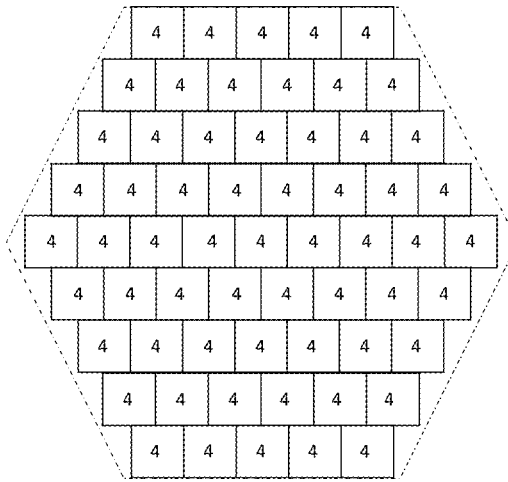
FIG. 24G              FIG. 24H

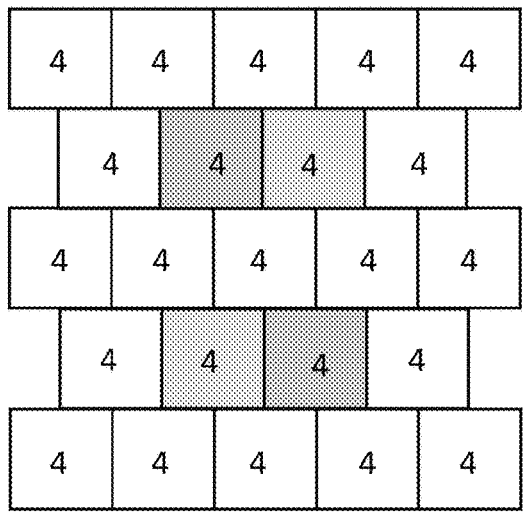
FIG. 35E
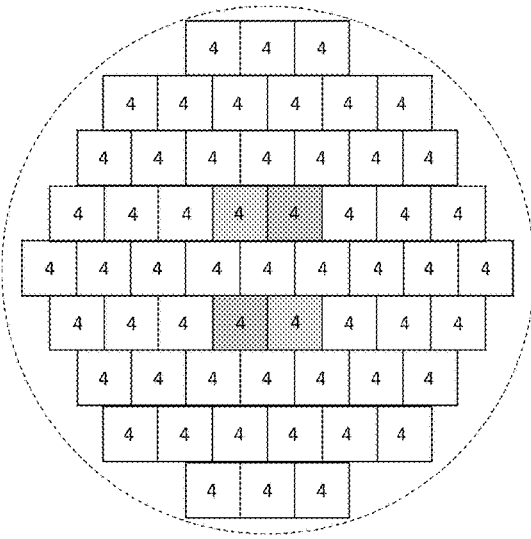
FIG. 35F
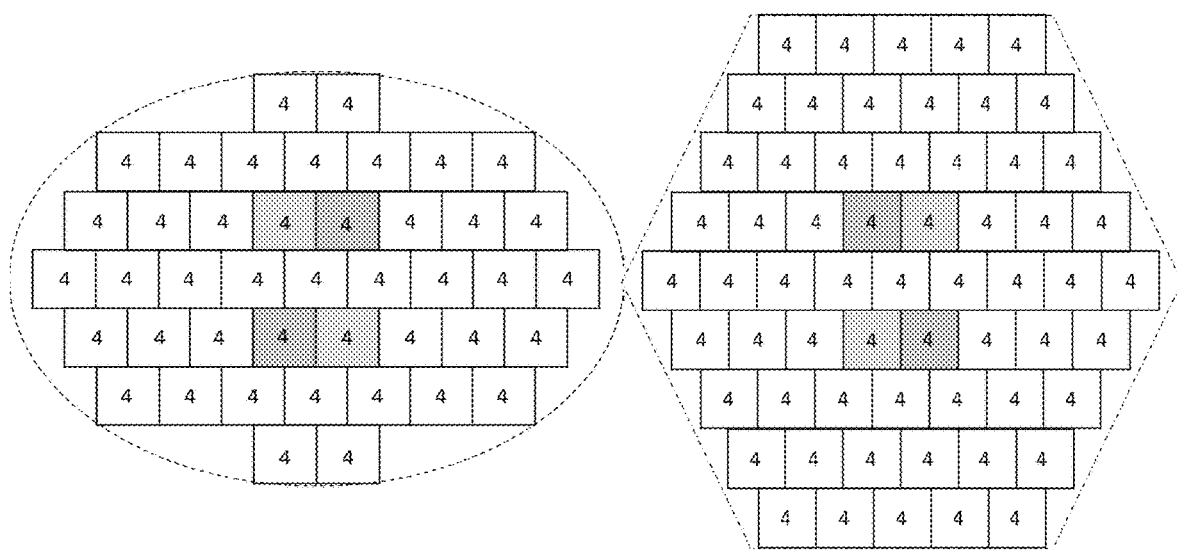
FIG. 35G
FIG. 35H

SPATIAL MODULATION SYSTEM AND METHOD THEREOF

This application claims the benefit of priority of Singapore Patent Application No. 10202103162Q, filed on 26 Mar. 2021, the content of which being hereby incorporated by reference in its entirety for all purposes.

TECHNICAL FIELD

The present invention generally relates to methods of spatial modulation and spatial modulation systems, and more particularly, relating to phased array spatial modulation.

BACKGROUND

Phased array technique is widely applied in radar, communication, sonar, audio and medical imaging applications. For example, linear modulation signals may be generated using a phased array technique and utilized in areas such as wireless communication, light communication, radar, radar-communication (RadCom) joint system, sonar, audio and ultrasound, and so on. For example, practical applications may include, but are not limited to, Wireless communication: which may include, but are not limited to, base station, micro base station or pico-base station, point-to-point communication, mobile communications, satellite and satellite ground station, visible light communication;

Radar and RadCom: which may include, but are not limited to, millimeter wave (mmWave) and visible light automotive RadCom; and Audio (e.g., loudspeaker array): which may include, but are not limited to, sonar and sonar communication and ultrasonic sensor array.

The high-speed rate data transmission of the 5G New Radio (5G NR) requires high peak-to-average-power-ratio (PAPR) modulation techniques, such as 256 QAM (Quadrature Amplitude Modulation), which requires a high linearity transmitter with a deep back-off power amplifier (PA). Similarly, the RadCom joint system and millimeter wave satellite communication require a high-power efficiency linear transmitter. However, due to physical limitations, the output power, gain and efficiency of the power amplifier at mmWave bands are much lower than those at centimeter-wave bands. Beamforming is thus widely applied to increase output power at mmWave frequencies, because it combines output power from different antenna/radiating elements of an antenna array at a specific direction in free-space. Besides power combination, the spatial modulator performs beamforming and modulation concurrently. Compared to the conventional physical combiner, spatial power combination can minimize power loss of the power combiner and better isolate the combined signals. Accordingly, it is desirable to provide a high efficiency phased array spatial modulator that, for example, reduce or minimize adjacent channel distortion to the other unintended directions.

A need therefore exists to provide method(s) of spatial modulation and spatial modulation system(s), and more particularly, relating to phased array spatial modulation, that seek to overcome, or at least ameliorate, problem(s) associated with conventional methods and systems for spatial modulation, such as but not limited to, improving efficiency (e.g., combination efficiency). It is against this background that the present invention has been developed.

SUMMARY

According to a first aspect of the present invention, there is provided a method of spatial modulation using an antenna array comprising a plurality of radiating elements having a plurality of power amplifiers communicatively coupled thereto, respectively, the method comprising:

determining an amplitude of an output signal to be formed in space by the antenna array based on an input signal;

determining a plurality of output amplitude levels for the plurality of radiating elements, respectively, based on the amplitude of the output signal and a current output amplitude level of the antenna array;

generating one or more first signals for a first subarray of the antenna array and one or more second signals for a second subarray of the antenna array based on the input signal;

assigning the plurality of output amplitude levels determined to the plurality of power amplifiers of the plurality of radiating elements, respectively; and sending the one or more first signals to radiating elements of the first subarray and sending the one or more second signals to radiating elements of the second subarray for transmission therefrom to form a combined signal in space as the output signal, wherein the current output amplitude level of the antenna array corresponds to a candidate output amplitude level of an ordered set of candidate output amplitude levels configured for the antenna array based on an output amplitude range of the antenna array, and the first subarray comprises one or more first concentric radiating element pairs and the second subarray comprises one or more second concentric radiating element pairs.

According to a second aspect of the present invention, there is provided a spatial modulation system comprising:

an antenna array comprising a plurality of radiating elements having a plurality of power amplifiers communicatively coupled thereto, respectively;

a memory; and at least one processor communicatively coupled to the memory and the antenna array, and configured to:

determine an amplitude of an output signal to be formed in space by the antenna array based on an input signal;

determine a plurality of output amplitude levels for the plurality of radiating elements, respectively, based on the amplitude of the output signal and a current output amplitude level of the antenna array;

generate one or more first signals for a first subarray of the antenna array and one or more second signals for a second subarray of the antenna array based on the input signal;

assign the plurality of output amplitude levels determined to the plurality of power amplifiers of the plurality of radiating elements, respectively; and send the one or more first signals to radiating elements of the first sub array and sending the one or more second signals to radiating elements of the second subarray for transmission therefrom to form a combined signal in space as the output signal, wherein the current output amplitude level of the antenna array corresponds to a candidate output amplitude level of an ordered set of candidate output amplitude levels configured for the antenna array based on an output amplitude range of the antenna array, and the first subarray comprises one or more first concentric radiating element pairs and the second subarray comprises one or more second concentric radiating element pairs.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIGS. 14A to 14H depict a number of different example antenna array configurations with multilevel concentric antenna element pairs, whereby each multilevel antenna element is an example 4-level antenna element, according to various example embodiments of the present invention;

FIGS. 24A to 24H depict a number of different example array configurations with multilevel concentric antenna element pairs, with each multilevel antenna element being an example 4-level antenna element, according to various example embodiments of the present invention;

FIGS. 35A to 35H depicts a number of different antenna array configurations with multilevel concentric antenna element pairs, with each multilevel antenna element being an example 4-level antenna element is used to represent the multilevel element, according to various example embodiments of the present invention.

DETAILED DESCRIPTION

Various embodiments of the present invention provide methods of spatial modulation and spatial modulation systems, and more particularly, in relation to phased array spatial modulation. As discussed in the background, it is desirable to provide a high efficiency phased array spatial modulator. Accordingly, various embodiments provide methods of spatial modulation and spatial modulation systems, and more particularly, relating to phased array spatial modulation, that seek to overcome, or at least ameliorate, problem(s) associated with conventional methods and systems for spatial modulation, such as but not limited to, improving efficiency (e.g., combination efficiency).

Figure 1:
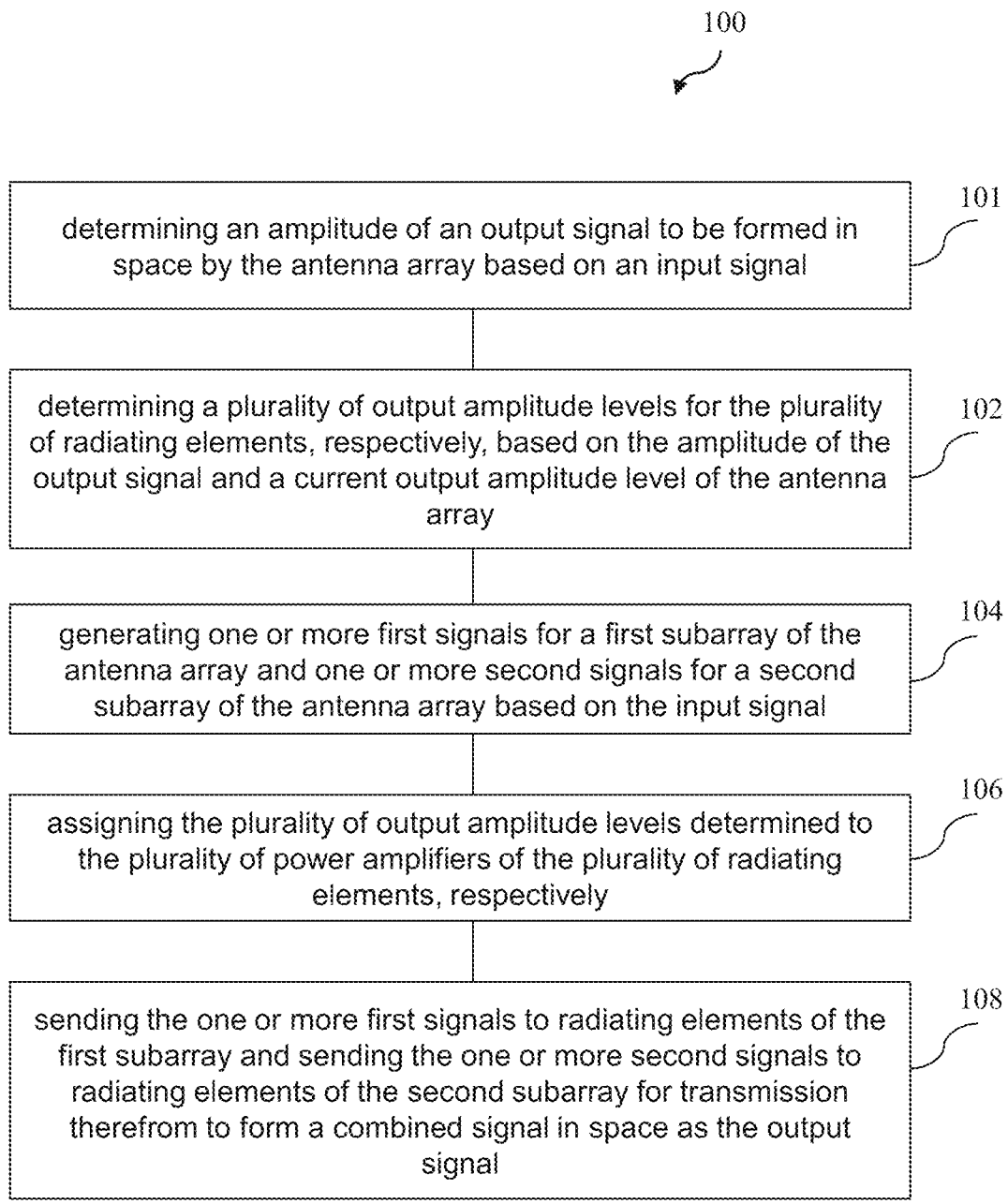
FIG. 1 depicts a schematic flow diagram of a method of spatial modulation using an antenna array comprising a plurality of radiating elements having a plurality of power amplifiers communicatively coupled thereto, respectively, according to various embodiments of the present invention.

FIG. 1 depicts a schematic flow diagram of a method 100 of spatial modulation using an antenna array comprising a plurality of radiating elements having a plurality of power amplifiers communicatively coupled thereto, respectively, according to various embodiments of the present invention. The method 100 comprises: determining (at 101) an amplitude of an output signal to be formed in space by the antenna array based on an input signal; determining (at 102) a plurality of output amplitude levels for the plurality of radiating elements, respectively, based on the amplitude of the output signal and a current output amplitude level of the antenna array; generating (at 104) one or more first signals for a first subarray of the antenna array and one or more second signals for a second subarray of the antenna array based on the input signal; assigning (at 106) the plurality of output amplitude levels determined to the plurality of power amplifiers of the plurality of radiating elements, respectively; and sending (at 108) one or more first signals to radiating elements of the first subarray and sending the one or more second signals to radiating elements of the second subarray for transmission therefrom to form a combined signal in space as the output signal. In various embodiments, the current output amplitude level of the antenna array corresponds to a candidate output amplitude level of an ordered set of candidate output amplitude levels configured for the antenna array based on an output amplitude range of the antenna array. In particular, the first subarray comprises one or more first concentric radiating element pairs and the second subarray comprises one or more second concentric radiating element pairs.

Accordingly, the method 100 of spatial modulation advantageously controls the plurality of output amplitude levels for the plurality of radiating elements, respectively, based on the amplitude of the output signal to be formed in space by the antenna array and the current output amplitude level of the antenna array, thereby optimizing the plurality of radiating elements for transmitting signals therefrom to form a combined signal in space as the output signal. In various embodiments, according to the method 100 of spatial modulation, the antenna array advantageously has multiple output amplitude levels (i.e., capable of being controlled to be or set at any one of the multiple output amplitude levels, which may also be referred to as a multilevel antenna array) and each of the plurality of radiating elements also advantageously has multiple output amplitude levels (i.e., capable of being controlled to be or set at any one of the multiple output amplitude levels, which may also be referred to as a multilevel radiating element, or simply as a multilevel element). As a result, the method 100 of spatial modulation advantageously has significantly improved efficiency, and in particular, combination efficiency, since the output amplitude level of the antenna array (and the plurality of output amplitude levels of the plurality of radiating elements, respectively) is dynamically controlled or adjusted for enhancing or optimizing efficiency in forming the output signal in space. These advantages or technical effects, and/or other advantages or technical effects, will become more apparent to a person skilled in the art as the method 100 of spatial modulation, as well as the corresponding spatial modulation system, is described in more detail according to various embodiments and example embodiments of the present invention.

In various embodiments, the plurality of radiating elements are symmetrically arranged in a two-dimensional (2D) plane, and the first subarray and the second subarray are each symmetrical about an origin of the 2D plane.

In various embodiments, the plurality of output amplitude levels for the plurality of radiating elements are determined further based on an output amplitude level transition sequence associated with the ordered set of candidate output amplitude levels configured for the antenna array. In this regard, the output amplitude level transition sequence comprises, for each candidate output amplitude level of the ordered set of candidate output amplitude levels, a plurality of output amplitude level settings (i.e., at which output amplitude level to set each radiating element) for the plurality of radiating elements, respectively, associated with the candidate output amplitude level.

In various embodiments, the above-mentioned determining (at 102) the plurality of output amplitude levels for the plurality of radiating elements comprises: determining whether the amplitude of the output signal is greater than or equal to an output amplitude value corresponding to an immediately preceding candidate output amplitude level in the ordered set of candidate output amplitude levels with respect to the candidate output amplitude level corresponding the current output amplitude level of the antenna array. In this regard, the plurality of output amplitude levels for the plurality of radiating elements are determined according to the plurality of output amplitude level settings for the plurality of radiating elements, respectively, associated with the candidate output amplitude level corresponding to the current output amplitude level of the antenna array if the amplitude of the output signal is determined to be greater than or equal to the output amplitude value corresponding to the immediately preceding candidate output amplitude level. On the other hand, the current output amplitude level of the antenna array is decreased according to the immediately preceding candidate output amplitude level in the ordered set of candidate output amplitude levels if the amplitude of the output signal is determined to be less than the output amplitude value corresponding to the immediately preceding candidate output amplitude level.

In various embodiments, according to the output amplitude level transition sequence associated with the ordered set of candidate output amplitude levels configured for the antenna array, for a transition from a highest candidate output amplitude level to an immediately preceding candidate output amplitude level, output amplitude level settings for radiating elements of an outermost first concentric radiating element pair (e.g., along an edge portion of the antenna array) of the one or more first concentric radiating element pairs and for radiating elements of an outermost second concentric radiating element pair (e.g., along an edge portion of the antenna array) of the one or more second concentric radiating element pairs are each decreased according to an immediately preceding output amplitude level. On the other hand, for a transition from a lowest candidate output amplitude level to an immediately subsequent candidate output amplitude level, output amplitude level settings for radiating elements of an innermost first concentric radiating element pair (e.g., at a central portion of the antenna array) of the one or more first concentric radiating element pairs and for radiating elements of an innermost second concentric radiating element pair (e.g., at a central portion of the antenna array) of the one or more second concentric radiating element pairs are each increased to an immediately subsequent output amplitude level.

In various embodiments, each radiating element of the first subarray and the second subarray has an ordered set of candidate output amplitude levels configured for the radiating element based on an output amplitude range of the radiating element. In various embodiments, the output amplitude level of the radiating element determined corresponds to a candidate output amplitude level of the ordered set of candidate output amplitude levels configured for the radiating element and the radiating element has an output weighting corresponding to the output amplitude level of the radiating element. Accordingly, each radiating element may be a multilevel radiating element.

In various embodiments (e.g., in the case of the spatial modulation being for outphasing spatial modulation or tri-phasing spatial modulation), a total output weighting of the first subarray and a total output weighting of the second subarray are the same after the above-mentioned assigning (at 106) the plurality of output amplitude levels determined to the plurality of power amplifiers of the plurality of radiating elements, respectively.

In various embodiments (e.g., in the case of the spatial modulation being for outphasing spatial modulation or tri-phasing spatial modulation), the radiating elements of the first subarray and the radiating elements of the second subarray are alternately arranged in at least one direction along the 2D plane. In addition, the above-mentioned one or more first signals is a first constant envelop outphasing signal and the above-mentioned one or more second signals is a second constant envelop outphasing signal. In this regard, the first and second constant envelop outphasing signals are complementary constant envelop outphasing signals.

In various embodiments (e.g., in the case of the spatial modulation being for tri-phasing spatial modulation), the method 100 further comprising: generating a third signal for a third subarray of the antenna array based on the input signal; and sending the third signal to radiating elements of the third subarray. In this regard, the third subarray comprises radiating elements of the plurality of radiating elements that neither belong to the first subarray nor the second subarray, and the third signal is a constant envelop inphasing signal.

In various embodiments (e.g., in the case of the spatial modulation being for linear spatial modulation), the method 100 further comprises: dynamically configuring the first subarray comprising the one or more first concentric radiating element pairs and the second subarray comprises the one or more second concentric radiating element pairs based on which candidate output amplitude level of the ordered set of candidate output amplitude levels configured for the antenna array the current output amplitude level of the antenna array corresponds to. In this regard, the one or more first signals are a plurality of constant envelop signals, wherein said sending the one or more first signals comprises sending the plurality of constant envelop signals to the radiating elements, respectively, of the first subarray, and the one or more second signals are a plurality of linear signals, wherein said sending the one or more second signals comprises sending the plurality of linear signals to the radiating elements, respectively, of the second subarray.

In various embodiments (e.g., in the case of the spatial modulation being for quadrature spatial modulation), the method 100 further comprises: generating a plurality of third signals for a third subarray of the antenna array and a plurality of fourth signals for a fourth subarray of the antenna array based on the input signal; and sending the plurality of third signals to radiating elements, respectively, of the third subarray and sending the plurality of fourth signals to radiating elements, respectively, of the fourth subarray for transmission therefrom (together with the above-mentioned transmission from the radiating elements of the first and second subarrays) to form the combined signal in space. In this regard, the third subarray comprises one or more third concentric radiating element pairs and the fourth subarray comprises one or more fourth concentric radiating element pairs. Furthermore, the input signal is a modulation signal comprising a quadrature signal component and an inphase signal component. In this regard, the above-mentioned one or more first signals for the first subarray are a plurality of constant envelop signals generated based on the inphase signal component, the above-mentioned one or more second signals for the second subarray are a plurality of linear signals generated based on the inphase signal component, the plurality of third signals for the third subarray are a plurality of constant envelop signals generated based on the quadrature signal component, and the plurality of fourth signals for the fourth subarray are a plurality of linear signals generated based on the quadrature signal component. Furthermore, the above-mentioned current output amplitude level of the antenna array comprises a current inphase output amplitude level of an inphase subarray comprising the first and second subarrays corresponding to a candidate inphase output amplitude level of an ordered set of candidate inphase output amplitude levels configured for the inphase subarray based on an output amplitude range of the inphase subarray, and a current quadrature output amplitude level of an quadrature subarray comprising the third and fourth subarrays corresponding to a candidate quadrature output amplitude level of an ordered set of candidate quadrature output amplitude levels configured for the quadrature subarray based on an output amplitude range of the quadrature subarray. In this regard, the method 100 further comprises dynamically configuring the first subarray comprising the one or more first concentric radiating element pairs and the second subarray comprising the one or more second concentric radiating element pairs based on which candidate inphase output amplitude level of the ordered set of candidate inphase output amplitude levels configured for the inphase subarray the current inphase output amplitude level of the inphase subarray corresponds to, and dynamically configuring the third subarray comprising the one or more third concentric radiating element pairs and the fourth subarray comprising the one or more fourth concentric radiating element pairs based on which candidate quadrature output amplitude level of the ordered set of candidate quadrature output amplitude levels configured for the quadrature subarray the current quadrature output amplitude level of the quadrature subarray corresponds to.

Figure 2:
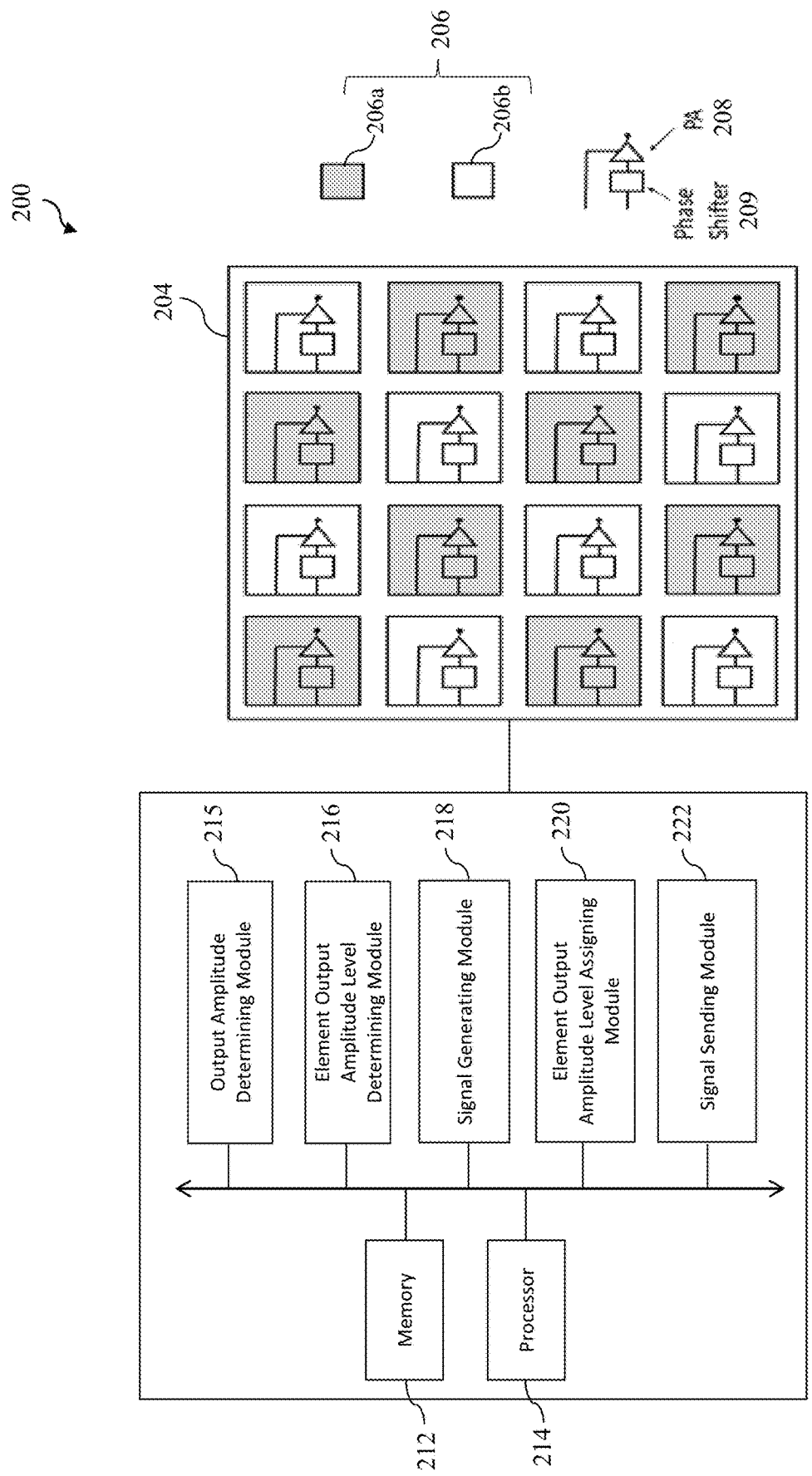
FIG. 2 depicts a schematic drawing of a spatial modulation system according to various embodiments of the present invention, according to various embodiments of the present invention.

FIG. 2 depicts a schematic drawing of a spatial modulation system 200 according to various embodiments of the present invention, corresponding to the method 100 of spatial modulation as described hereinbefore with reference to FIG. 1 according to various embodiments of the present invention. The spatial modulation system 200 comprises: an antenna array 204 comprising a plurality of radiating elements 206 having a plurality of power amplifiers 208 communicatively coupled thereto, respectively; a memory 212; and at least one processor 214 communicatively coupled to the memory 212 and the antenna array 204 (e.g., each of the plurality of radiating elements 206), and configured to perform the method 100 of spatial modulation as described herein according to various embodiments of the present invention. In various embodiments, the plurality of power amplifiers 208 may be communicatively coupled to a plurality of phase shifter 209, respectively, as shown in FIG. 2. Accordingly, in various embodiments, the at least one processor 214 is configured to: determine an amplitude of an output signal to be formed in space by the antenna array 204 based on an input signal; determine a plurality of output amplitude levels for the plurality of radiating elements 206, respectively, based on the amplitude of the output signal and a current output amplitude level of the antenna array 204; generate one or more first signals for a first subarray (e.g., 206a) of the antenna array 204 and one or more second signals for a second subarray (e.g., 206b) of the antenna array 204 based on the input signal; assign the plurality of output amplitude levels determined to the plurality of power amplifiers 208 of the plurality of radiating elements 206, respectively; and send the one or more first signals to radiating elements of the first subarray (e.g., 206a) (e.g., through the corresponding phase shifter 209 and the corresponding power amplifier 208) and send the one or more second signals to radiating elements of the second subarray (e.g., 206b) (e.g., through the corresponding phase shifter 209 and the corresponding power amplifier 208) for transmission therefrom to form a combined signal in space as the output signal.

In various embodiments, the current output amplitude level of the antenna array 204 corresponds to a candidate output amplitude level of an ordered set of candidate output amplitude levels configured for the antenna array 204 based on an output amplitude range (e.g., a highest or maximum output amplitude) of the antenna array 204. In particular, the first subarray (e.g., 206a) comprises one or more first concentric radiating element pairs and the second subarray (e.g., 206b) comprises one or more second concentric radiating element pairs.

It will be appreciated by a person skilled in the art that the at least one processor 214 may be configured to perform various functions or operations through set(s) of instructions (e.g., software modules) executable by the at least one processor 214 to perform various functions or operations. Accordingly, as shown in FIG. 2, the spatial modulation system 200 may comprise an output amplitude determining module (or an output amplitude determining circle) 215 configured to determine an amplitude of an output signal to be formed in space by the antenna array 204 based on an input signal; an element output amplitude level determining module (or an element output amplitude level determining circuit) 216 configured to determine a plurality of output amplitude levels for the plurality of radiating elements 206, respectively, based on the amplitude of the output signal and a current output amplitude level of the antenna array 204; a signal generating module (or a signal generating circuit) 218 configured to generate one or more first signals for a first subarray (e.g., 206a) of the antenna array 204 and one or more second signals for a second subarray (e.g., 206b) of the antenna array 204 based on the input signal; an element output amplitude assigning module (or an element output amplitude assigning circuit) 220 configured to assign the plurality of output amplitude levels determined to the plurality of power amplifiers 208 of the plurality of radiating elements 206, respectively; a signal sending module (or a signal sending circuit) 222 configured to send the one or more first signals to radiating elements of the first sub array (e.g., 206a) and send the one or more second signals to radiating elements of the second subarray (e.g., 206b) for transmission therefrom to form a combined signal in space as the output signal.

It will be appreciated by a person skilled in the art that the above-mentioned modules are not necessarily separate modules (or circuits), and two or more modules may be realized by or implemented as one functional module (e.g., a circuit or a software program) as desired or as appropriate without deviating from the scope of the present invention. For example, two or more of the output amplitude determining module 215, the element output amplitude level determining module 216, the signal generating module 218, the element output amplitude assigning module 220 and the signal sending module 222 may be realized (e.g., compiled together) as one executable software program (e.g., software application or simply referred to as an "app"), which for example may be stored in the memory 212 and executable by the at least one processor 214 to perform various functions/operations as described herein according to various embodiments of the present invention.

In various embodiments, the spatial modulation system 200 corresponds to the method 100 of spatial modulation as described hereinbefore with reference to FIG. 1, therefore, various functions or operations configured to be performed by the least one processor 214 (or the above-mentioned modules 215, 216, 218, 220, 222) may correspond to various steps or operations of the method 100 of spatial modulation as described herein according to various embodiments, and thus need not be repeated with respect to the spatial modulation system 200 for clarity and conciseness. In other words, various embodiments described herein in context of the methods are analogously valid for the corresponding systems, and vice versa.

For example, in various embodiments, the memory 212 may have stored therein the output amplitude determining module 215, the element output amplitude level determining module 216, the signal generating module 218, the element output amplitude assigning module 220 and/or the signal sending module 222, which respectively correspond to various steps (or operations or functions) of the method 100 of spatial modulation as described herein according to various embodiments, which are executable by the at least one processor 214 to perform the corresponding functions or operations as described herein.

A computing system, a controller, a microcontroller or any other system providing a processing capability may be provided according to various embodiments in the present disclosure. Such a system may be taken to include one or more processors and one or more computer-readable storage mediums. For example, the spatial modulation system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions may also be understood as a "circuit" in accordance with various embodiments. Similarly, a "module" may be a portion of a system according to various embodiments and may encompass a "circuit" as described above, or may be understood to be any kind of a logic-implementing entity.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, description or discussions utilizing terms such as "determining", "generating", "assigning", "sending", "configuring" or the like, refer to the actions and processes of a computer system, or similar electronic device, that manipulates and transforms data represented as physical quantities within the computer system into other data similarly represented as physical quantities within the computer system or other information storage, transmission or display devices.

The present specification also discloses a computing or processing system comprising the memory 212 and the at least one processor 214 for performing various operations/functions as described herein. Such a system may be specially constructed for the required purposes, or may comprise a general purpose computer or other device selectively activated or reconfigured by a computer program stored in the computer. The algorithms presented herein are not inherently related to any particular computer or other apparatus.

Various general-purpose machines may be used with computer programs in accordance with the teachings herein. Alternatively, the construction of more specialized apparatus to perform various method steps may be appropriate. For example, according to various embodiments, the antenna array 204, the memory 212, the at least one processor 214, and the above-mentioned modules 215, 216, 218, 220, 222 may be integrated to form an integrated spatial modulation system (which may also be embodied as a device or an apparatus).

In addition, the present specification also at least implicitly discloses a computer program or software/functional module, in that it would be apparent to the person skilled in the art that individual steps of various methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention. It will be appreciated by a person skilled in the art that various modules described herein (e.g., the output amplitude determining module 215, the element output amplitude level determining module 216, the signal generating module 218, the element output amplitude assigning module 220 and/or the signal sending module 222) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium(s)), comprising instructions (e.g., the output amplitude determining module 215, the element output amplitude level determining module 216, the signal generating module 218, the element output amplitude assigning module 220 and/or the signal sending module 222) executable by one or more computer processors to perform the method 100 of spatial modulation, as described herein with reference to FIG. 1 according to various embodiments. Accordingly, various computer programs or modules described herein may be stored in a computer program product receivable by a system therein, such as the spatial modulation system 200 as shown in FIG. 2, for execution by at least one processor 214 of the spatial modulation system 200 to perform various functions.

Software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any reference to an element or a feature herein using a designation such as "first", "second" and so forth does not necessarily limit the quantity or order of such elements or features, unless stated or the context requires otherwise. For example, such designations may be used herein as a convenient way of distinguishing between two or more elements or instances of an element. Thus, a reference to first and second elements does not necessarily mean that only two elements can be employed, or that the first element must precede the second element. In addition, a phrase referring to "at least one of" a list of items, or the like (e.g., "one or more of"), refers to any single item therein or any combination of two or more items therein.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

As discussed in the background, phased array technique is widely applied in radar, communication, sonar, audio and medical imaging applications. In this regard, various example embodiments provides several methods to generate linear modulation signals utilizing a phased array technique, in areas such as wireless communication, light communication, radar, radar-communication (RadCom) joint system, sonar, audio and ultrasound, and so on. For example, several phased array spatial modulation methods are introduced to generate high power wideband signals efficiently, applicable in a wide frequency range and in all areas employing a phased array technique. For example, a number of practical applications may include, but are not limited to, Wireless communication: which may include, but are not limited to, base station, micro base station or pico-base station, point-to-point communication, mobile communications, satellite and satellite ground station, visible light communication;

Radar and RadCom: which may include, but are not limited to, mmWave and visible light automotive RadCom;

Audio (e.g., loudspeaker array): which may include, but are not limited to, sonar and sonar communication and ultrasonic sensor array.

For example, various example embodiments advantageously introduce several example types of higher efficiency spatial modulators that, for example, reduce adjacent channel distortion to the other unintended directions. It will be appreciated by a person skilled in the art that, besides 5G New Radio, these methods may be applied to any other areas that utilizes a phased array technique.

For better understanding of the present invention and without limitation or loss of generality, an outphasing spatial modulation method, a linear spatial modulation method, a quadrature spatial modulation method and a tri-phasing spatial modulation method will be described later below according to various example embodiments of the present invention. However, it will be appreciated by a person skilled in the art that the present invention is not limited to these example types of spatial modulation methods, and that other types of spatial modulation methods are within the scope of the present invention.

In the above-mentioned example spatial modulation methods according to various example embodiments, the status of the power amplifier associated with each antenna/radiating element varies with the output amplitude level of the antenna array dynamically, which advantageously enables a high efficiency spatial modulation. For example, it was found that the average power efficiency of the antenna array remains high even with a deep back off.

Figure 3:
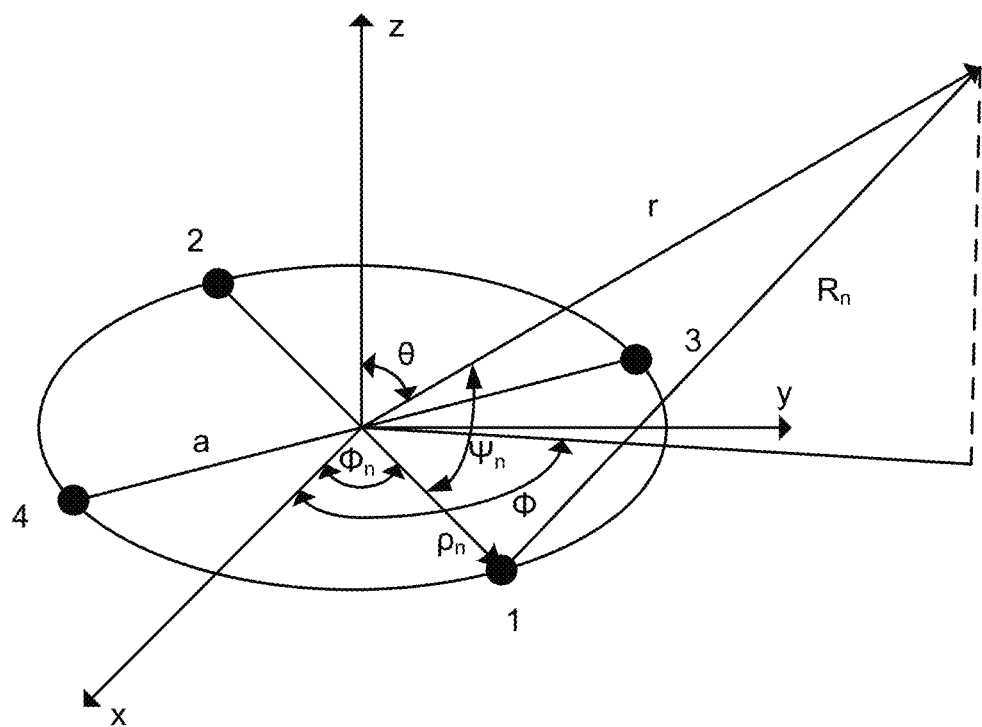
FIG. 3 depicts a schematic drawing of a spherical coordinate configuration of an example 2×2 antenna array comprising two concentric antenna element pairs (a pair of concentric isotropic elements 1 and 2 and a pair of concentric isotropic elements 3 and 4)

For better understanding, the principle of phased array spatial modulation will now be described with reference to FIG. 3. FIG. 3 depicts a schematic drawing of a spherical coordinate configuration of an example 2×2 antenna array comprising two concentric antenna element pairs (a pair of concentric isotropic elements 1 and 2 and a pair of concentric isotropic elements 3 and 4). As shown in FIG. 3, four isotropic elements (radiating/antenna elements) are equally spaced on a two-dimensional (2D) plane (e.g., x-y plane) along a circular ring with radius a. The normalized field of an isotropic element may be expressed as:

$$E_n(r, \theta, \phi) = a_n \frac{e^{-jkR_n}}{R_n} \quad \text{(Equation 1)}$$

where $R_n$ is the distance from the nth element to the observation point, and an is the excitation coefficients of nth element. For r>>a, $$R_n \approx r - a \cos \psi_n = r - a \sin \theta \cos(\phi - \phi_n) \quad \text{(Equation 2)}$$

assuming that for amplitude $R_n \approx r$, and $a_0 = E_0$, Equation (1) may be expressed as:

$$E_n(r, \theta, \phi) = \frac{e^{-jkr}}{r} E_0 e^{jka\sin\theta\cos(\phi - \phi_n)} \quad \text{(Equation 3)}$$

Accordingly, the combined field $(E_{1+2}(r,\theta,\phi))$ of the isotropic elements 1 and 2 and the combined field $(E_{3+4}(r,\theta,\phi))$ of the isotropic elements 3 and 4 may be expressed, respectively, as:

$$E_{1+2}(r, \theta, \phi) = E_1(r, \theta, \phi) + E_2(r, \theta, \phi) = \quad \text{(Equation 4)}$$
$$E_0 \frac{e^{-jkr}}{r}\left(e^{jka\sin\theta\cos(\phi-\phi_1)} + e^{jka\sin\theta\cos(\phi-(\phi_1+\pi))}\right) =$$
$$E_0 \frac{e^{-jkr}}{r}(2\cos(ka)\sin\theta\cos(\phi-\phi_1))$$

$$E_{3+4}(r, \theta, \phi) = E_3(r, \theta, \phi) + E_4(r, \theta, \phi) = \quad \text{(Equation 5)}$$
$$E_0 \frac{e^{-jkr}}{r}\left(e^{jka\sin\theta\cos(\phi-\phi_3)} + e^{jka\sin\theta\cos(\phi-(\phi_3+\pi))}\right) =$$
$$E_0 \frac{e^{-jkr}}{r}(2\cos(ka)\sin\theta\cos(\phi-\phi_3))$$

From Equations (4) and (5), each concentric antenna element pair equalizes with an isotropic element at an origin of the 2D plane, and the combined fields $E_{1+2}(r,\theta,\phi)$ and $E_{3+4}(r,\theta,\phi)$ have the same phase delay but different array factors.

Outphasing Spatial Modulator

Figure 4A:
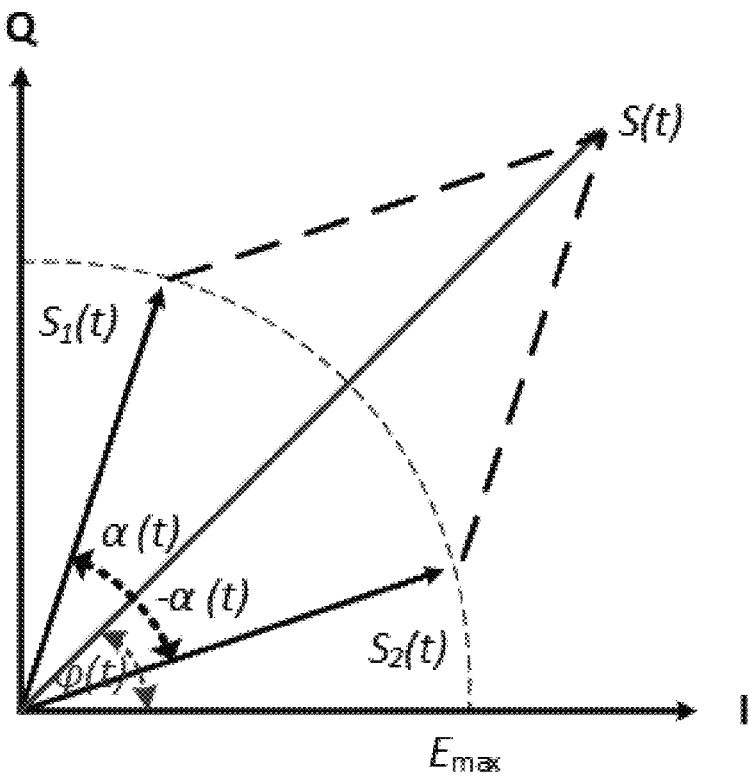
FIG. 4A depicts a phasor diagram illustrating the principle of outphasing spatial modulation, according to various example embodiments of the present invention.

For better understanding, the principle of outphasing spatial modulation according to various example embodiments of the present invention will now be described with reference to FIG. 4A. In particular, FIG. 4A depicts a phasor diagram illustrating the principle of outphasing spatial modulation according to various example embodiments of the present invention. The linear signal S(t) (which may be referred to as an output signal or a combined signal) is formed by a combination (in space) of two complementary constant envelop signals $S_1(t)$ and $S_2(t)$ that can be amplified by high efficiency nonlinear power amplifier. These signals may be described as follows:

$$S(t)=A(t)\cdot e^{-j\varphi(t)} \quad \text{(Equation 6)}$$

where A(t) and ω(t) are the amplitude and phase modulated quantities.

$$S_1(t)=E_{max}\cdot e^{-j[\varphi(t)+\alpha(t)]} \quad \text{(Equation 7)}$$

$$S_2(t)=E_{max}\cdot e^{-j[\varphi(t)-\alpha(t)]} \quad \text{(Equation 8)}$$

where $E_{max} \geq \max(A(t)/2)$, and the outphasing angle may be expressed as:

$$\alpha(t)=\cos^{-1}(A(t)/2/E_{max}) \quad \text{(Equation 9)}$$

Figure 4B:
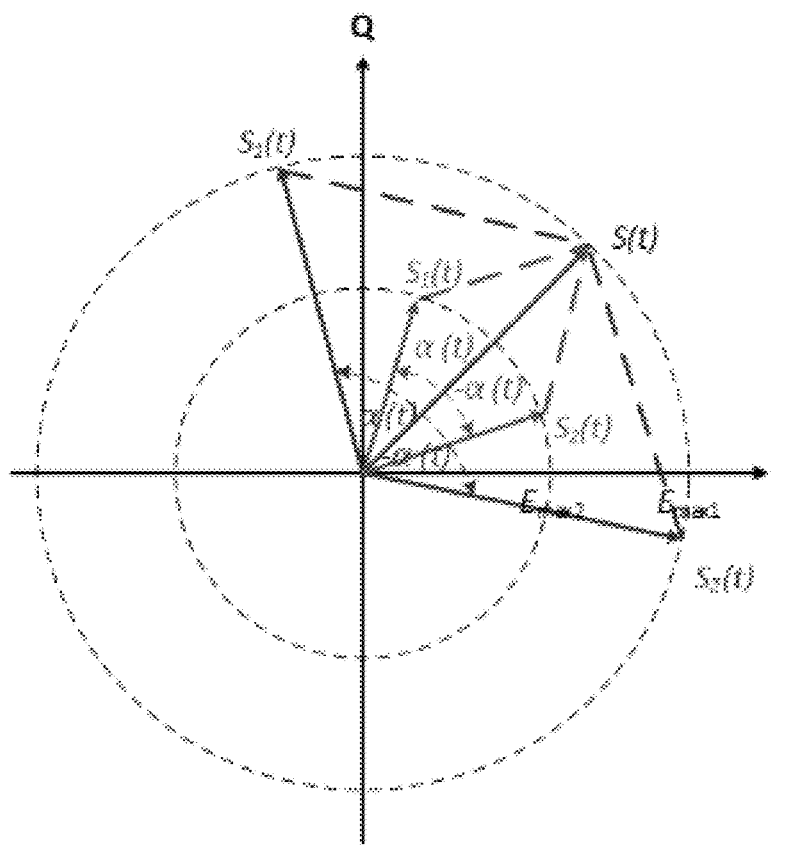
FIG. 4B depicts a phasor diagram illustrating the principle of multilevel outphasing spatial modulation according to various example embodiments of the present invention.

In FIG. 4A, the constant envelop signals $S_1(t)$ and $S_2(t)$ are divided into cosine and sine components. By varying the outphasing angle α(t), the cosine components are added to realize a linear amplitude modulation and the sine components are canceled, thus the combination efficiency may be expressed as:

$$\eta_c(t)=\cos^2(\alpha(t)) \quad \text{(Equation 10)}$$

and the outphasing system efficiency may thus be expressed as:

$$\eta_s(t)=\eta_A(t)\cdot\eta_c(t) \quad \text{(Equation 11)}$$

where $\eta_A(t)$ denotes the efficiency of the power amplifier. According to Equations (10) and (11), $\eta_s(t)$ drops with increased outphasing angle α(t) even if a high efficiency power amplifier is employed. From Equation (9), the outphasing angle α(t) can remain at a lower value range when $E_{max}$ follows the variation of A(t) with multilevels. FIG. 4B depicts a phasor diagram illustrating the principle of multilevel outphasing spatial modulation according to various example embodiments of the present invention. As illustrated in FIG. 4B, S(t) can be a combination of $S_1(t)$ and $S_2(t)$ with level (output amplitude level) either at $E_{max1}$ or $E_{max2}$. In this regard, it can be observed that the value of the outphasing angle α(t) associated with level $E_{max2}$ is advantageously lower.

Figure 5:
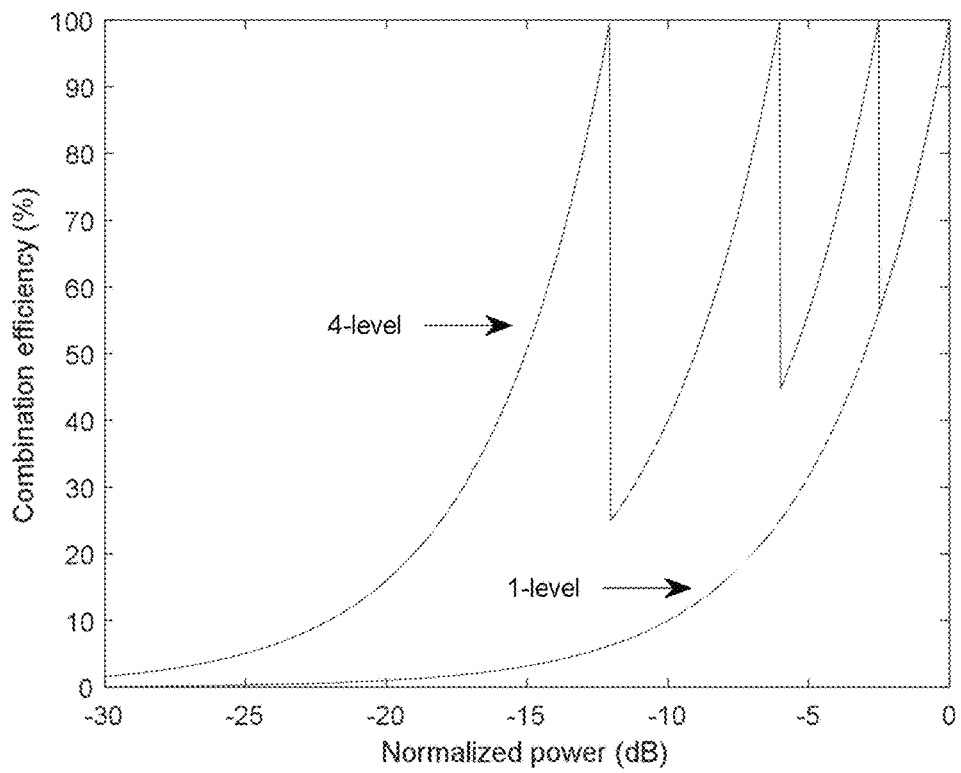
FIG. 5 depicts a plot showing simulation results of outphasing combination efficiency of a 1-level antenna array and a 4-level antenna array.

As an example comparative illustration, FIG. 5 depicts a plot showing simulation results of outphasing combination efficiency of a 1-level antenna array and a 4-level antenna array. It can be observed that the average outphasing combination efficiency with the 4-level approach is much higher compared to the 1-level approach.

Figure 6:
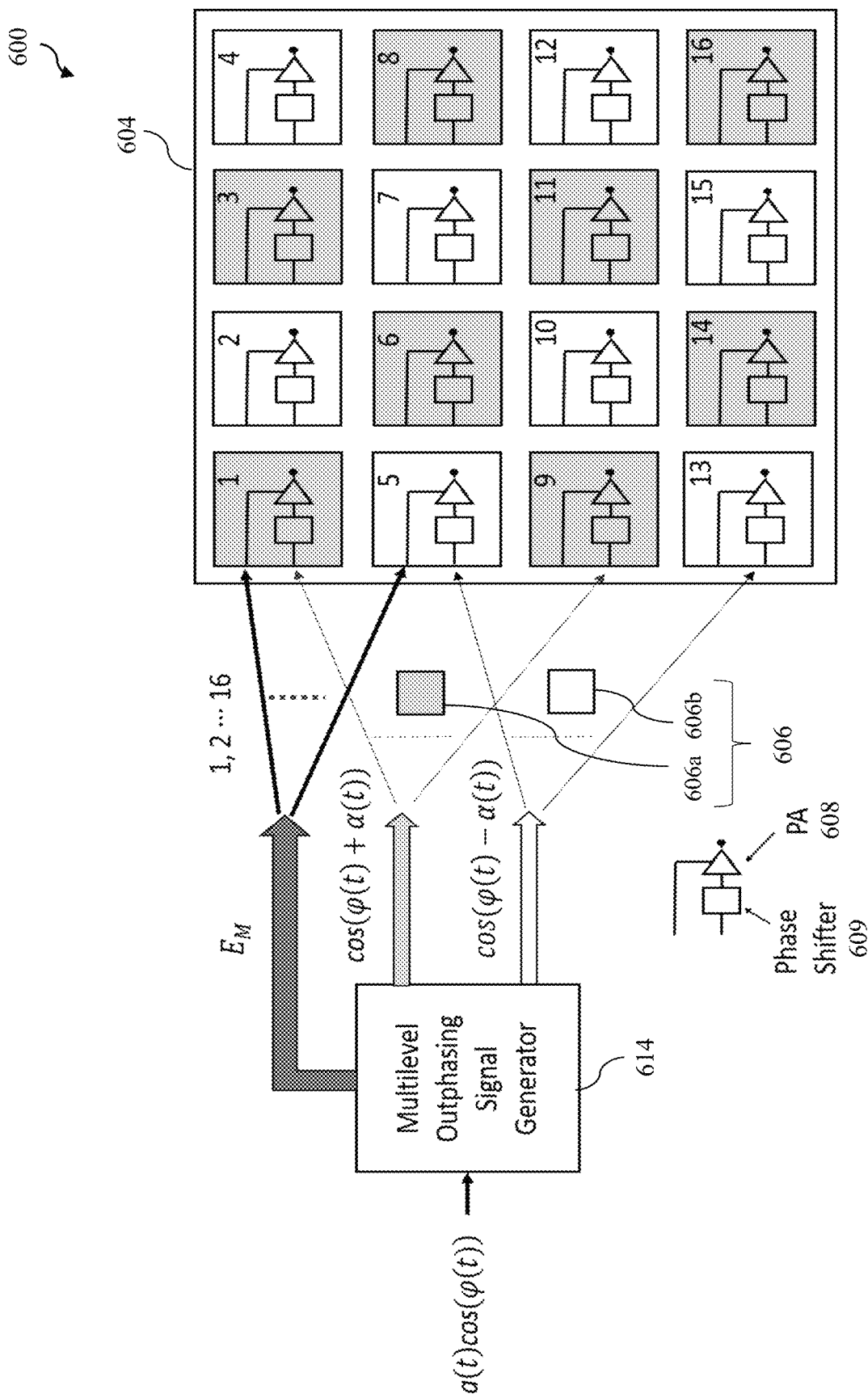
FIG. 6 depicts a schematic drawing of an outphasing spatial modulating system, according to various example embodiments of the present invention.

FIG. 6 depicts a schematic drawing of an outphasing spatial modulating system 600 (which may also be referred to as an outphasing spatial modulator) according to various example embodiments of the present invention. The spatial modulation system 600 comprises: an antenna array 604 comprising a plurality of antenna elements 606 (which may also be interchangeably referred to as radiating elements) having a plurality of power amplifiers 608 communicatively coupled thereto, respectively; a multilevel outphasing signal generator 614 (e.g., comprising a memory and at least one processor communicatively coupled to the memory and the antenna array 604), and configured to perform a method of outphasing spatial modulation. In various example embodiments, the plurality of power amplifiers 608 may be communicatively coupled to a plurality of phase shifters 609, respectively, as shown in FIG. 6.

In various example embodiments, the multilevel outphasing signal generator 614 is configured to: determine an amplitude of an output signal to be formed in space by the antenna array 604 based on an input signal (e.g., a(t)cos(φ (t))); determine a plurality of output amplitude levels ($E_m$) for the plurality of antenna elements 606, respectively, based on the amplitude of the output signal and a current output amplitude level of the antenna array 604; generate a first signal (e.g., an outphasing signal cos(φ(t)+α(t)) for a first subarray (e.g., 606a) of the antenna array 604 and a second signal (e.g., an outphasing signal cos(φ(t)−α(t)), which is complementary to the outphasing signal cos(φ(t)+α(t)) for a second subarray (e.g., 606b) of the antenna array 604 based on the input signal; assign the plurality of output amplitude levels ($E_m$) determined to the plurality of power amplifiers 608 of the plurality of antenna elements 606, respectively; and send the first signal to antenna elements of the first subarray (e.g., 606a) (e.g., through the corresponding phase shifter 609 and the corresponding power amplifier 608) and send the second signal to antenna elements of the second subarray (e.g., 606b) (e.g., through the corresponding phase shifter 609 and the corresponding power amplifier 608) for transmission therefrom to form a combined signal (i.e., the above-mentioned output signal) in space.

In various example embodiments, the current output amplitude level of the antenna array 604 corresponds to a candidate output amplitude level of an ordered set of candidate output amplitude levels configured for the antenna array 604 (i.e., multilevel antenna array) based on an output amplitude range of the antenna array 604. In particular, the first subarray (e.g., 606a) comprises one or more first concentric antenna element pairs (e.g., antenna elements 6 and 11 may form a first concentric antenna element pair) and the second subarray (e.g., 606b) comprises one or more second concentric antenna element pairs (e.g., antenna elements 7 and 10 may form a second concentric antenna element pair).

In various example embodiments, the outphasing angle α(t) for the above-mentioned first and second signals may be determined based on the plurality of output amplitude levels determined for the plurality of antenna elements 606 and the current output amplitude level of the antenna array 604, such as but not limited to, based on the above-mentioned Equation 9. In various example embodiments, the amplitude of the output signal to be formed may be determined based on the input signal, such as based on Equations (6) to (9).

Figure 7:
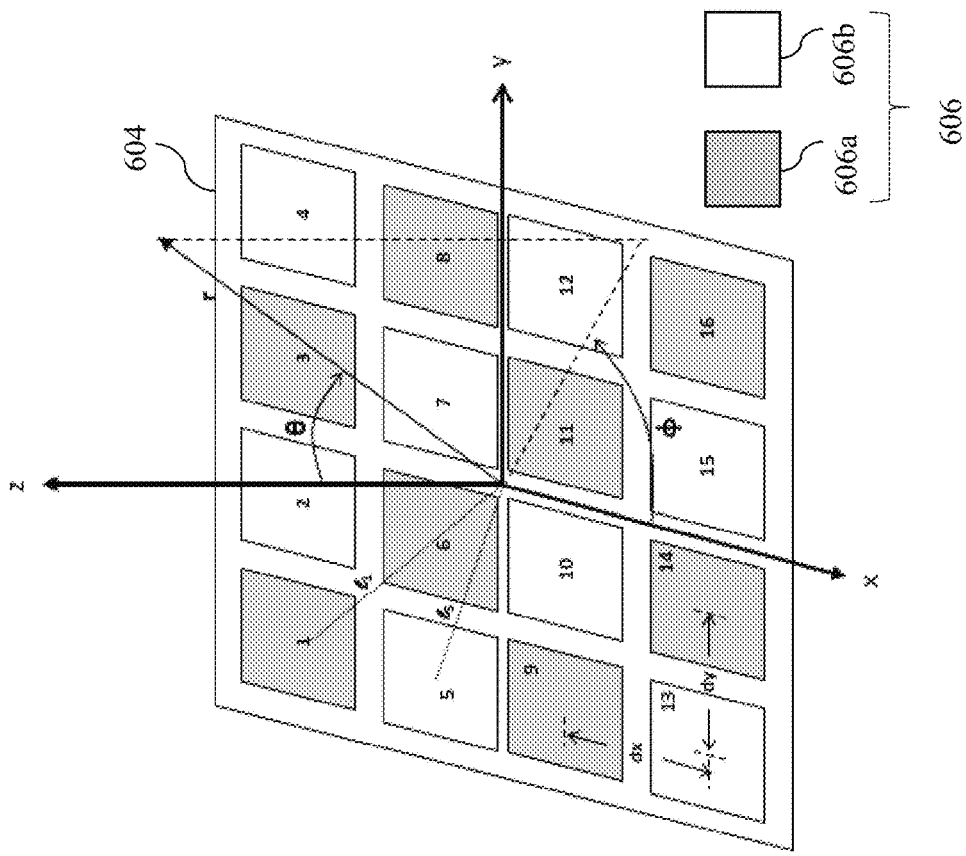
FIG. 7 depicts a schematic drawing illustrating the spherical coordinate configuration of an example 4×4 antenna array, according to various example embodiments of the present invention.

By way of an example only and without limitation, FIG. 7 depicts a schematic drawing illustrating the spherical coordinate configuration of an example 4×4 antenna array 604, according to various example embodiments of the present invention. As shown in FIG. 7, the antenna array 604 may be divided into two subarrays (e.g., first and second subarrays) 606a, 606b represented in gray and white, respectively. Multilevel outphasing signal generated by the multilevel outphasing signal generator 614 may be sent to the corresponding antenna element through a corresponding phase shifter 609 and a corresponding power amplifier 608.

As a result, the two subarrays transmit complementary outphasing signals, which are combined in free space to form a combined signal.

In various example embodiments, the antenna elements 606 are symmetrically arranged in a two-dimensional (2D) plane. For example, as shown in FIG. 7, the antenna elements 606 are symmetrically located in the x-y plane. The total far-zone field of the antenna array 604 is the product of a single reference element at a selected reference point and its array factor as follows:

$$E(r) = E_{ref}(r) \cdot [\text{array factor}] \quad \text{(Equation 12)}$$

$$\text{as } E(r) = S(t) \cdot \frac{e^{-jkr}}{r} = A(t) \cdot e^{-j\varphi(t)} \cdot \frac{e^{-jkr}}{r}, \quad \text{(Equation 13)}$$

Equation (12) is expressed as: $A(t) \cdot e^{-j\varphi(t)} \cdot \frac{e^{-jkr}}{r} =$ $$E_{max} \cdot e^{-j\varphi(t)} \cdot \frac{e^{-jkr}}{r} \cdot \left[e^{-j\alpha(t)} \cdot [\text{gray}_{subarray\ factor}] + e^{j\alpha(t)} \cdot [\text{white}_{subarray\ factor}]\right]$$

In various example embodiments, the first subarray (e.g., gray subarray) 606a and the second subarray (e.g., white subarray) 606b are each symmetrical about an origin of the 2D plane. For example, as shown in FIG. 7, the first and second subarrays 606a, 606b are symmetrical around the origin of the x-y plane, with their reference point coinciding with the entire combined antenna array. In this regard, the sub array factor does not affect the phase relationship of the two complementary outphasing signals, and increasing the number of antenna elements can help to reduce the amplitude difference of the two subarrays further.

In various example embodiments, each antenna element of the first subarray 606a and the second subarray 606b has an ordered set of candidate output amplitude levels configured for the antenna element based on an output amplitude range of the antenna element. In this regard, the output amplitude level of the antenna element determined corresponds to a candidate output amplitude level of the ordered set of candidate output amplitude levels configured for the antenna element. Furthermore, the antenna element has an output weighting corresponding to the output amplitude level of the antenna element. For example, the output amplitude range of each antenna element may be divided into 1 to L uniform or nonuniform distribution levels (e.g., an antenna element having 1-level may correspond to turning the antenna element on (level 1) or off (level 0)), where L can be any number from 1 to as large as desired or as appropriate. For example, a 4×4 antenna array with 1-level at each antenna element (which may be referred to as 1-level antenna element) can divide its output amplitude into 4 levels (4L) output amplitude levels (e.g., the number of available combined states in this 4×4 antenna array, it includes level 0 to level 4, but level 0 is not used and the zero output is achieved at level 1 with the outphasing angle $$\alpha(t) = \frac{\pi}{2},$$

so it is divided into 4 levels). In this regard, the output amplitude level of the antenna array 604 may be modified by switching on and off selected antenna elements (in the case of 1-level antenna elements).

In various example embodiments, the plurality of output amplitude levels for the plurality of antenna elements 606 are determined further based on an output amplitude level transition sequence associated with the ordered set of candidate output amplitude levels configured for the antenna array 604. The output amplitude level transition sequence comprises, for each candidate output amplitude level of the ordered set of candidate output amplitude levels, a plurality of output amplitude level settings for the plurality of antenna elements 606, respectively, associated with the candidate output amplitude level.

Figure 8:
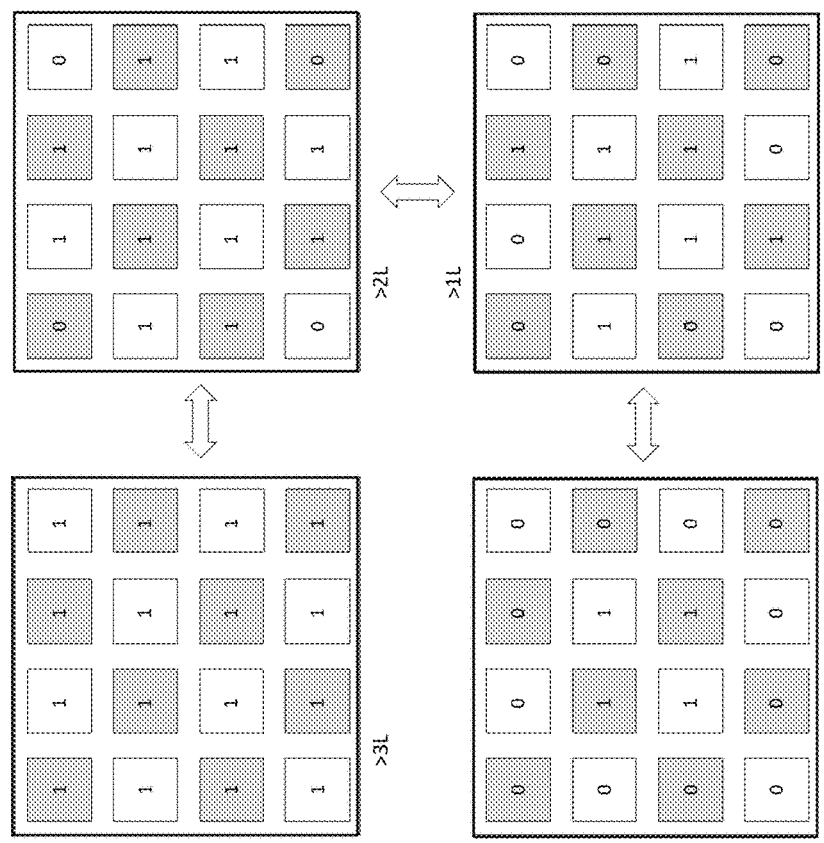
FIG. 8 depicts an output amplitude level transition sequence of the example 4×4 antenna array with 1-level antenna elements, according to various example embodiments of the present invention.

By way of an example only and without limitation, FIG. 8 depicts an output amplitude level transition sequence of the example 4×4 antenna array with 1-level antenna elements. As shown in FIG. 8, concentric subarray antenna element pairs (i.e., a first concentric antenna element pair and its corresponding second concentric antenna element pair) turn off (level 0) from along an edge portion of the antenna array to a center portion of the antenna array when the output amplitude level is reduced, and on the other hand, turn on in a reverse manner when the output amplitude level is increased. Accordingly, for example, for a transition from a highest candidate output amplitude level to an immediately preceding candidate output amplitude level, output amplitude level settings for antenna elements of an outermost first concentric antenna element pair of the one or more first concentric antenna element pairs and for antenna elements of an outermost second concentric antenna element pair of the one or more second concentric antenna element pairs are each decreased according to an immediately preceding output amplitude level. On the other hand, for a transition from a lowest candidate output amplitude level to an immediately subsequent candidate output amplitude level, output amplitude level settings for antenna elements of an innermost first concentric antenna element pair of the one or more first concentric antenna element pairs and for antenna elements of an innermost second concentric antenna element pair of the one or more second concentric antenna element pairs are each increased to an immediately subsequent output amplitude level.

Figure 9:
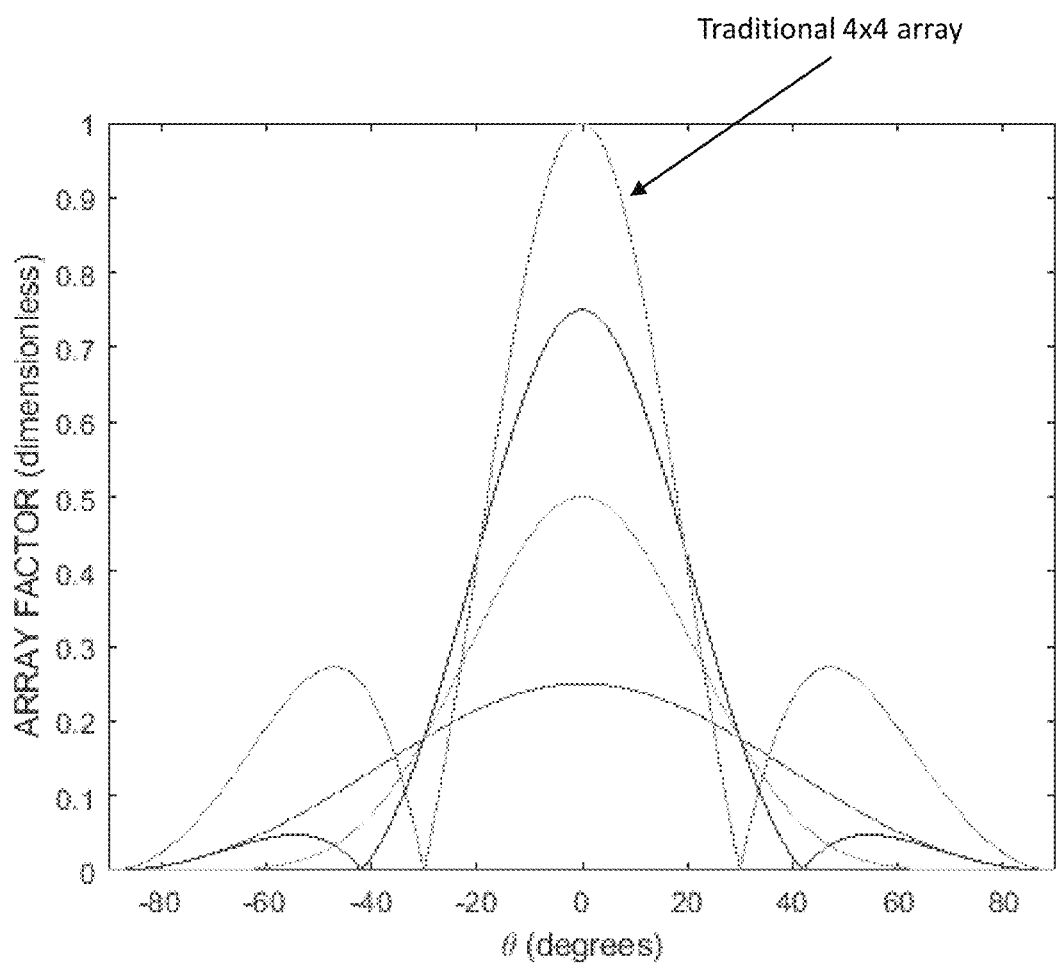
FIG. 9 depicts a plot illustrating a dynamic array factor of the example 4×4 antenna array with 1-level antenna elements shown in in FIG. 7 at $\phi=0$, according to various example embodiments of the present invention.

FIG. 9 depicts a plot illustrating a dynamic array factor of the example 4×4 antenna array with 1-level antenna elements shown in in FIG. 7 at $\phi=0$. As shown in FIG. 9, the maximum output is the array factor of the traditional antenna array. In this regard, compared to the traditional antenna array, the elevation angle $\theta$ at the maximum output is consistent but at the minimum output, it changes with on and off of selected antenna elements.

Figure 10:
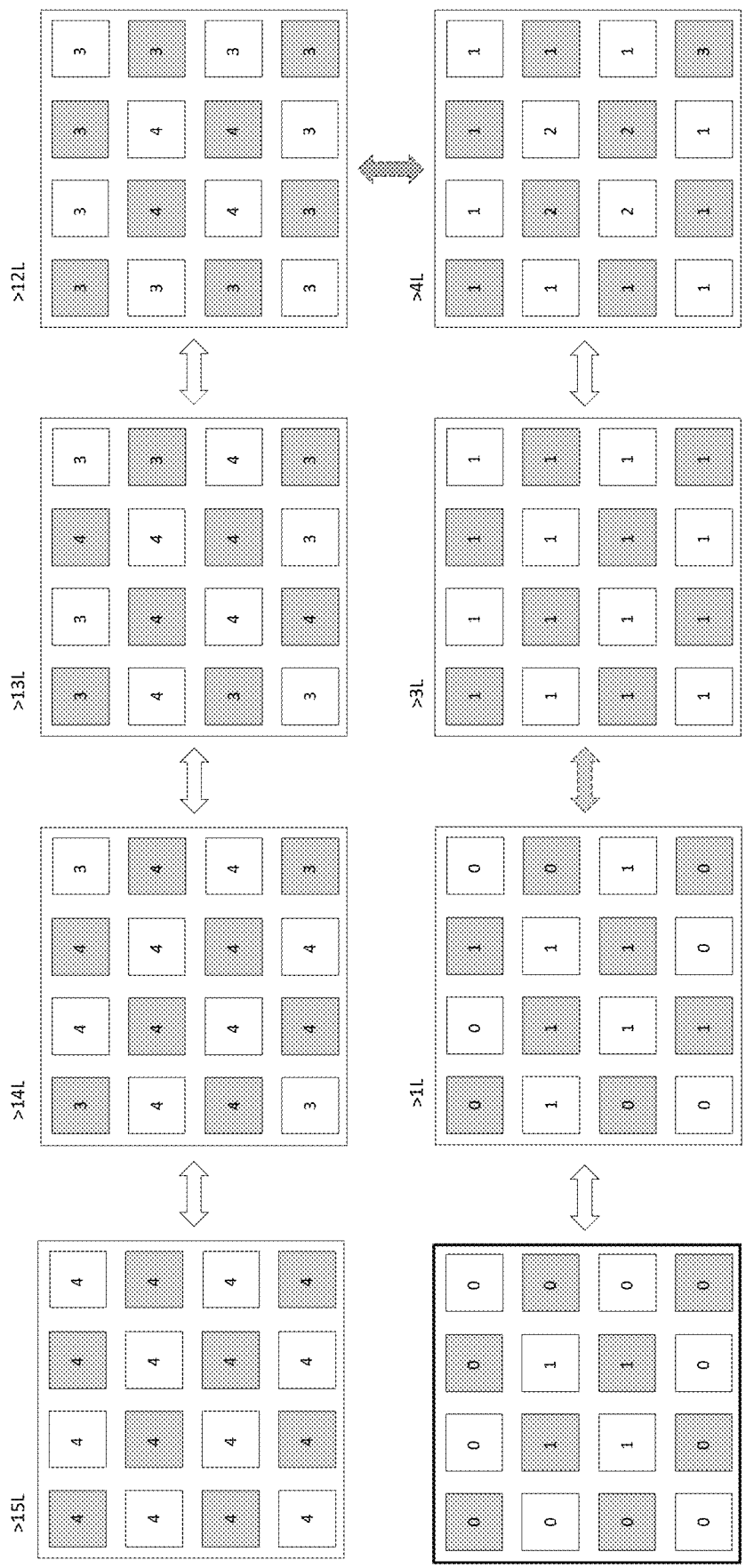
FIG. 10 depicts a transition sequence of an example 4×4 antenna array with 4-level antenna elements (i.e., 4-level at each antenna element), according to various example embodiments of the present invention.
Figure 11A:
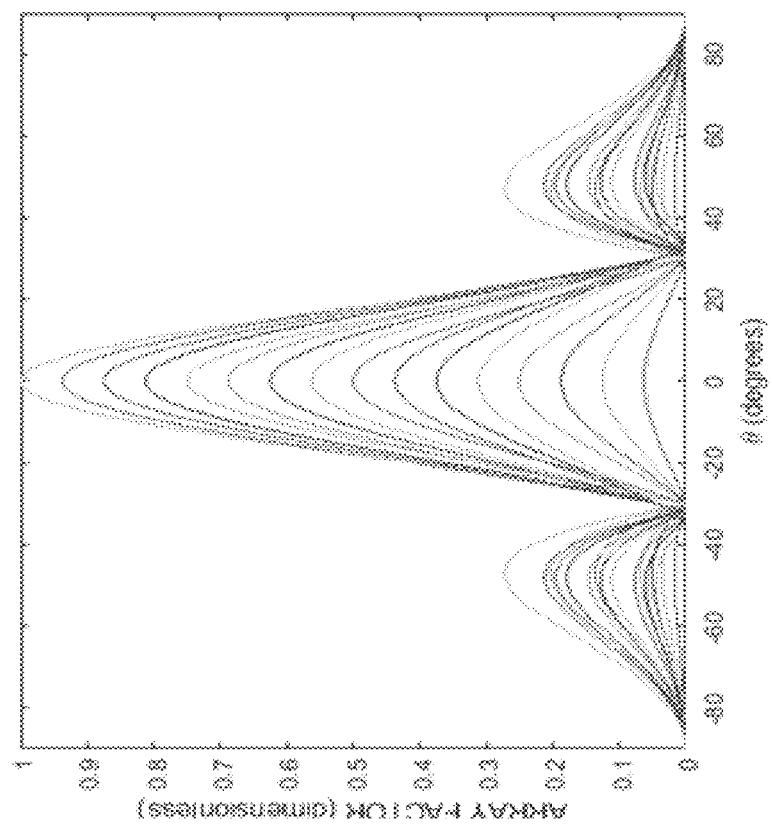
FIGS. 11A and 11B depict the dynamic array factors of the example 4×4 antenna array with 4-level antenna elements with 16 levels and 13 levels, respectively, at $\phi=0$, according to various example embodiments of the present invention.
Figure 11B:
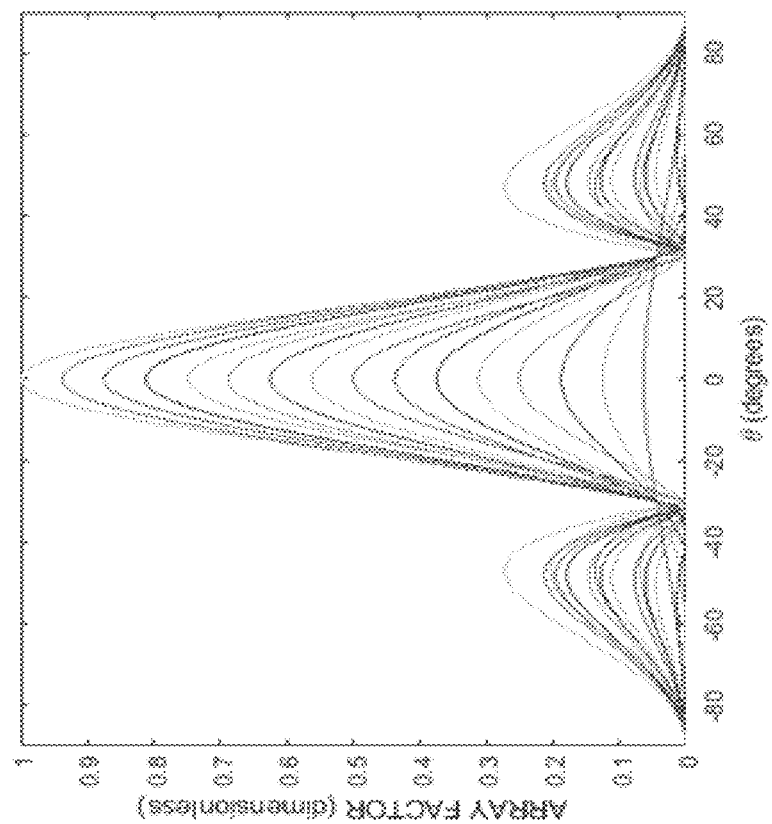
Figure 11C:
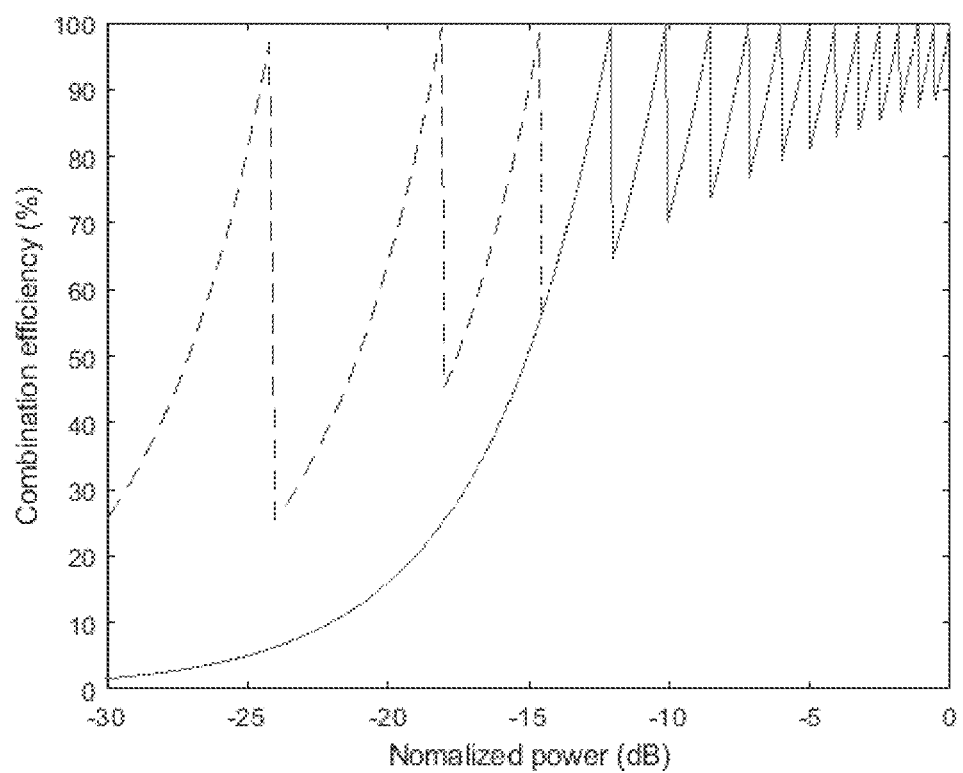
FIG. 11C depicts the outphasing system efficiency of the example 4×4 antenna array with 4-level antenna elements with 16 levels and 13 levels, according to various example embodiments of the present invention.

By way of an example, FIG. 10 depicts a transition sequence of an example 4×4 antenna array with 4-level antenna elements (i.e., 4-level at each antenna element), according to various example embodiments of the present invention. As shown in FIG. 10, the antenna array has a total of 16 levels (output amplitude levels, e.g., level 1 to level 16). The dynamic array factors of 16 levels and 13 levels (e.g., level 4 to level 16) at $\phi=0$ in FIGS. 11A and 11B respectively, and their outphasing system efficiency is illustrated in FIG. 11C. From these figures, it can be observed that the 16-level transition have more variation of $\theta$ at the minimum output when the lowest 4 levels (e.g., level 1 to level 4) transit are as described in FIGS. 8 and 10, but the amplitude variation is very limited since the output power is low in the last 4 levels. The $\theta$ at the minimum output of the 13-level transition is almost consistent with the traditional antenna array. As shown in FIG. 11C, both transitions have the same combination efficiency at same transitions levels, and the 16-level transition have a higher average combination efficiency.

Figure 12:
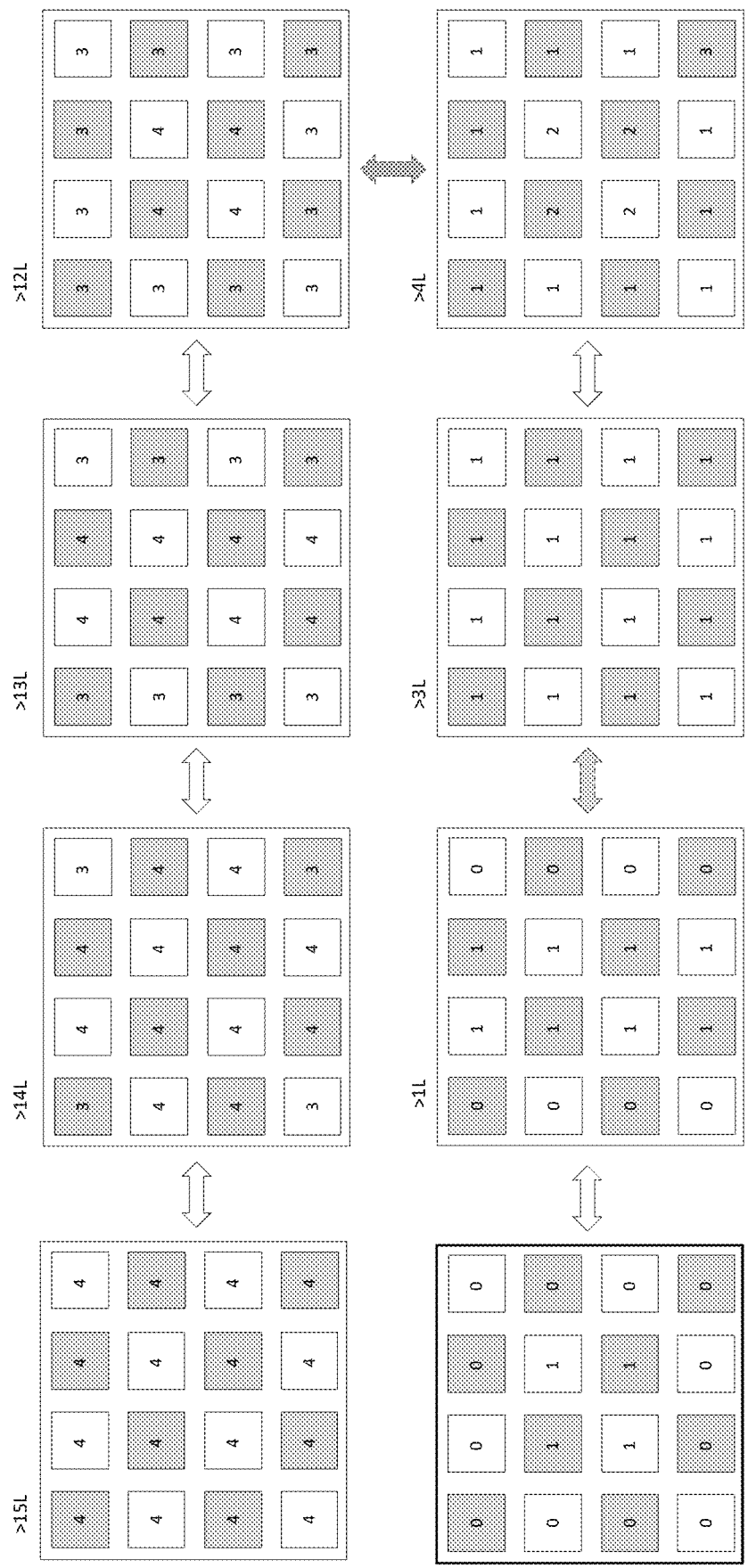
FIG. 12 depicts another example transition sequence of the example 4×4 array with 4-level antenna element, according to various example embodiments of the present invention.

By way of another example, FIG. 12 depicts another example transition sequence of the example 4×4 array with 4-level antenna element, according to various example embodiments of the present invention. With this transition sequence, the antenna array is able to concentrate more energy in the horizontal direction, and by turning the antenna array 90°, the antenna array is able to concentrate more energy in the vertical direction. Accordingly, both transition sequences shown in FIGS. 10 and 12 can help the sector beam scan and management of 5G New Radio base station.

It will be understood by a person skilled in the art that although the above-described antenna array configuration (e.g., as shown in FIG. 7) has a square 4×4 antenna array configuration, the antenna array configuration may have any shape or size configuration (e.g., with any number of rows and columns) as desired or as appropriate as long as the antenna array has a symmetrical configuration in a 2D plane (i.e., the antenna elements are symmetrically arranged in a 2D plane). If both m and n are odd number in a m×n antenna array, the number of antenna elements of the first subarray 606a would be different from the number of antenna elements of the second subarray 606b, but the sum of weightings of antenna elements of each subarray is the same. That is, the total output weighting of the first subarray 606a and the total output weighting of the second subarray 606b are the same.

Figure 13:
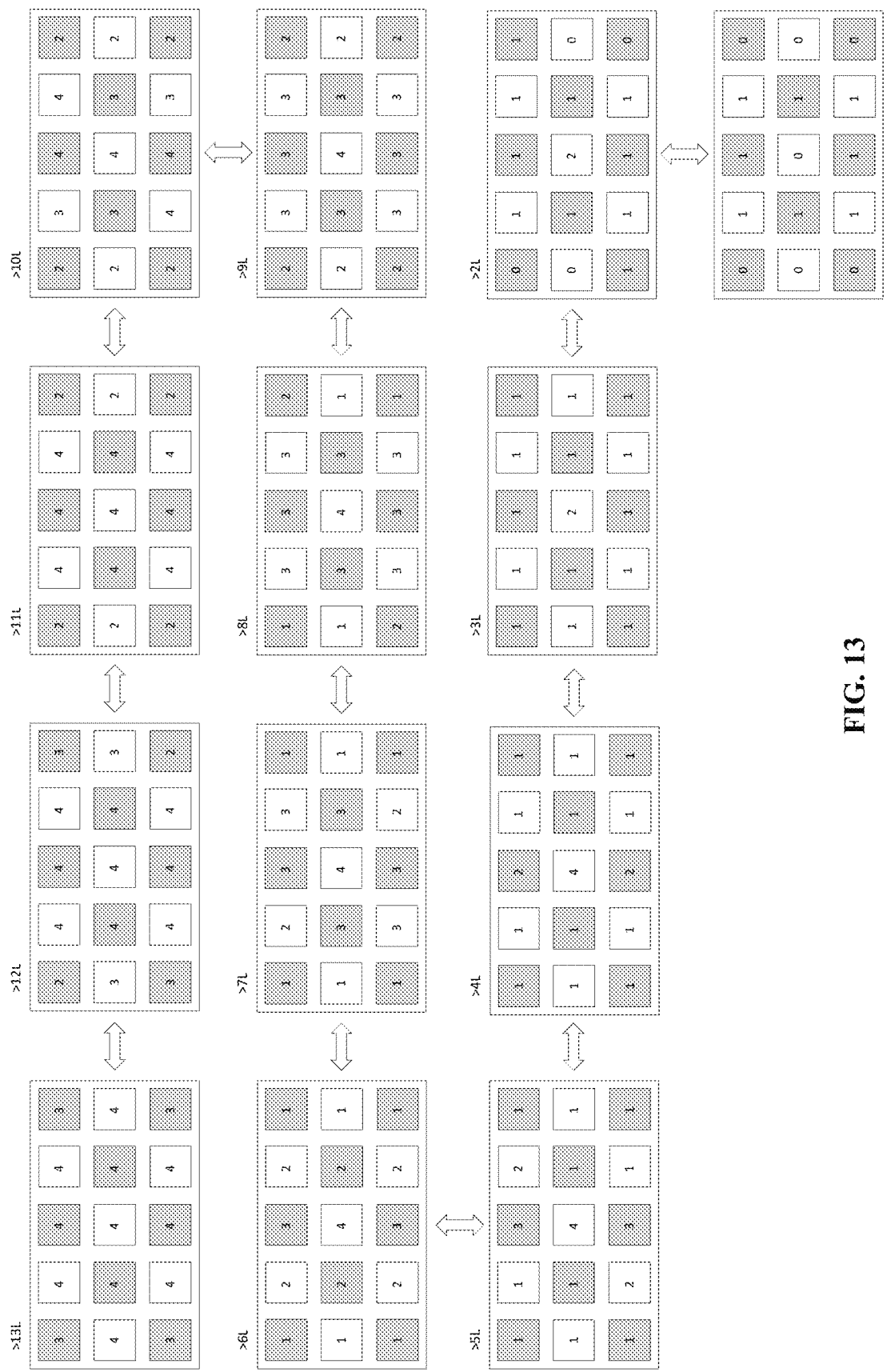
FIG. 13 depicts an example transition sequence of an example 3×5 antenna array with 4-level elements, according to various example embodiments of the present invention.

By way of examples, FIG. 13 depicts an example transition sequence of an example 3×5 antenna array (odd numbers of rows and columns) with 4-level elements, according to various example embodiments of the present invention. In this case, the reference point is an antenna element of the white subarray 606b at a center thereof. In various example embodiments, the transition may stop at greater than level 3 (>3L) to keep all antenna elements on or continue to turn off certain antenna elements. It will be understood by a person skilled in the art that although the example antenna array shown in FIG. 13 is a rectangular 3×5 antenna array, the antenna array may also be any odd number of rows and columns.

Figure 14E:
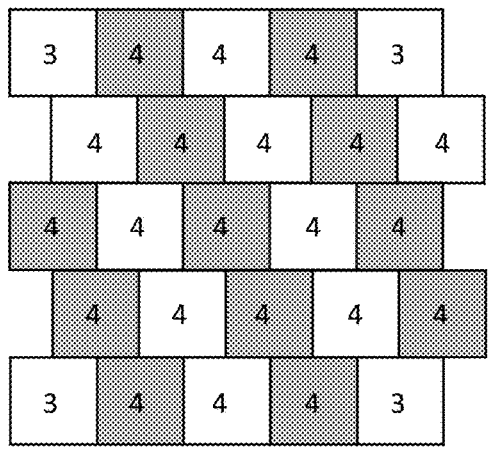
Figure 14F:
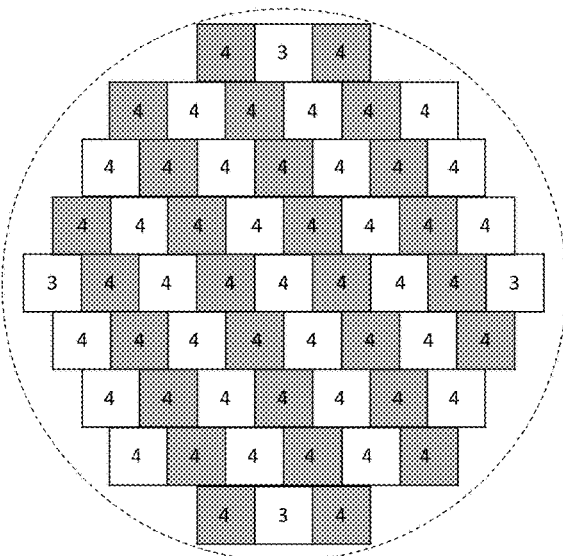
Figure 14G:
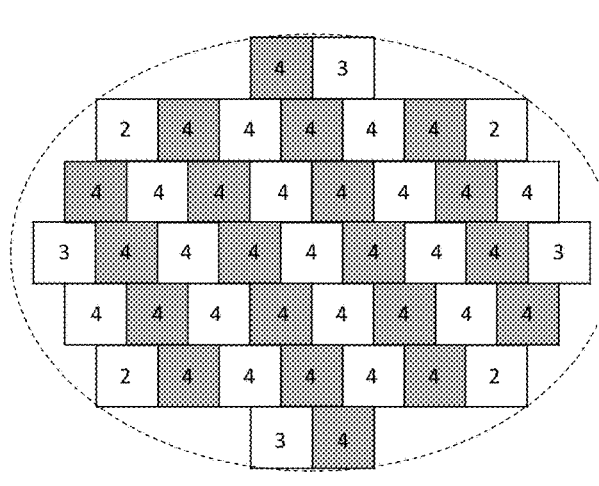
Figure 14H:
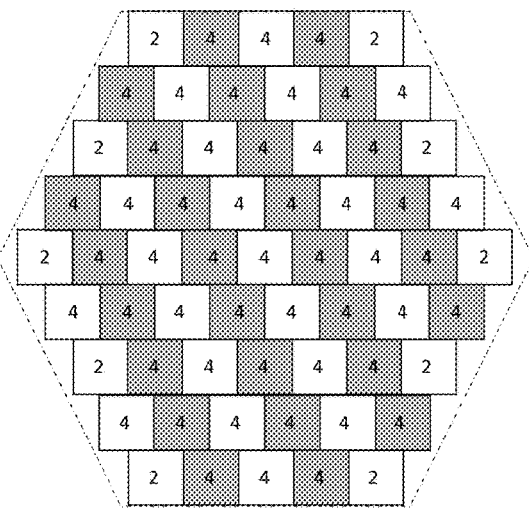

By way of further examples, besides rectangular antenna array and linear antenna array, FIGS. 14A to 14H show a number of different example antenna array configurations with multilevel concentric antenna element pairs, whereby each multilevel antenna element is an example 4-level antenna element, according to various example embodiments of the present invention. In particular, FIG. 14A depicts a schematic drawing of an example uniform circular antenna array, FIG. 14B depicts a schematic drawing of an example concentric circular antenna array, FIG. 14C depicts a schematic drawing of an example circular planar antenna array, FIG. 14D depicts a schematic drawing of an example elliptical planar antenna array, and FIG. 14E depicts a schematic drawing of an example triangular lattice rectangular antenna array, FIG. 14F depicts a schematic drawing of a triangular lattice circular planar antenna array, FIG. 14G depicts a schematic drawing of an example triangular lattice elliptical planar antenna array, and FIG. 14H depicts a schematic drawing of an example uniform hexagonal antenna array. Accordingly, as can be seen, in various example embodiments, the antenna elements of the first subarray (e.g., gray subarray) 606a and the antenna elements of the second subarray (e.g., white subarray) 606b are alternately arranged in at least one direction along the 2D plane, such as a circular direction as shown in FIG. 14A, a radial direction as shown in FIG. 14B, both horizontal and vertical directions as shown in FIGS. 14C and 14D, and a horizontal direction as shown in FIGS. 14E to 14H.

In the antenna array configurations shown in FIGS. 14E to 14H, the number of antenna elements in the two subarrays 606a, 606b may not be equal, and thus, certain antenna elements level may be adjusted to balance the total output weighing level of both subarrays (i.e., such that the total output weighting of the first (gray) subarray 606a and the total output weighting of the second (white) subarray 606b are the same). In various example embodiments, as shown in FIGS. 14E to 14H, the lower level antenna elements (i.e., antenna elements having less or the least levels) may be arranged along an edge portion of the antenna array 604. In the above example antenna array configurations, similarly, transitions start from the concentric subarray element pairs along an edge portion of the antenna array to the center portion of the antenna array when the output amplitude decreases, and vice versa when the output amplitude increases.

Figure 15:
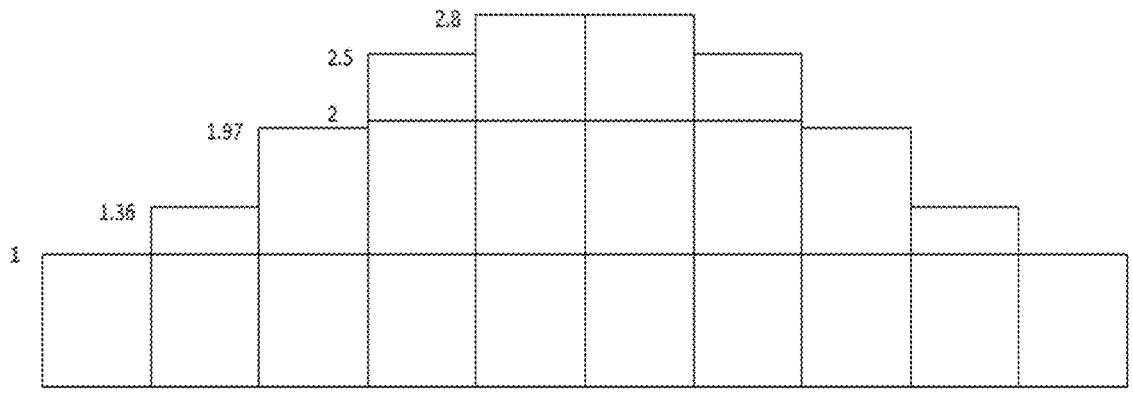
FIG. 15 depicts a schematic drawing illustrating an example non-uniform level distribution of 10 symmetric antenna elements with Dolph-Tschebyscheff distribution, according to various example embodiments of the present invention.

In various example embodiments, although the transition levels associated with the antenna elements of an antenna array described above are uniformly distributed, it will be appreciated that non-uniform distribution may also be implemented. By way of an example only and without limitation, FIG. 15 depicts a schematic drawing illustrating an example non-uniform level distribution of 10 symmetric antenna elements with Dolph-Tschebyscheff distribution.

In various example embodiments, in the MIMO application, the antenna array size may be configured or reconfigurable based on the required beamwidth and sidelobe level. In various example embodiments, the maximum output amplitude level of each antenna element can be selected between 1 to the maximum available output amplitude level based on the required output power.

Figure 16:
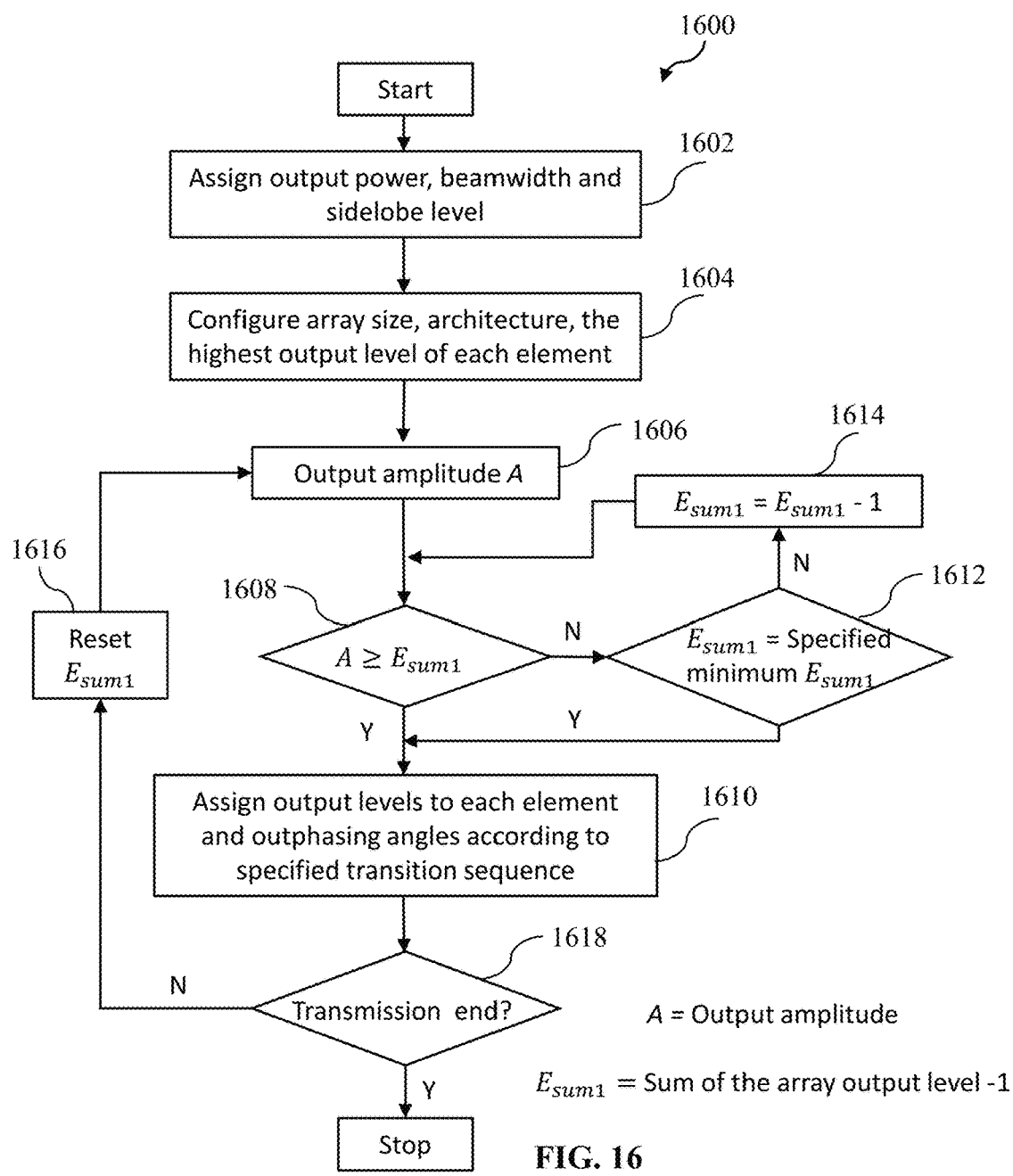
FIG. 16 depicts a flow diagram of an outphasing spatial modulation method using an antenna array, according to various example embodiments of the present invention.

FIG. 16 depicts a flow diagram of an outphasing spatial modulation method 1600 using an antenna array according to various example embodiments of the present invention. The method 1600 comprises: assigning (at 1602) output power, beamwidth and sidelobe level;

and configuring (at 1604) the antenna array size, architecture, the highest output amplitude level of the antenna array and of each antenna element. For example, the antenna array size may be configured based on the required beamwidth. For example, the highest output amplitude level of the antenna array may be configured based on the required output power. For example, based on the side level requirement, the output amplitude level of each antenna element may be defined according to its taper values. At 1606, the output amplitude (A) (amplitude of the output signal to be formed in space by the antenna array based on an input signal) may be determined. At 1608, it is determined whether the output amplitude (A) is determined to be greater than or equal to the current output amplitude level (e.g., corresponding to a sum of the current output amplitude levels of the plurality of antenna elements) of the antenna array minus 1 ($E_{sum1}$). If so, at 1610, a plurality of output amplitude levels determined for the plurality of antenna elements may be assigned to the plurality of antenna elements, respectively. In addition, a first signal may be sent to antenna elements of the first subarray and a second signal may be sent to antenna elements of the second subarray for transmission therefrom to form a combined signal in space. In this regard, the first and second signals are complementary constant envelop outphasing signals. If not, at 1612, it is determined whether the current output amplitude level of the antenna array minus 1 ($E_{sum1}$) is equal to a specified or predefined minimum output amplitude level of the antenna array minus 1 ($E_{sum1}$). If so, the method 1600 proceeds to 1610. If not, at 1614, the current output amplitude level of the antenna array minus 1 ($E_{sum1}$) may be decreased to an immediately preceding output amplitude level (e.g., by 1) (or equivalently, the current output amplitude level of the antenna array may be decreased to an immediately preceding output amplitude level), and the method 1600 loops back to 1608. At 1618, if transmission by the antenna array ends, the method 1600 may thus stop. On the other hand, if transmission by the antenna array is to continue, at 1616, the current output amplitude level of the antenna array may be reset to a predefined highest output amplitude level of the antenna array minus 1 and the method 1600 loops back to 1606 to obtain the amplitude (A) of a new output signal to be formed in space by the antenna array based on a new input signal. For example, at 1616, in an example 4-level 4×4 antenna array, it may have 16 levels (e.g., level 1 to level 16) whereby the highest output amplitude level is level 16. In this regard, the current output amplitude level of the antenna array may be reset to the highest output amplitude level minus 1 (e.g., corresponding to level 15) because the highest output amplitude level and cannot be exceeded, and thus, the current output amplitude level of the antenna array may be reset to level 15.

Linear Spatial Modulator

Figure 17:
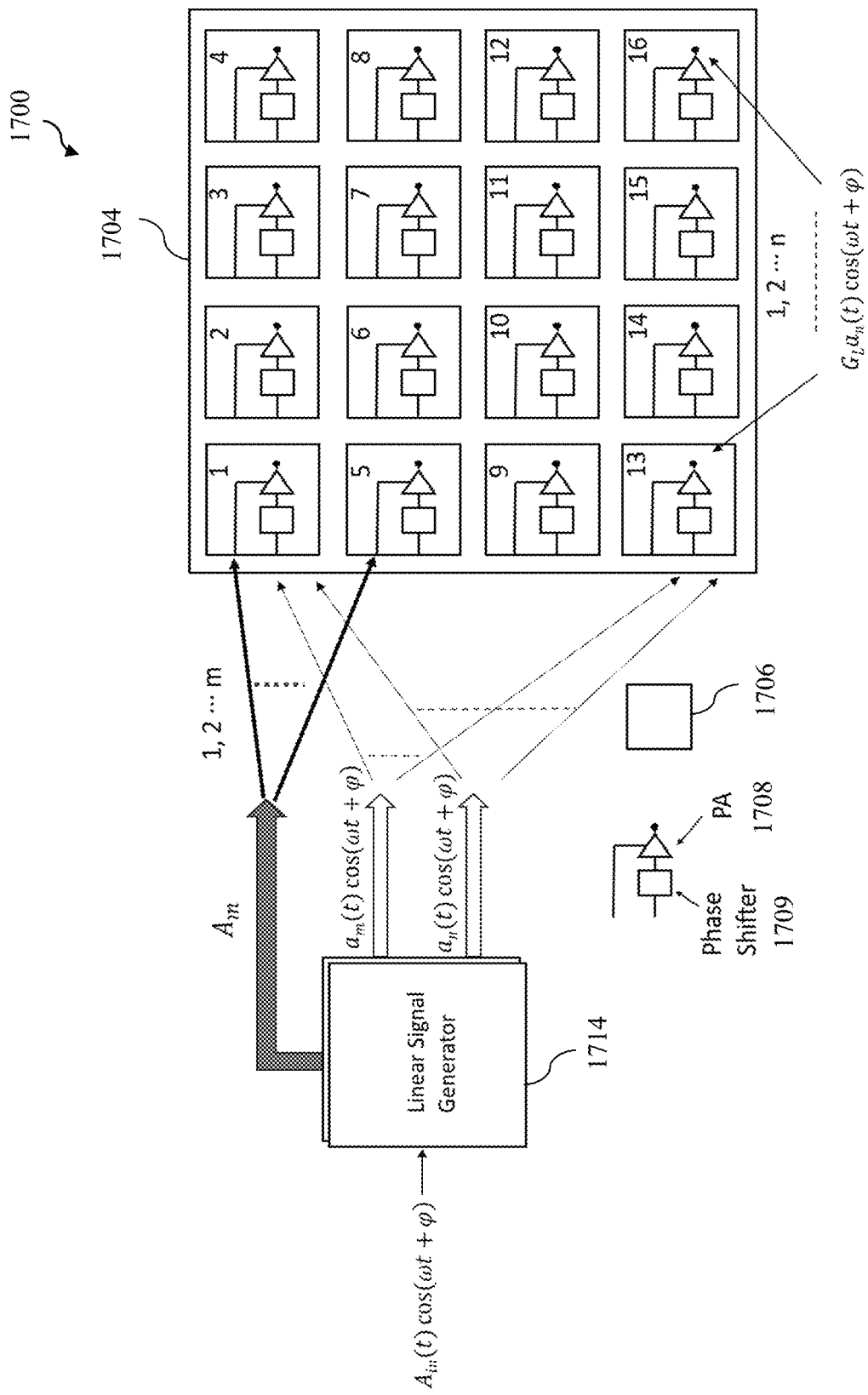
FIG. 17 depicts a schematic drawing of a linear spatial modulation system, according to various example embodiments of the present invention.

FIG. 17 depicts a schematic drawing of a linear spatial modulation system 1700 (which may also be referred to as a linear spatial modulator) according to various example embodiments of the present invention. The linear spatial modulation system 1700 comprises: an antenna array 1704 comprising a plurality of antenna elements 1706 having a plurality of power amplifiers 1708 communicatively coupled thereto, respectively; a linear signal generator 1714 (e.g., comprising a memory and at least one processor communicatively coupled to the memory and the antenna array 1704), and configured to perform a method of linear spatial modulation. In various example embodiments, the plurality of power amplifiers 1708 may be communicatively coupled to a plurality of phase shifter 1709, respectively, as shown in FIG. 17. In various example embodiments, the linear signal generator 1714 is configured to: determine an amplitude of an output signal to be formed in space by the antenna array 1704 based on an input signal (e.g., $A_{in}(t) \cos(\omega(t)+\varphi)$); determine a plurality of output amplitude levels ($A_m$) for the plurality of antenna elements 1706, respectively, based on the amplitude of the output signal and a current output amplitude level of the antenna array 1704; generate a plurality of first signals (e.g., constant envelop signals $a_m(t)\cos(\omega(t)+\varphi)$) for a first subarray of the antenna array 1704 and a plurality of second signals (e.g., linear signals $a_n(t)\cos(\omega(t)+\varphi)$) for a second subarray of the antenna array 1704 based on the input signal; assign the plurality of output amplitude levels ($A_m$) determined to the plurality of power amplifiers 1708 of the plurality of antenna elements 1706, respectively; and send the plurality of first signals to antenna elements, respectively, of the first subarray (e.g., through the corresponding phase shifter 1709 and the corresponding power amplifier 1708) and send the plurality of second signals to antenna elements, respectively, of the second subarray for transmission therefrom to form a combined signal (i.e., the above-mentioned output signal) in space.

In various example embodiments, the current output amplitude level of the antenna array 1704 corresponds to a candidate output amplitude level of an ordered set of candidate output amplitude levels configured for the antenna array 1704 (i.e., multilevel antenna array) based on an output amplitude range of the antenna array 1704. In particular, the first subarray comprises one or more first concentric antenna element pairs and the second subarray comprises one or more second concentric antenna element pairs.

In particular, the method 1700 further comprises dynamically configuring the first subarray comprising the one or more first concentric antenna element pairs and the second subarray comprises the one or more second concentric antenna element pairs based on which candidate output amplitude level of the ordered set of candidate output amplitude levels configured for the antenna array the current output amplitude level of the antenna array corresponds to. In this regard, the plurality of first signals are a plurality of constant envelop signals and are sent to the radiating elements, respectively, of the first subarray. The plurality of second signals are a plurality of linear signals and are sent to the radiating elements, respectively, of the second subarray.

By way of an example only and without limitation, FIG. 17 depicts a linear spatial modulator 1700 having an example 4×4 antenna array 1704. In various example embodiments, the linear signal generator 1714 may be configured to generate m multilevel signals $a_m \cos(\omega t+\varphi)$ (corresponding to the above-mentioned plurality of first signals or the above-mentioned plurality of constant envelop signals) and n linear signals $a_n \cos(\omega t+\varphi)$ (corresponding to the above-mentioned plurality of second signals or the above-mentioned plurality of linear signals), and these signals are respectively sent to the power amplifiers 1708 of the corresponding antenna elements 1706. The total voltage output (output amplitude) (A(t)) of the power amplifiers of the antenna elements 1706 may be expressed as $A(t)=A_1+\ldots+A_m+G_L(a_1(t)+\ldots+a_n(t))$, where $G_L$ is the gain of the power amplifiers operating in linear amplification mode. Accordingly, A(t) may be determined as the amplitude of the output signal to be formed in space by the antenna array based on the input signal. In the example 4×4 antenna array 1704, m+n=16, that is, the number of antenna elements in the antenna array 1704 is 16.

Figure 18:
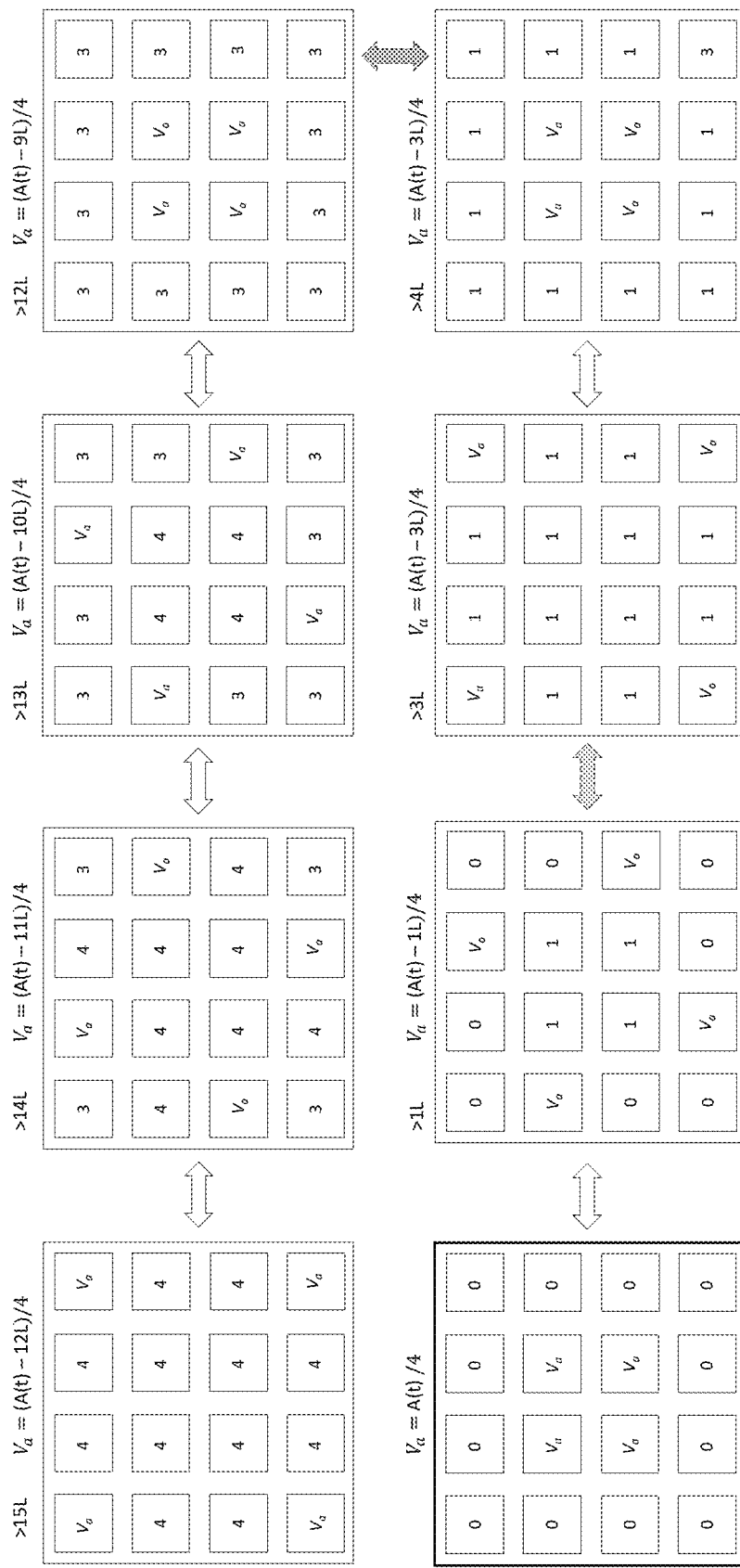
FIGS. 18 and 19 depict two example transition sequences of the example 4×4 antenna array with 4-level antenna elements, according to various example embodiments of the present invention.
Figure 19:
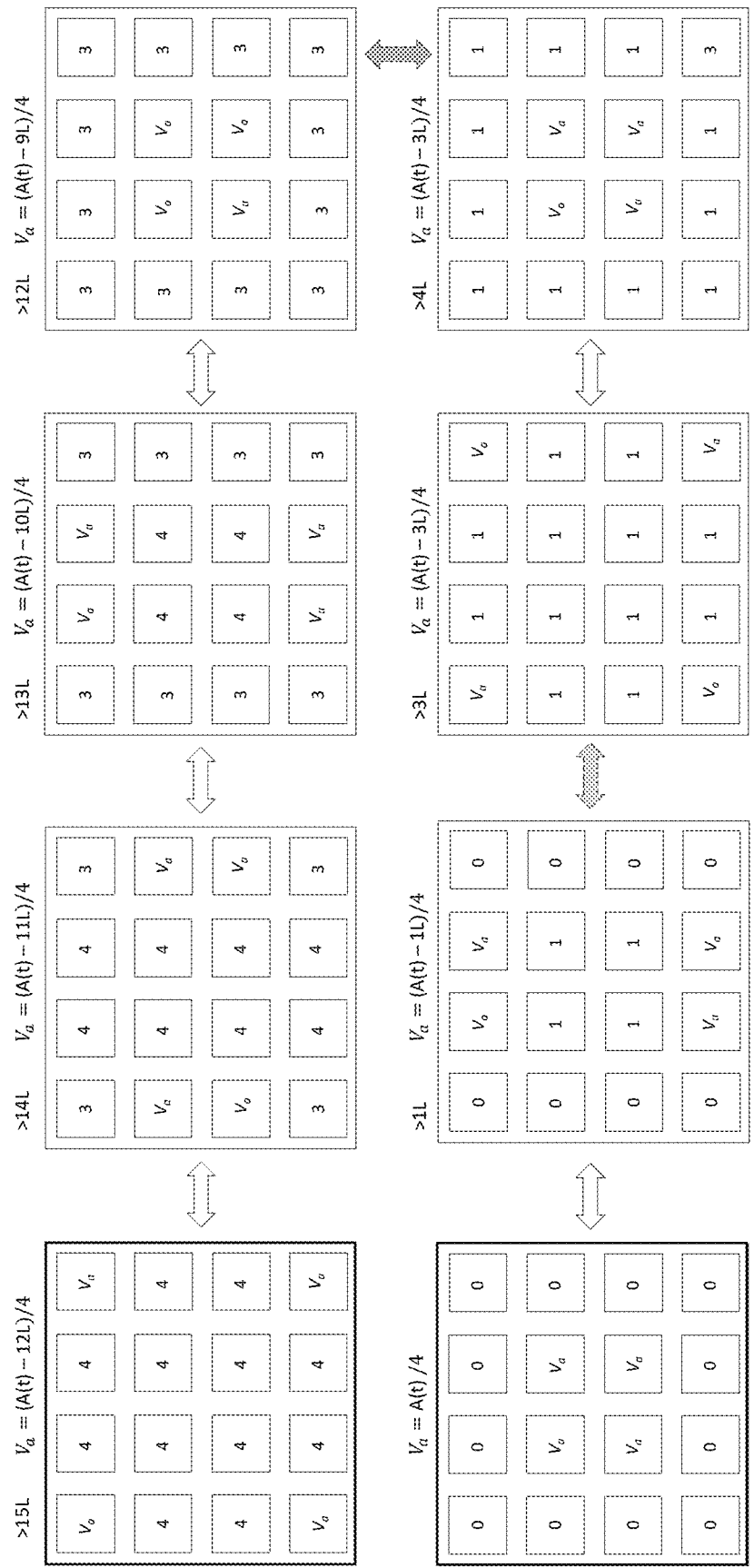

By way of examples only and without limitations, FIGS. 18 and 19 depict two example transition sequences of the example 4×4 antenna array 1704 with 4-level antenna elements. As can be seen in FIGS. 18 and 19, two concentric antenna element pairs (labelled as $V_a$) transmit linear signals (e.g., corresponding to the above-mentioned plurality of second signals for the second subarray of the antenna array 1704) and the remaining antenna elements of the antenna array 1704 transmit constant envelop multilevel signals (e.g., corresponding to the above-mentioned plurality of first signals for the first subarray of the antenna array 1704). In various example embodiments, as shown in FIGS. 18 and 19, the transitions start from the concentric subarray element pairs along an edge portion of the antenna array 1704 to the center portion of the antenna array 1704 when the output amplitude decreases, and vice versa when the output amplitude increases. Accordingly, as can be seen from FIGS. 18 and 19, both the first subarray comprising the one or more first concentric antenna element pairs and the second subarray comprises the one or more second concentric antenna element pairs are dynamically configured based on which candidate output amplitude level of the ordered set of candidate output amplitude levels configured for the antenna array the current output amplitude level of the antenna array 1704 corresponds to.

Similarly, as described hereinbefore for the outphasing spatial modulator 600, the number of rows and columns of the antenna array 1704 can be any number as desired or as appropriate (e.g., any even or odd number). Similarly, the maximum output amplitude level of each antenna element 1706 can be selected between one to the maximum available output level based on the required output power.

Figure 20:
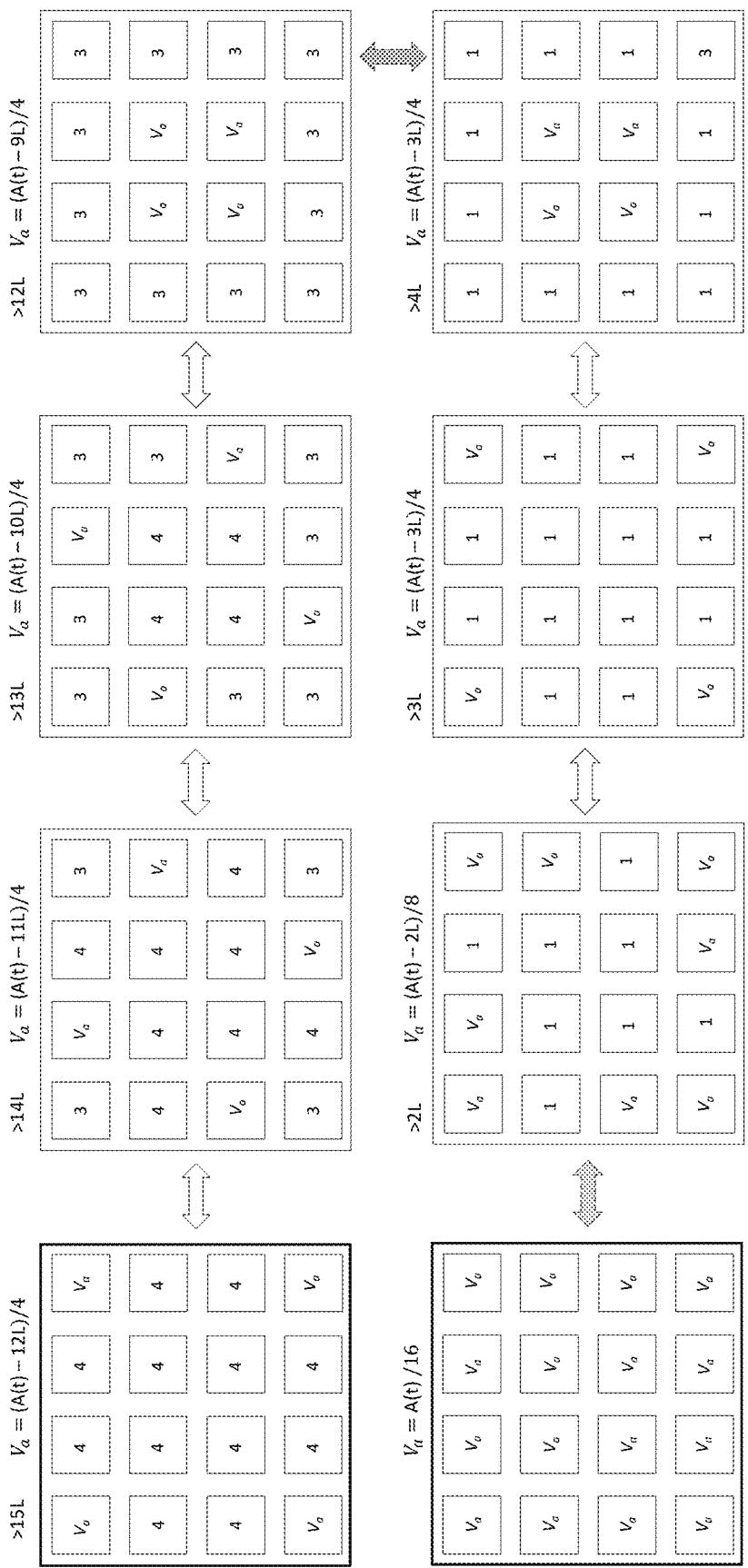
FIGS. 20 and 21 depict two other example types of transition sequence the example 4×4 antenna array with 4-level antenna elements that keeps each antenna element on, according to various example embodiments of the present invention.
Figure 21:
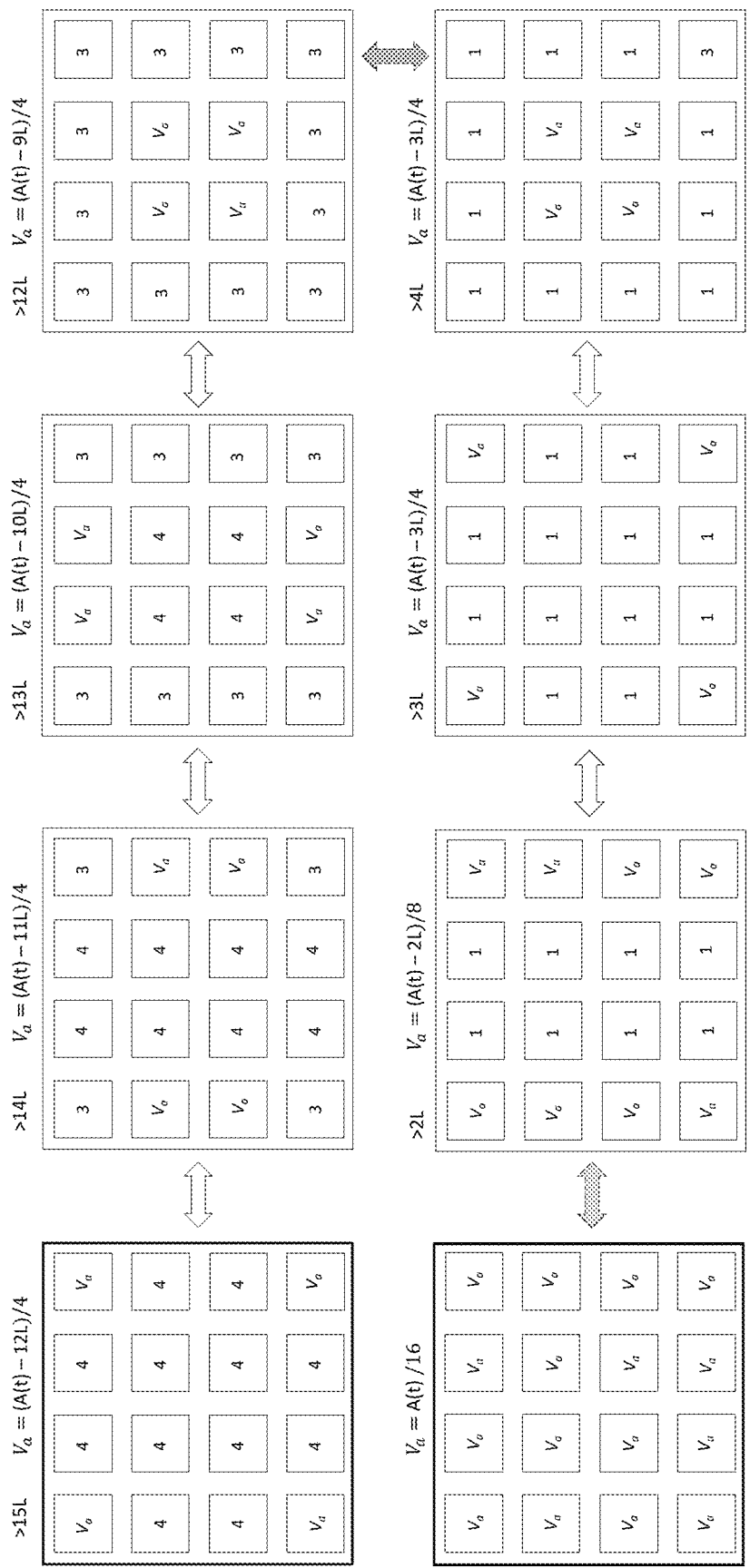
Figure 22:
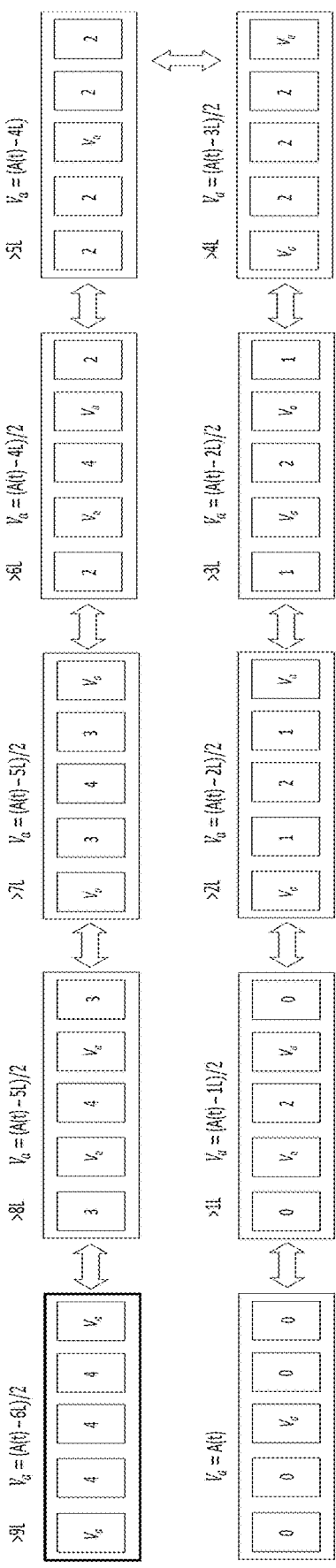
FIGS. 22 and 23 depict two example transition sequences of a 1×5 antenna array with 4-level antenna elements and one linear concentric transition pair, according to various example embodiments of the present invention.
Figure 23:
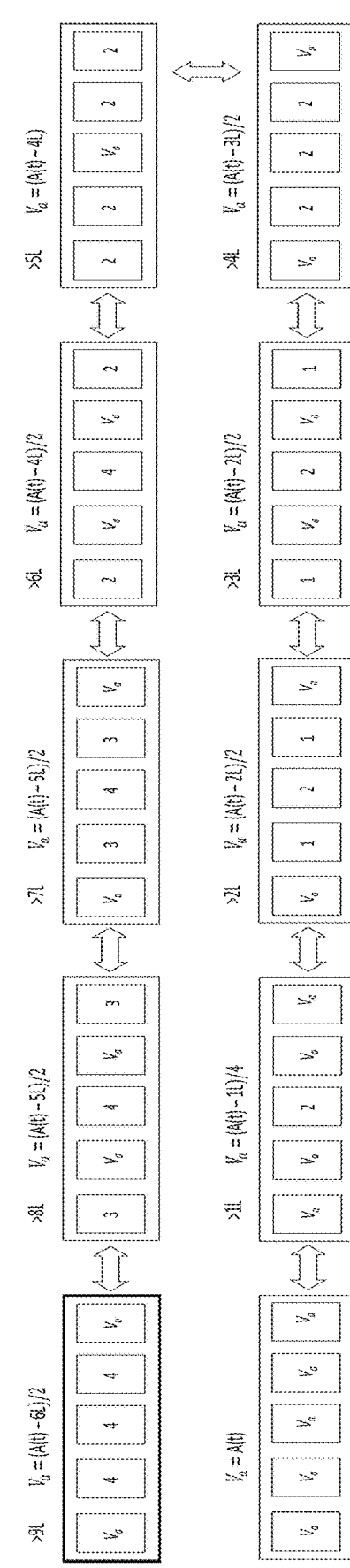

By way of examples only and without limitations, FIGS. 20 and 21 depict two other example types of transition sequence the example 4×4 antenna array 1704 with 4-level antenna elements that keeps each antenna element on. The null point of the array pattern remains constant. By way of examples only and without limitations, FIGS. 22 and 23 depict two example transition sequences of a 1×5 antenna array with 4-level antenna elements and one linear concentric transition pair. In these two example transition sequences, the maximum output of each concentric antenna element pair is 4L and the maximum output of the 1×5 antenna array is 10L.

By way of further examples, besides rectangular antenna array and linear antenna array, FIGS. 24A to 24H show a number of different example array configurations with multilevel concentric antenna element pairs, with each multilevel antenna element being an example 4-level antenna element, according to various example embodiments of the present invention. In particular, FIG. 24A depicts a schematic drawing of a uniform circular antenna array, FIG. 24B depicts a schematic drawing of a concentric circular antenna array, FIG. 23C depicts a schematic drawing of a circular planar antenna array, FIG. 24D depicts a schematic drawing of an elliptical planar antenna array, FIG. 24E depicts a schematic drawing of a triangular lattice rectangular antenna array, FIG. 24F depicts a schematic drawing of a triangular lattice circular planar antenna array, FIG. 24G depicts a schematic drawing of a triangular lattice elliptical planar antenna array, and FIG. 24H depicts a schematic drawing of a uniform hexagonal antenna array.

Figure 25:
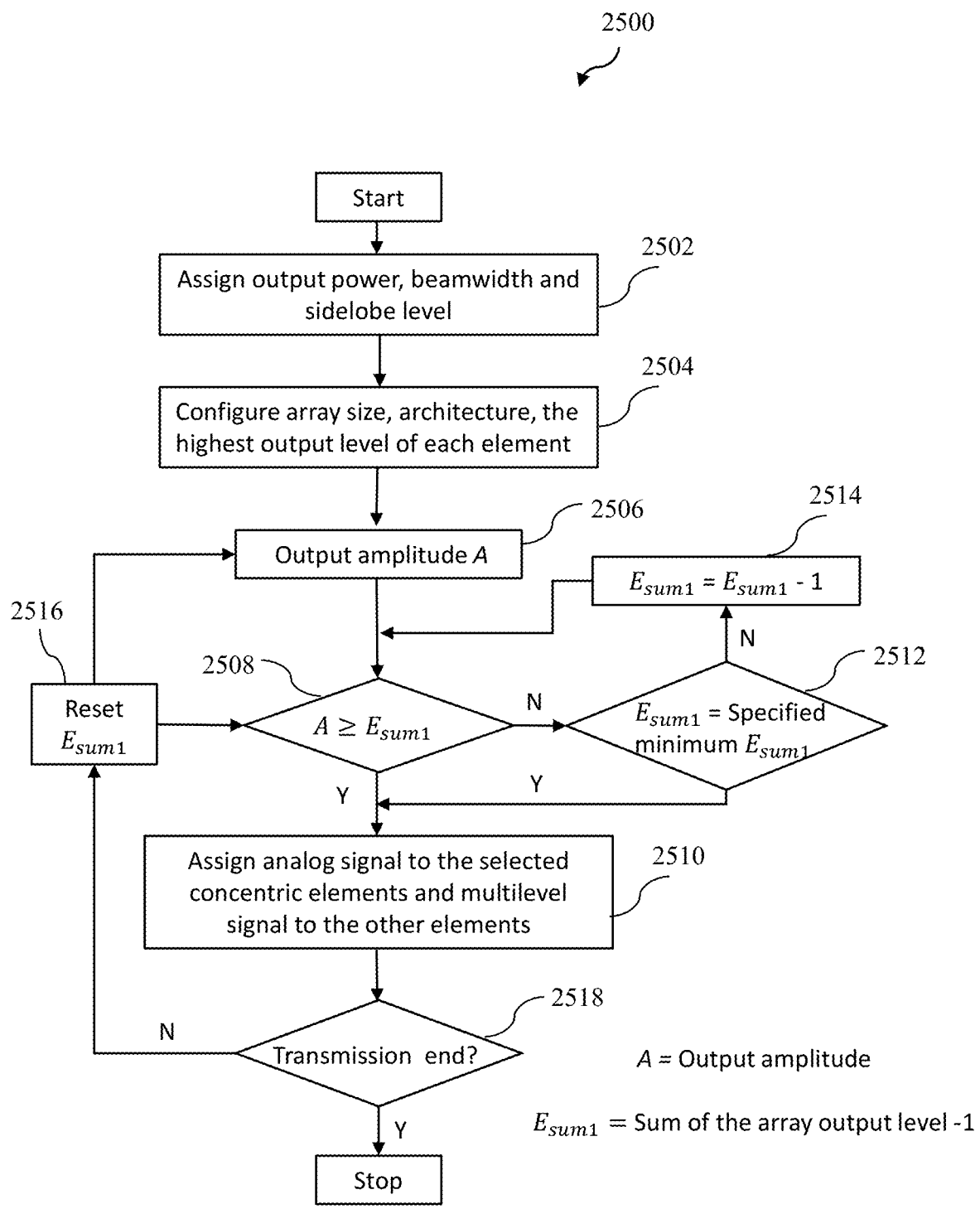
FIG. 25 depicts a flow diagram of a linear spatial modulation method using an antenna array, according to various example embodiments of the present invention.

FIG. 25 depicts a flow diagram of a linear spatial modulation method 2500 using an antenna array 1704 according to various example embodiments of the present invention. The method 2500 comprises: assigning (at 2502) output power, beamwidth and sidelobe level; and configuring (at 2504) the antenna array size, architecture, the highest output amplitude level of the antenna array and of each antenna element. For example, the antenna array size may be configured based on the required beamwidth. For example, the highest output amplitude level of the antenna array may be configured based on the required output power. For example, based on the side level requirement, the output amplitude level of each antenna element may be defined according to its taper values. At 2506, the output amplitude (A) (amplitude of the output signal to be formed in space by the antenna array based on an input signal) may be determined. At 2508, it is determined whether the output amplitude (A) is determined to be greater than or equal to the current output amplitude level (e.g., corresponding to a sum of the current output amplitude levels of antenna elements) of the antenna array minus 1 ($E_{sum1}$). If so, at 2510, a plurality of output amplitude levels determined may be assigned to the plurality of antenna elements, respectively. In addition, a plurality of first signals (constant envelop signals) may be sent to antenna elements, respectively, of the first subarray and a plurality of second signals (linear signals) may be sent to antenna elements, respectively, of the second subarray for transmission therefrom to form a combined signal in space. If not, at 2512, it is determined whether the current output amplitude level of the antenna array minus 1 ($E_{sum1}$) is equal to a specified or predefined minimum output amplitude level of the antenna array minus 1 ($E_{sum1}$). If so, the method 2500 proceeds to 2510. If not, at 2514, the current output amplitude level of the antenna array minus 1 ($E_{sum1}$) may be decreased to an immediately preceding output amplitude level (e.g., by 1) (or equivalently, the current output amplitude level of the antenna array may be decreased to an immediately preceding output amplitude level), and the method 2500 loops back to 2508. At 2518, if transmission by the antenna array ends, the method 2500 may thus stop. On the other hand, if transmission by the antenna array is to continue, at 2516, the current output amplitude level of the antenna array may be reset to a predefined highest output amplitude level of the antenna array minus 1 and the method 2500 loops back to 2506 to obtain the amplitude (A) of a new output signal to be formed in space by the antenna array based on a new input. As described hereinbefore, at 2510, the first subarray comprising the one or more first concentric antenna element pairs and the second subarray comprises the one or more second concentric antenna element pairs are dynamically configured based on which candidate output amplitude level of the ordered set of candidate output amplitude levels configured for the antenna array the current output amplitude level of the antenna array corresponds to.

Similarly, as described hereinbefore for the outphasing spatial modulator 600, in the above examples, transitions start from the concentric subarray element pairs along an edge portion to the center portion of the antenna array when the output amplitude decreases, and the opposite when the output amplitude increases. Furthermore, although the transition levels associated with the antenna elements of an antenna array 1704 are uniformly distributed, it will be appreciated that non-uniform distribution may also be implemented as described hereinbefore with reference to FIG. 15.

Quadrature Spatial Modulator

Figure 26:
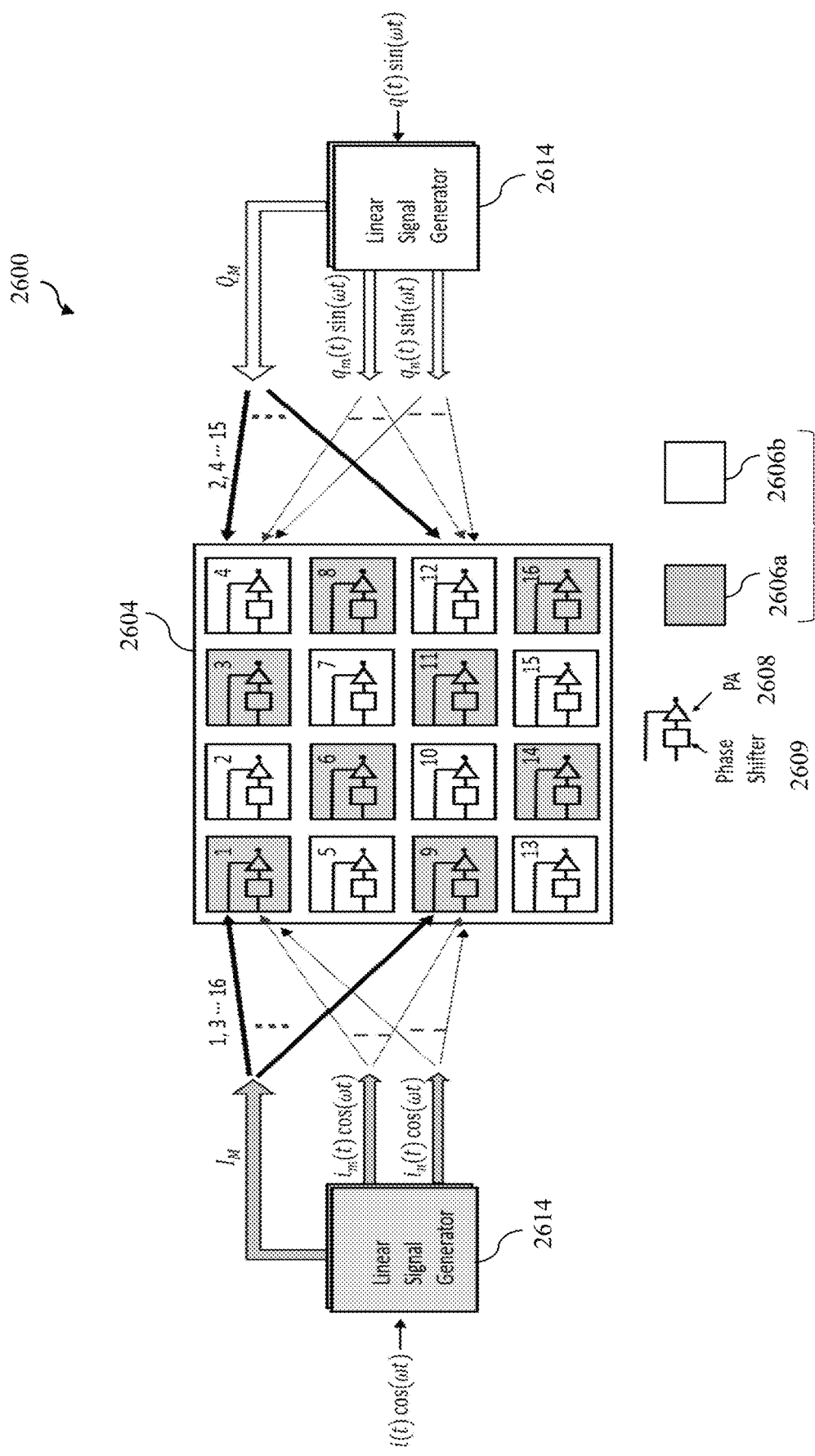
FIG. 26 depicts a schematic drawing of a quadrature spatial modulation system, according to various example embodiments of the present invention.

FIG. 26 depicts a schematic drawing of a quadrature spatial modulation system (which may also be interchangeably referred to as a quadrature spatial modulator) 2600 according to various example embodiments of the present invention. The quadrature spatial modulation system 2600 comprises: an antenna array 2604 comprising a plurality of antenna elements 2606 having a plurality of power amplifiers 2608 communicatively coupled thereto, respectively; a linear signal generator 2614 (e.g., comprising a memory and at least one processor communicatively coupled to the memory and the antenna array 2604), and configured to perform a method of quadrature spatial modulation. In various example embodiments, the two linear signal generators shown in FIG. 26 are the same linear signal generator but just shown at two locations for the inphase (I) and the quadrature (Q) components, respectively, for better illustration. In various example embodiments, the plurality of power amplifiers 2608 may be communicatively coupled to a plurality of phase shifter 2609, respectively, as shown in FIG. 26.

In various example embodiments, the linear signal generator 2614 is configured to: determine an amplitude of an output signal to be formed in space by the antenna array 2604 based on an input signal (a modulation signal comprising an inphase signal component ($i(t)\cos(\omega(t))$) and a quadrature signal component ($q(t)\cos(\omega(t))$). In this regard, since the input signal comprises inphase signal component and a quadrature signal component, the amplitude of the output signal comprises an amplitude of an output inphase signal component to be formed in space by the subarray 2606a (which may be referred to herein as inphase subarray)

and an amplitude of an output quadrature signal component to be formed in space by the subarray 2606b (which may be referred to herein as quadrature subarray). The linear signal generator 2614 is further configured to determine a plurality of output amplitude levels ($I_M$ for antenna elements of the inphase subarray 2606a, $Q_M$ for antenna elements of the quadrature subarray 2606b) for the plurality of antenna elements 2606, respectively, based on the amplitude of the output signal (the amplitude of the output inphase signal component for the inphase subarray 2606a and the amplitude of the output quadrature signal component for the quadrature subarray 2606b) and a current output amplitude level of the antenna array 2604 (the current output amplitude level of the inphase subarray 2606a for determining output amplitude levels for antenna elements of the inphase subarray 2606a and the current output amplitude level of the quadrature subarray 2606b for determining output amplitude levels for antenna elements of the quadrature subarray 2606b); generate a plurality of first signals ($i_m(t)\cos(\omega(t))$) for a first subarray of the antenna array 2604 and a plurality of second signals ($i_n(t)\cos(\omega(t))$) for a second subarray of the antenna array 2604 based on the input signal (more particularly, the inphase signal component $i(t)\cos(\omega(t))$; generate a plurality of third signals ($q_m(t)\sin(\omega(t))$) for a third subarray of the antenna array and a plurality of fourth signals ($q_n(t)\sin(\omega(t))$) for a fourth subarray of the antenna array based on the input signal (more particularly, the quadrature signal component $q(t)\sin(\omega(t))$; assign the plurality of output amplitude levels (IM for antenna elements of the inphase subarray 2606a and QM for antenna elements of the quadrature subarray 2606b) determined to the plurality of power amplifiers 2608 of the plurality of antenna elements 2606, respectively; and send the plurality of first signals to antenna elements, respectively, of the first subarray (e.g., through the corresponding phase shifter 2609 and the corresponding power amplifier 2608), send the plurality of second signals to antenna elements, respectively, of the second subarray, send the plurality of third signals to radiating elements, respectively, of the third subarray and send the plurality of fourth signals to radiating elements, respectively, of the fourth subarray for transmission therefrom to form a combined signal (i.e., the above-mentioned output signal comprising an output inphase signal component and an output quadrature signal component) in space. In various example embodiments, the inphase subarray 2606a comprises the above-mentioned first and second subarrays and the quadrature subarray 2606b comprises the above-mentioned third and fourth subarrays.

In various example embodiments, the current output amplitude level of the antenna array comprises a current inphase output amplitude level of the inphase subarray 2606a comprising the first and second subarrays corresponding to a candidate inphase output amplitude level of an ordered set of candidate inphase output amplitude levels configured for the inphase subarray 2606a based on an output amplitude range of the inphase subarray 2606a, and a current quadrature output amplitude level of the quadrature subarray 2606b comprising the third and fourth subarrays corresponding to a candidate quadrature output amplitude level of an ordered set of candidate quadrature output amplitude levels configured for the quadrature subarray 2606b based on an output amplitude range of the quadrature subarray 2606b. In particular, the above-mentioned first subarray comprises one or more first concentric antenna element pairs, the above-mentioned second subarray comprises one or more second concentric antenna element pairs, the above-mentioned third subarray comprises one or more third concentric radiating element pairs and the above-mentioned fourth subarray comprises one or more fourth concentric radiating element pairs.

In various example embodiments, the plurality of first signals for the first subarray are constant envelop signals generated based on the inphase signal component, the plurality of second signals for the second subarray are linear signals generated based on the inphase signal component, the plurality of third signals for the third subarray are constant envelop signals generated based on the quadrature signal component, and the plurality of fourth signals for the fourth subarray are linear signals generated based on the quadrature signal component.

In particular, similar to the method 1700 of linear spatial modulation, the method 2600 further comprises dynamically configuring the first subarray comprising the one or more first concentric radiating element pairs and the second subarray comprising the one or more second concentric radiating element pairs based on which candidate inphase output amplitude level of the ordered set of candidate inphase output amplitude levels configured for the inphase subarray the current inphase output amplitude level of the inphase subarray corresponds to, and the third subarray comprising the one or more third concentric radiating element pairs and the fourth subarray comprising the one or more fourth concentric radiating element pairs based on which candidate quadrature output amplitude level of the ordered set of candidate quadrature output amplitude levels configured for the quadrature subarray the current quadrature output amplitude level of the quadrature subarray corresponds to.

By way of an example only and without limitation, FIG. 26 depicts a schematic drawing of the quadrature spatial modulator 2600 having an example 4×4 antenna array, according to various example embodiments of the present invention. As shown in FIG. 26, the antenna array 2604 comprises two concentric subarrays, namely, an inphase subarray 2606a shown in gray and a quadrature subarray 2606b shown in white. In various example embodiments, the inphase and quadrature subarrays 2606a, 2606b each corresponds to a linear spatial subarray as described hereinbefore with reference to FIG. 17 according to various example embodiments, but that the input signal is a modulation signal, whereby the input signal for the inphase subarray 2606a is an inphase signal component $i(t)$ and the input signal for the quadrature subarray 2606b is a quadrature signal component $q(t)$.

The number of antenna elements in each of the inphase and quadrature subarrays 2606a, 2606b can be the same or different, but the total weighting of each subarray 2606a, 2606b is configured to be equal, in the same or similar manner as described hereinbefore for the outphasing spatial modulator 600. In various example embodiments, an alternative circuit can be added in the baseband or RF to improve the amplitude matching performance between the two quadrature modulation signals. In various example embodiments, for example, the transition sequences of the two inphase and quadrature subarrays 2606a, 2606b may use the same transition sequence as described hereinbefore for the linear spatial modulator 1700. In various example embodiments, the linear signal generator 2614 may be configured to generate m multilevel signals $i_m \cos(\omega t)$ and $q_m \cos(\omega t)$, n linear signals $i_n \cos(\omega t)$ and $q_n \cos(\omega t)$ respectively, where $I(t)=I_1+ \ldots +I_m+G_I(i_1(t)+ \ldots +i_n(t))$ and $Q(t)=Q_1+ \ldots +Q_m+G_Q(q_1(t)+ \ldots +q_n(t))$, where $G_I$ and $G_Q$ are the gains of the respective quadrature signal power amplifiers operating in linear amplification mode. Accordingly, in various example embodiments, I(t) may be determined as the amplitude of the output inphase signal component to be formed in space by the subarray 2606a and Q(t) may be determined as the amplitude of the output quadrature signal component to be formed in space by the subarray 2606b. Similarly, as described hereinbefore for the outphasing spatial modulator 600 and the linear spatial modulator 1700. The transitions start from the concentric subarray element pairs along an edge portion of the antenna array to the center of the antenna array when the output amplitude decreases, and vice versa when the output amplitude increases. Similarly, as also described hereinbefore, either uniform or nonuniform transition level may be implemented.

Figure 27:
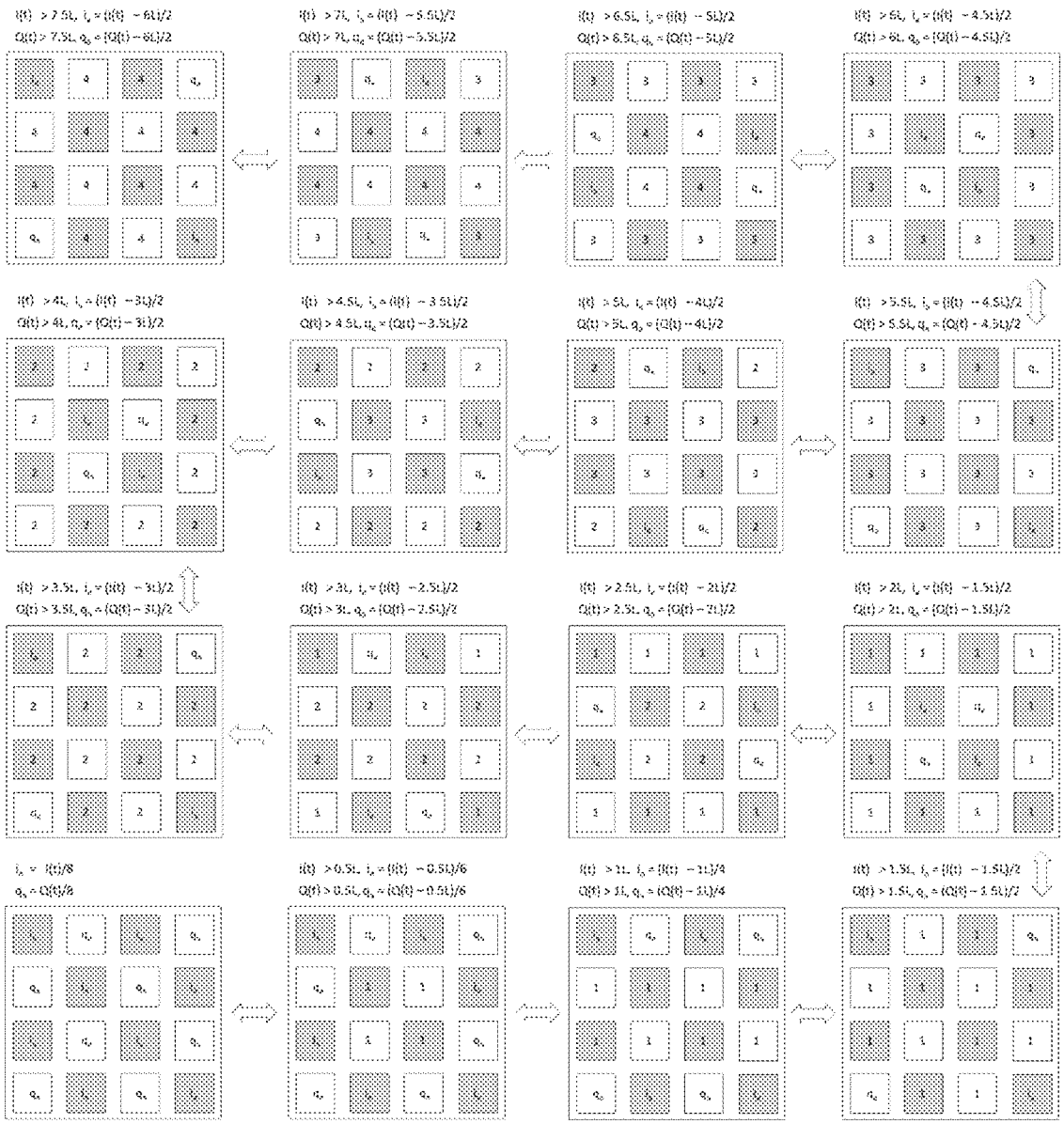
FIG. 27 depicts an example transition sequences of an example 4×4 antenna array with 4-level elements that is kept always on, according to various example embodiments of the present invention.

By way of an example only and without limitation FIG. 27 depicts an example transition sequences of an example 4×4 antenna array with 4-level elements that is kept always on. By way of further examples, besides rectangular antenna array and linear antenna array, the antenna array may have other configurations as desired or as appropriate, as long as the antenna array has a symmetrical configuration in a 2D plane (i.e., the antenna elements are symmetrically arranged in a 2D plane), such as but not limited to, the example antenna array configurations as shown in FIGS. 14A to 14H for the outphasing spatial modulator 600, which may also be employed for the quadrature spatial modulator 2600. As can be seen from FIG. 27, the first subarray comprising the one or more first concentric radiating element pairs (e.g., one or more concentric gray radiating element pairs labelled with number) and the second subarray comprising the one or more second concentric radiating element pairs (e.g., a concentric radiating gray radiating element pair labelled with $i_a$) are dynamically configured based on which candidate inphase output amplitude level of the ordered set of candidate inphase output amplitude levels configured for the inphase subarray the current inphase output amplitude level of the inphase subarray corresponds to, and the third subarray comprising the one or more third concentric radiating element pairs (e.g., one or more concentric white radiating element pairs labelled with number) and the fourth subarray comprising the one or more fourth concentric radiating element pairs (e.g., a concentric radiating gray radiating element pair labelled with $q_a$) are dynamically configured based on which candidate quadrature output amplitude level of the ordered set of candidate quadrature output amplitude levels configured for the quadrature subarray the current quadrature output amplitude level of the quadrature subarray corresponds to.

Figure 28:
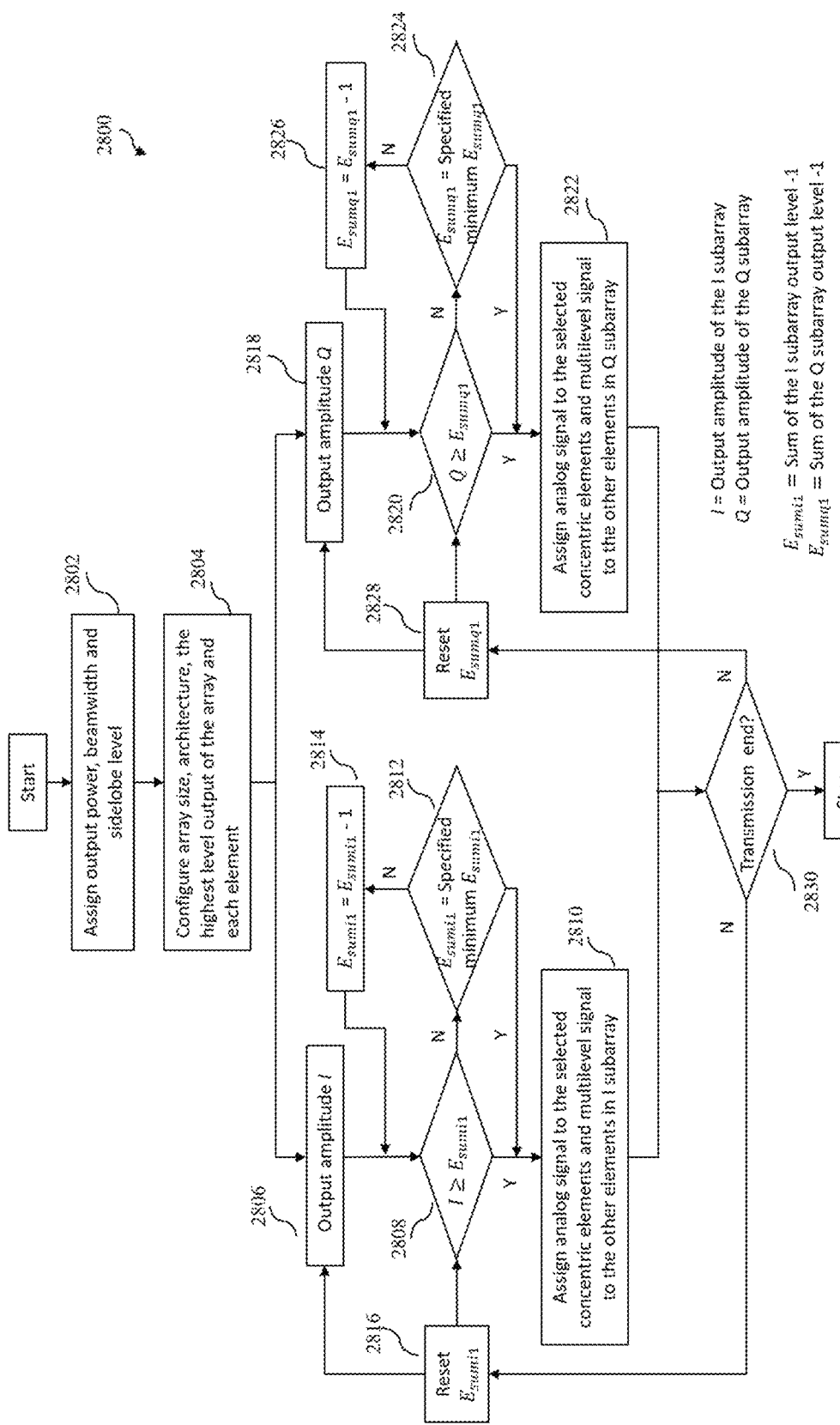
FIG. 28 depicts a flow diagram of a quadrature spatial modulation method using an antenna array, according to various example embodiments of the present invention.

FIG. 28 depicts a flow diagram of a quadrature spatial modulation method 2800 using an antenna array 2604 according to various example embodiments of the present invention. The method 2800 comprises: assigning (at 2802) output power, beamwidth and sidelobe level; and configuring (at 2804) the antenna array size, architecture, the highest output amplitude level for each of the inphase subarray 2606a and the quadrature subarray 2606b of the antenna array and of each antenna element 2606. For example, the antenna array size may be configured based on the required beamwidth. For example, the highest output amplitude level for each of the inphase subarray 2606a and the quadrature subarray 2606b may be configured based on the required output power. For example, based on the side level requirement, the output amplitude level of each antenna element may be defined according to its taper values.

For the inphase (I) subarray 2606a, at 2806, the output amplitude (I) (amplitude of the inphase output signal to be formed in space by the inphase subarray 2606a) may be determined. At 2808, it is determined whether the output amplitude (I) is determined to be greater than or equal to the current output amplitude level (e.g., corresponding to a sum of the current output amplitude levels of the inphase subarray 2606a) minus 1 ($E_{sum1}$). If so, at 2810, a plurality of output amplitude levels determined may be assigned to the plurality of antenna elements, respectively, of the first and second subarrays of inphase subarray 2606a. In addition, a plurality of first signals (constant envelop signals) may be sent to antenna elements, respectively, of the first subarray and a plurality of second signals (linear signals) may be sent to antenna elements, respectively, of the second subarray for transmission therefrom to form a combined signal in space. If not, at 2812, it is determined whether the current output amplitude level of the inphase subarray minus 1 ($E_{sum1}$) is equal to a specified or predefined minimum output amplitude level of the inphase subarray 2606a minus 1 ($E_{sum1}$). If so, the method 2800 proceeds to 2810. If not, at 2814, the current output amplitude level of the inphase subarray 2606a minus 1 ($E_{sum1}$) may be decreased to an immediately preceding output amplitude level (e.g., by 1) (or equivalently, the current output amplitude level of the inphase subarray 2606a may be decreased to an immediately preceding output amplitude level), and the method 2800 loops back to 2808. At 2830, if transmission by the inphase subarray 2606a ends, the method 2800 may thus stop. On the other hand, if transmission by the inphase subarray 2606a is to continue, at 2816, the current output amplitude level of the inphase subarray 2606a may be reset to a predefined highest output amplitude level of the inphase subarray 2606a minus 1 and the method 2800 loops back to 2806 to obtain the amplitude (I) of a new inphase output signal to be formed in space by the inphase subarray 2606a.

Similarly, for the quadrature (Q) subarray 2606b, at 2818, the output amplitude (Q) (amplitude of the quadrature output signal to be formed in space by the quadrature subarray 2606a) may be determined. At 2820, it is determined whether the output amplitude (Q) is determined to be greater than or equal to the current output amplitude level (e.g., corresponding to a sum of the current output amplitude levels of the quadrature subarray 2606b) minus 1 ($E_{sumq1}$). If so, at 2822, a plurality of output amplitude levels determined may be assigned to the plurality of antenna elements, respectively, of the third and fourth subarrays of the quadrature subarray 2606b. In addition, a plurality of third signals (constant envelop signals) may be sent to antenna elements, respectively, of the third sub array and a plurality of fourth signals (linear signals) may be sent to antenna elements, respectively, of the fourth subarray for transmission therefrom (together with the above-mentioned transmission from the first and second subarrays) to form the combined signal in space. If not, at 2824, it is determined whether the current output amplitude level of the quadrature subarray minus 1 ($E_{sumq1}$) is equal to a specified or predefined minimum output amplitude level of the quadrature subarray 2606b minus 1 ($E_{sumq1}$). If so, the method 2800 proceeds to 2822. If not, at 2826, the current output amplitude level of the quadrature subarray 2606b minus 1 ($E_{sumq1}$) may be decreased to an immediately preceding output amplitude level (e.g., by 1) (or equivalently, the current output amplitude level of the quadrature subarray 2606b may be decreased to an immediately preceding output amplitude level), and the method 2800 loops back to 2820. At 2830, if transmission by the quadrature subarray 2606b ends, the method 2800 may thus stop. On the other hand, if transmission by the quadrature 2606b is to continue, at 2828, the current output amplitude level of the quadrature subarray 2606b may be reset to a predefined highest output amplitude level of the quadrature subarray 2606b minus 1 and the method 2800 loops back to 2818 to obtain the amplitude (Q) of a new quadrature output signal to be formed in space by the quadrature subarray 2606b.

As described hereinbefore, at 2810, the first subarray comprising the one or more first concentric antenna element pairs and the second subarray comprises the one or more second concentric antenna element pairs are dynamically configured based on which candidate inphase output amplitude level of the ordered set of candidate inphase output amplitude levels configured for the inphase subarray 2606a the current inphase output amplitude level of the inphase subarray 2606a corresponds to. Similarly, at 2822, the third subarray comprising the one or more third concentric antenna element pairs and the fourth subarray comprises the one or more fourth concentric antenna element pairs are dynamically configured based on which quadrature candidate output amplitude level of the ordered set of quadrature candidate output amplitude levels configured for the quadrature subarray 2606b the current output amplitude level of the quadrature subarray 2606b corresponds to.

In various example embodiments, steps for subarray 2606a and steps for subarray 2606b shown in FIG. 28 may be performed in parallel for transmission from the first, second, third and fourth subarrays simultaneously to form the combined signal in space.

Tri-Phasing Spatial Modulator

Figure 29:
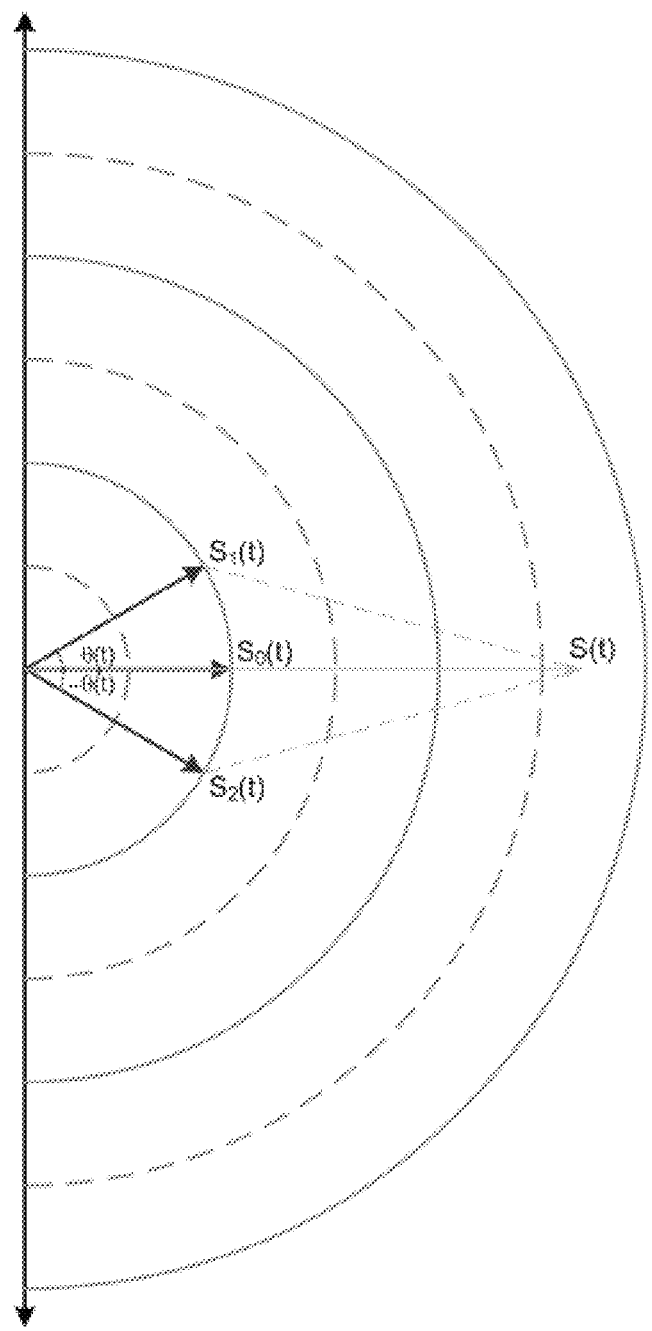
FIG. 29 depicts a phasor diagram illustrating the principle of multilevel tri-phasing modulation, according to various example embodiments of the present invention.

FIG. 29 depicts a phasor diagram illustrating the principle of multilevel tri-phasing modulation, according to various example embodiments of the present invention. As shown in FIG. 29, the linear signal S(t) is a combination of three constant envelop signals $S_0(t)$, $S_1(t)$ and $S_2(t)$ that can be amplified by high efficiency nonlinear amplifier. In particular, a constant envelop inphasing signal $S_0(t)$ is added compared with the outphasing spatial modulator 600 as described hereinbefore according to various example embodiments. Through this, the effect due to the mismatch between the two outphasing signals is reduced. The relationship of these signals may be described as below:

$$S(t) = |S(t)| \angle \varphi(t) =$$ (Equation 14)

$$|S_0(t)| \angle \varphi(t) + |S_1(t)| \angle (\varphi(t) + \theta(t)) + |S_2(t)| \angle (\varphi(t) - \theta(t))$$

$$\theta(t) = \cos^{-1}\left(\frac{S(t) - |S_0(t)|}{2|S_{1,2}(t)|}\right)$$ (Equation 15)

Figure 30:
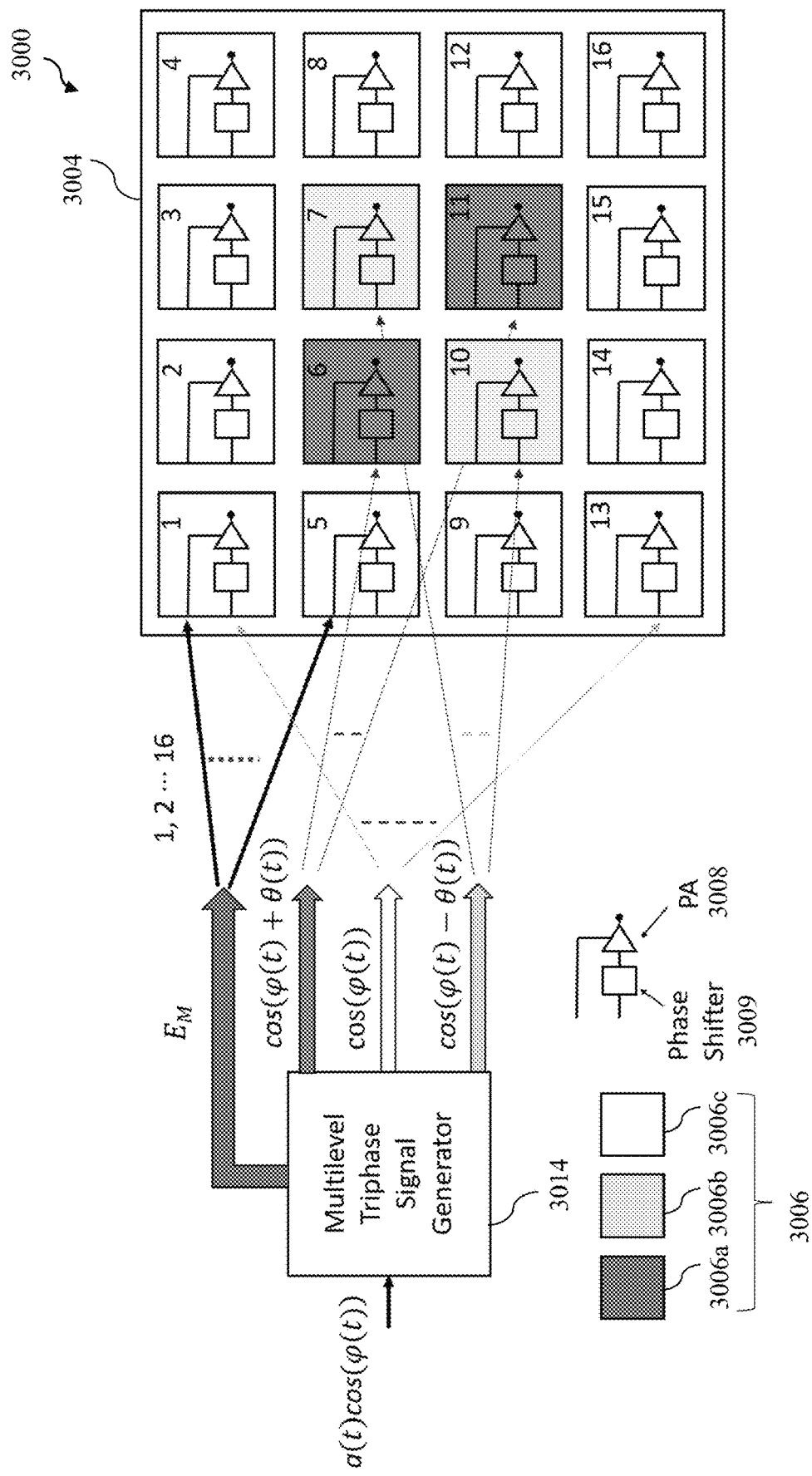
FIG. 30 depicts a schematic drawing of a tri-phasing spatial modulating system, according to various example embodiments of the present invention.

FIG. 30 depicts a schematic drawing of a tri-phasing spatial modulating system 3000 (which may also be referred to as a tri-phasing spatial modulator) according to various example embodiments of the present invention. The tri-phasing spatial modulation system 3000 comprises: an antenna array 3004 comprising a plurality of antenna elements 3006 having a plurality of power amplifiers 3008 communicatively coupled thereto, respectively; a multilevel tri-phase signal generator 3014 (e.g., comprising a memory and at least one processor communicatively coupled to the memory and the antenna array 3004), and configured to perform a method of tri-phasing spatial modulation. In various example embodiments, the plurality of power amplifiers 3008 may be communicatively coupled to a plurality of phase shifter 3009, respectively, as shown in FIG. 30.

In various example embodiments, the multilevel outphasing signal generator 3014 is configured to: determine an amplitude of an output signal to be formed in space by the antenna array 3004 based on an input signal (e.g., a(t)cos (φ(t)); determine a plurality of output amplitude levels ($E_m$) for the plurality of antenna elements 3006, respectively, based on the amplitude of the output signal and a current output amplitude level of the antenna array 3004; generate a first signal (e.g., an outphasing signal cos(φ(t)+θ(t)) for a first subarray (e.g., 3006a) of the antenna array 3004, a second signal (e.g., an outphasing signal cos(φ(t)−θ(t)), which is complementary to the outphasing signal cos(φ(t)+ θ(t)) for a second subarray (e.g., 3006b) of the antenna array 3004 and a third signal (e.g., inphasing signal cos(φ(t)) for a third subarray (e.g., 3006c) of the antenna array 3004 based on the input signal; assign the plurality of output amplitude levels ($E_m$) determined to the plurality of power amplifiers 3008 of the plurality of antenna elements 3006, respectively; and send the first signal to antenna elements of the first subarray (e.g., 3006a) (e.g., through the corresponding phase shifter 3009 and the corresponding power amplifier 3008), send the second signal to antenna elements of the second subarray (e.g., 3006b) and send the third signal to antenna elements of the third subarray (e.g., 3006c) for transmission therefrom to form a combined signal (i.e., the above-mentioned output signal) in space.

In various example embodiments, the current output amplitude level of the antenna array 3004 corresponds to a candidate output amplitude level of an ordered set of candidate output amplitude levels configured for the antenna array 3004 (i.e., multilevel antenna array) based on an output amplitude range of the antenna array 3004. In particular, the first subarray (e.g., 3006a) comprises one or more first concentric antenna element pairs (e.g., antenna elements 6 and 11 may form a first concentric antenna element pair) and the second subarray (e.g., 3006b) comprises one or more second concentric antenna element pairs (e.g., antenna elements 7 and 10 may form a second concentric antenna element pair). Furthermore, the third subarray comprises radiating elements of the plurality of radiating elements that neither belong to the first subarray nor the second subarray. The plurality of first signals and the plurality of second signals are constant envelope signals, and more particularly, the plurality of first signals and the plurality of second signals are complementary constant envelop outphasing signals, and the third signal is a constant envelop inphasing signal.

In various example embodiments, the outphasing angle θ(t) for the above-mentioned first and second signals may be determined based on the plurality of output amplitude levels determined for the plurality of antenna elements 3006(a), 3006(b) and the current output amplitude levels of the inphasing signal and the antenna array 3004, such as but not limited to, based on the above-mentioned Equation 15. In various example embodiments, the amplitude of the output signal to be formed may be determined based on the input signal, such as based on Equations (14) to (15).

By way of an example only and without limitation, FIG. 30 depicts a schematic drawing of the example tri-phasing spatial modulator 3000 having an example 4×4 antenna array 3004, according to various example embodiments of the present invention. As shown, two concentric antenna pairs are used for the two complementary outphasing signals, and the other antenna elements are used for the inphasing signal. Although only one concentric antenna pair for each outphasing signal is shown in FIG. 30, more concentric antenna pairs can be applied as desired or as appropriate.

Figure 31:
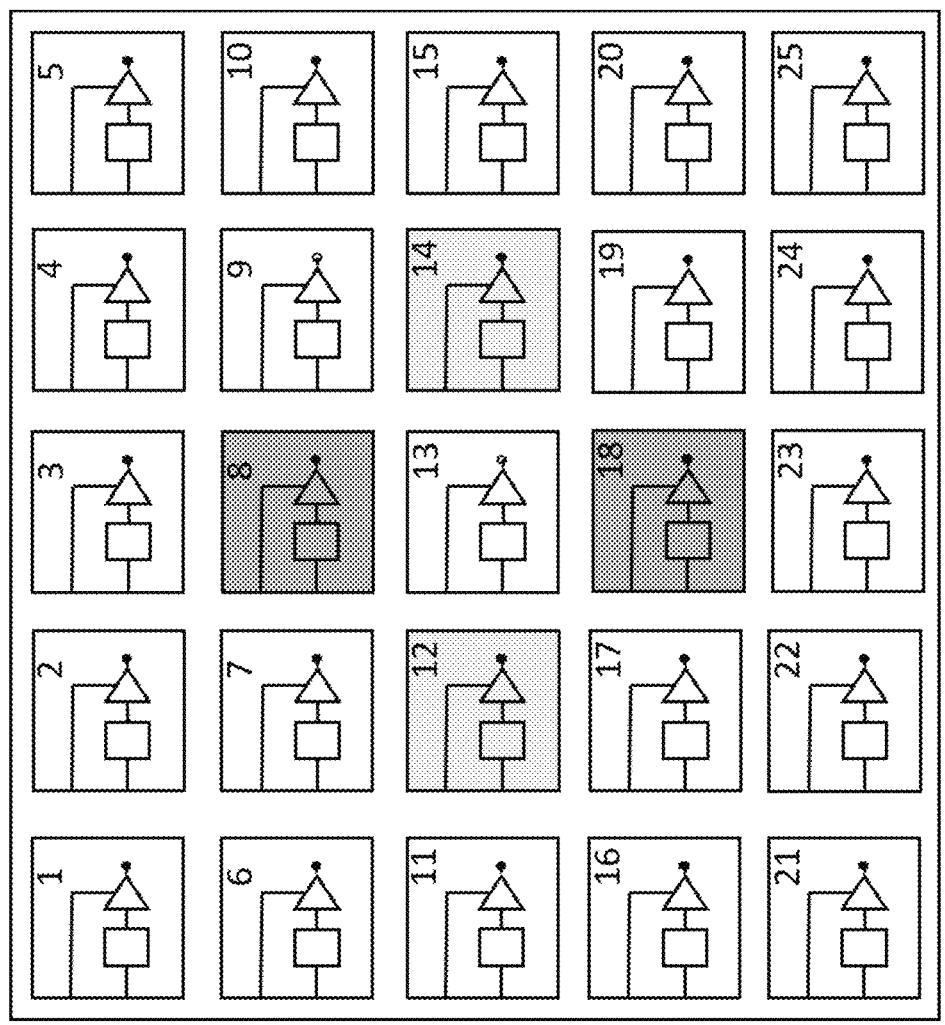
FIGS. 31 to 33 depict schematic drawings of a number of different antenna array configurations for the antenna array having odd number of rows and columns, according to various example embodiments of the present invention.
Figure 32:
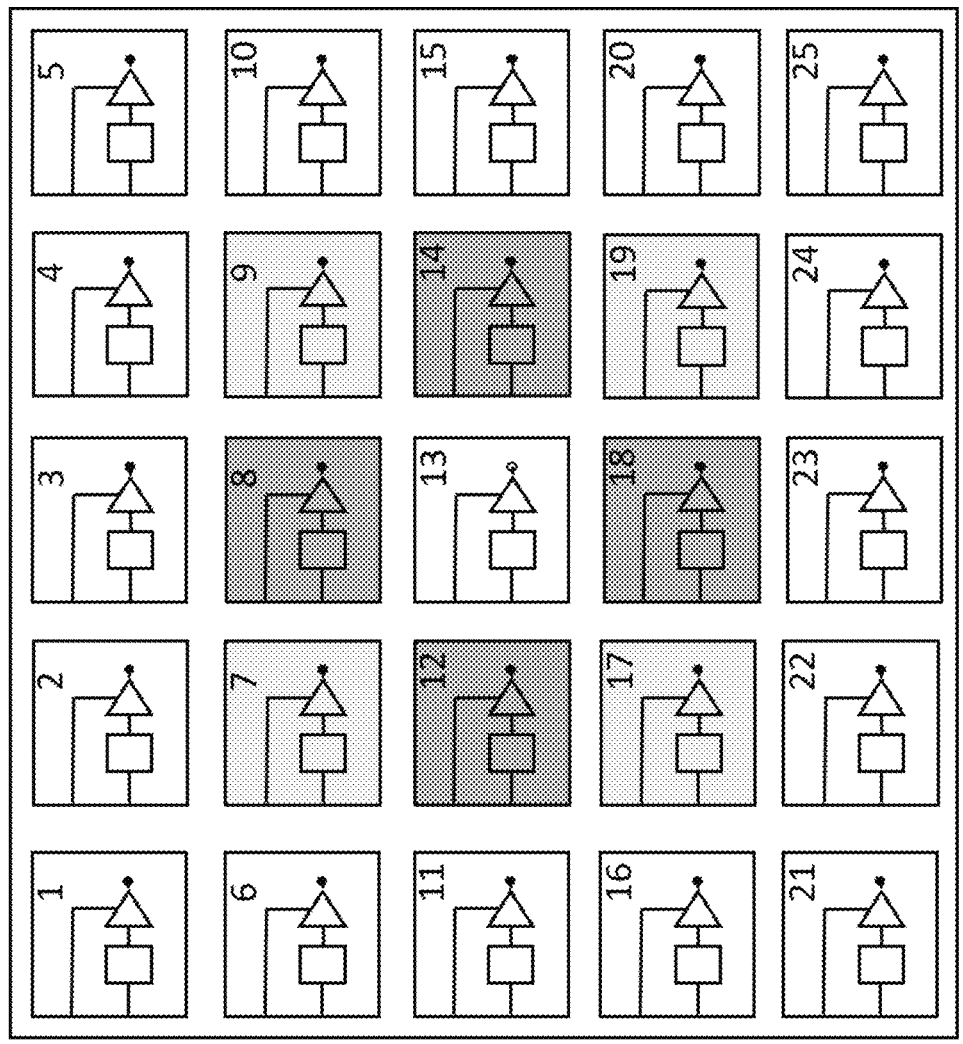
Figure 33:
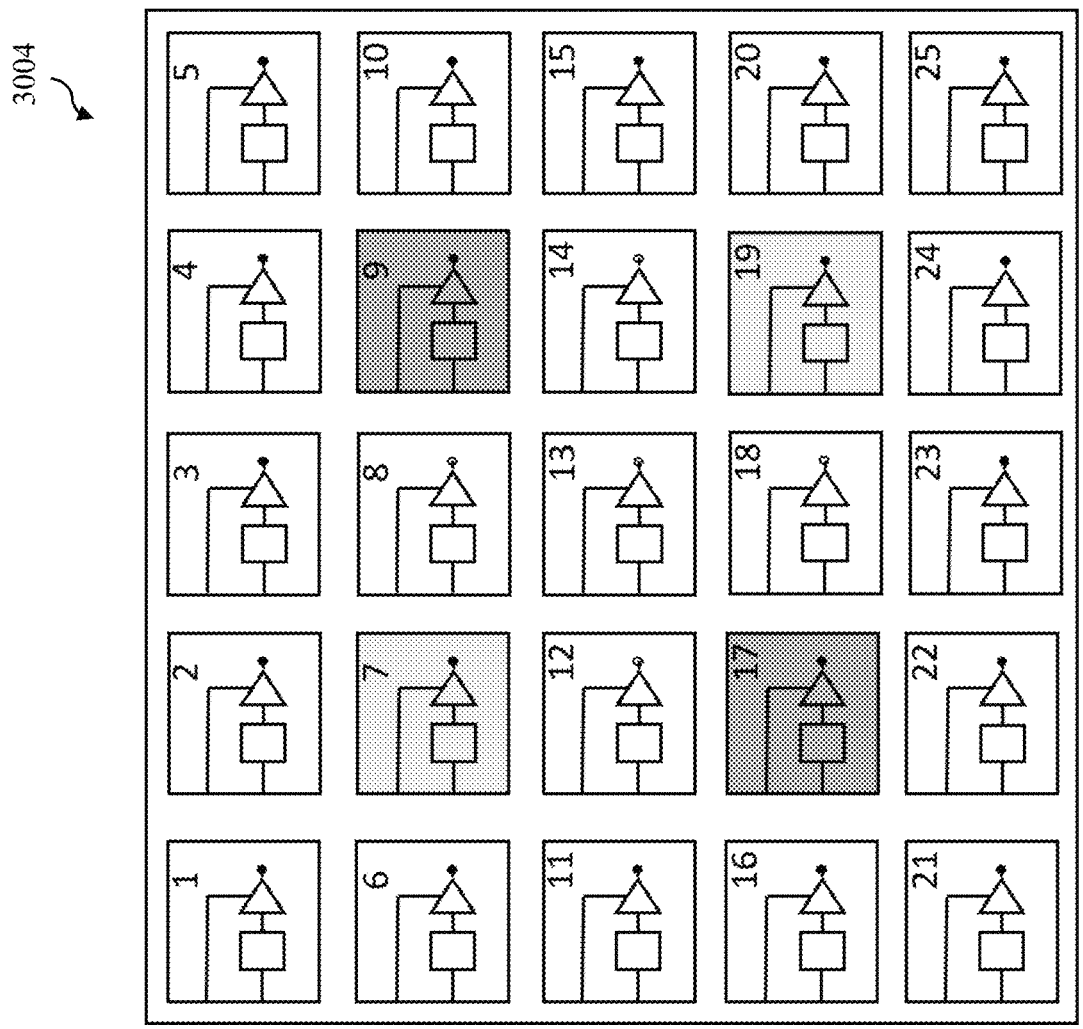

By way of examples only and without limitation, FIGS. 31 to 33 depict schematic drawings of a number of different antenna array configurations for the antenna array 3004 having odd number of rows and columns. In the example 5×5 antenna array 3004, multiple concentric antenna pairs are used for the two outphasing signals and can be expanded to the other concentric antenna pairs further. Similarly, as described hereinbefore for the outphasing spatial modulator 600, transitions start from the concentric subarray element pairs along an edge portion to the center portion of the antenna array 3004 when the output amplitude decreases, and vice versa when the output amplitude increases. Furthermore, either uniform or nonuniform transition levels may be employed.

Figure 34:
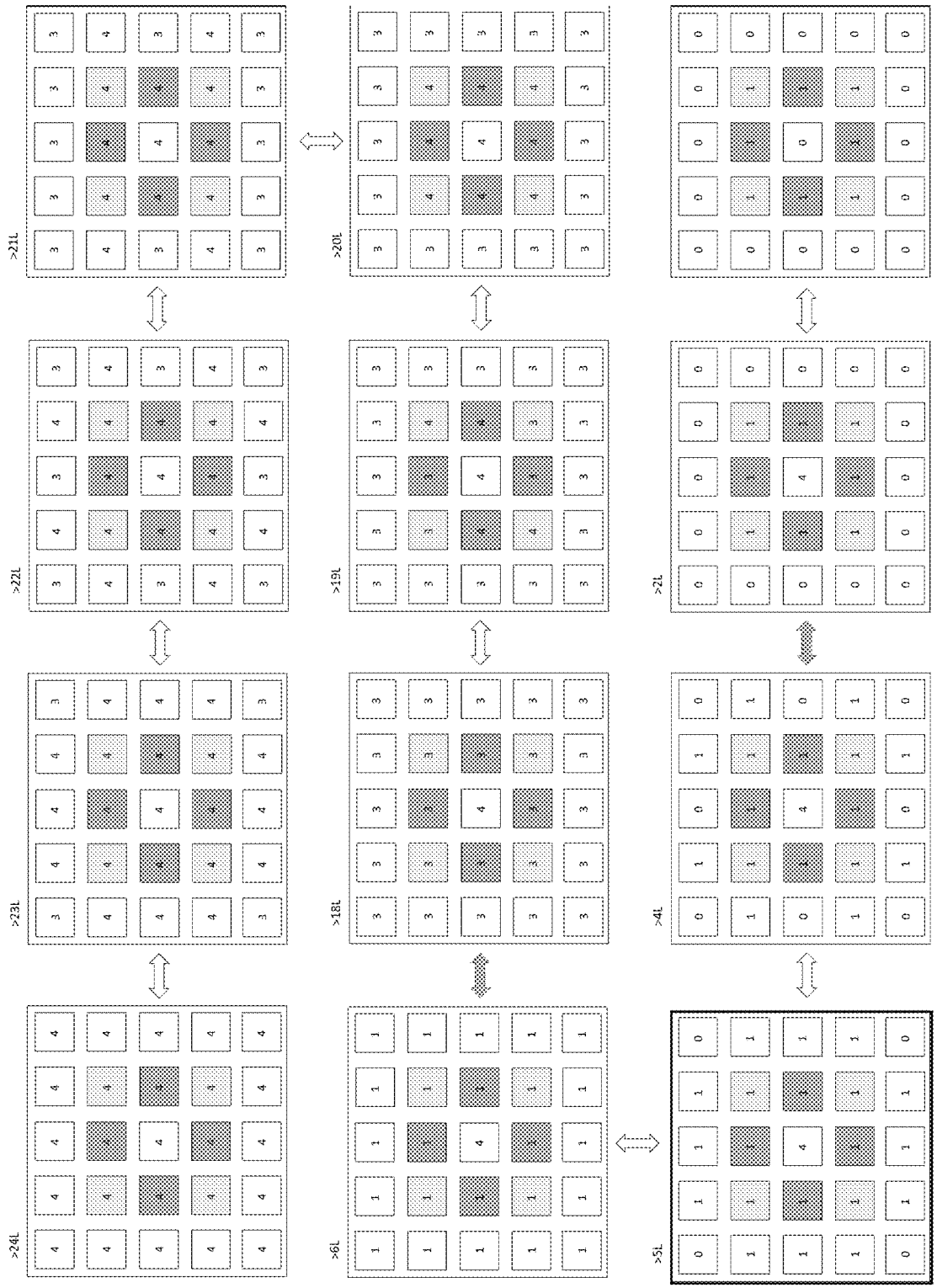
FIG. 34 depicts an example transition sequence of a 5×5 array with 4-level antenna elements, according to various example embodiments of the present invention.
Figure 35A:
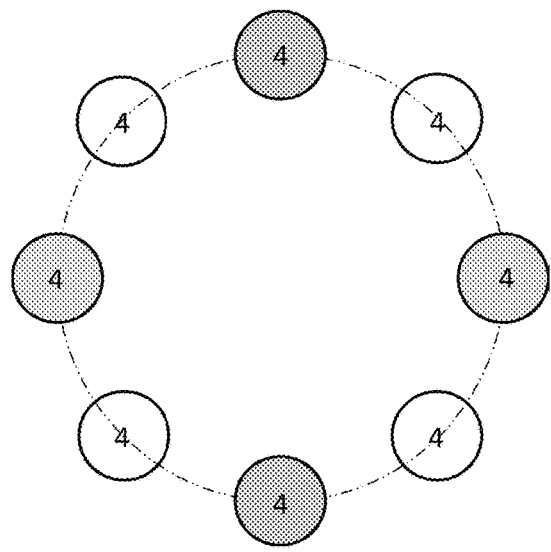
Figure 35B:
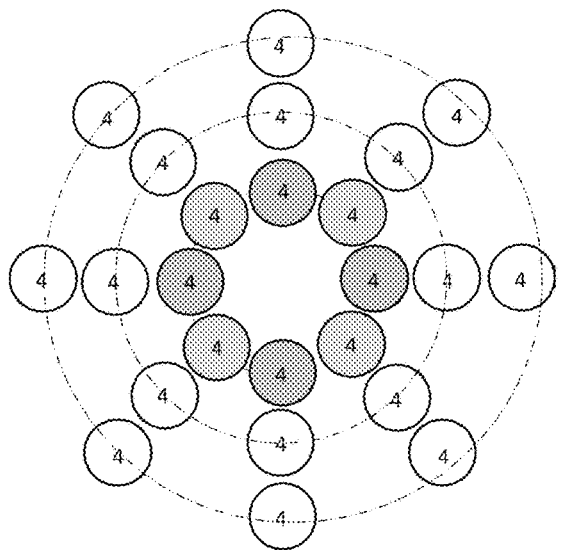
Figure 35C:
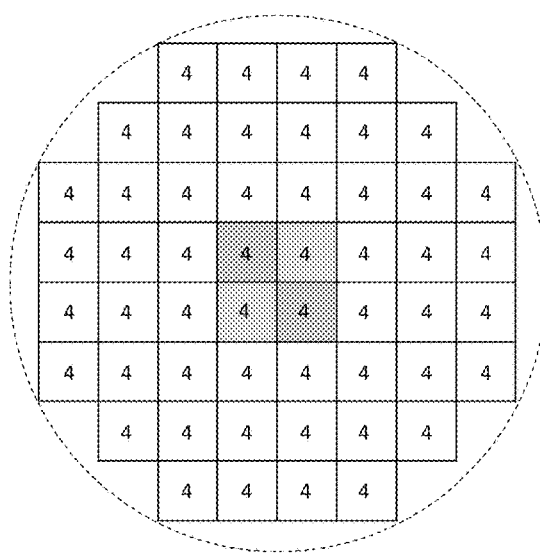
Figure 35D:
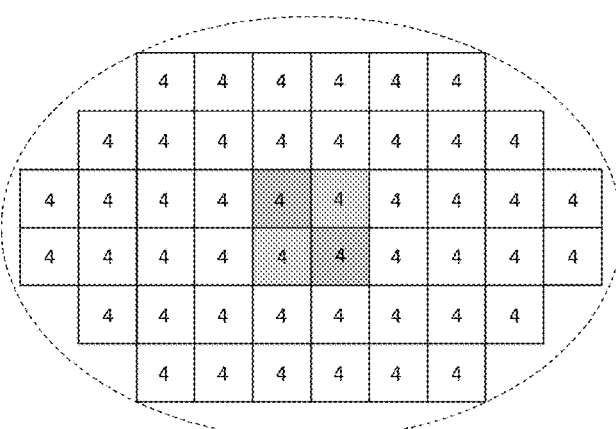

By way of an example only and without limitation, FIG. 34 shows an example transition sequence of a 5×5 array with 4-level antenna elements. By way of further examples, besides rectangular antenna array and linear antenna array, FIGS. 35A to 35H show a number of different antenna array configurations with multilevel concentric antenna element pairs, with each multilevel antenna element being an example 4-level antenna element is used to represent the multilevel element, according to various example embodiments of the present invention. In particular, FIG. 35A depicts a uniform circular antenna array, FIG. 35B depicts a concentric circular antenna array, FIG. 35C depicts a circular planar antenna array, FIG. 35D depicts an elliptical planar antenna array, FIG. 35E depicts a triangular lattice rectangular antenna array, FIG. 35F depicts a triangular lattice circular planar antenna array, FIG. 35G depicts a triangular lattice elliptical planar antenna array, and FIG. 35H depicts a uniform hexagonal antenna array.

Figure 36:
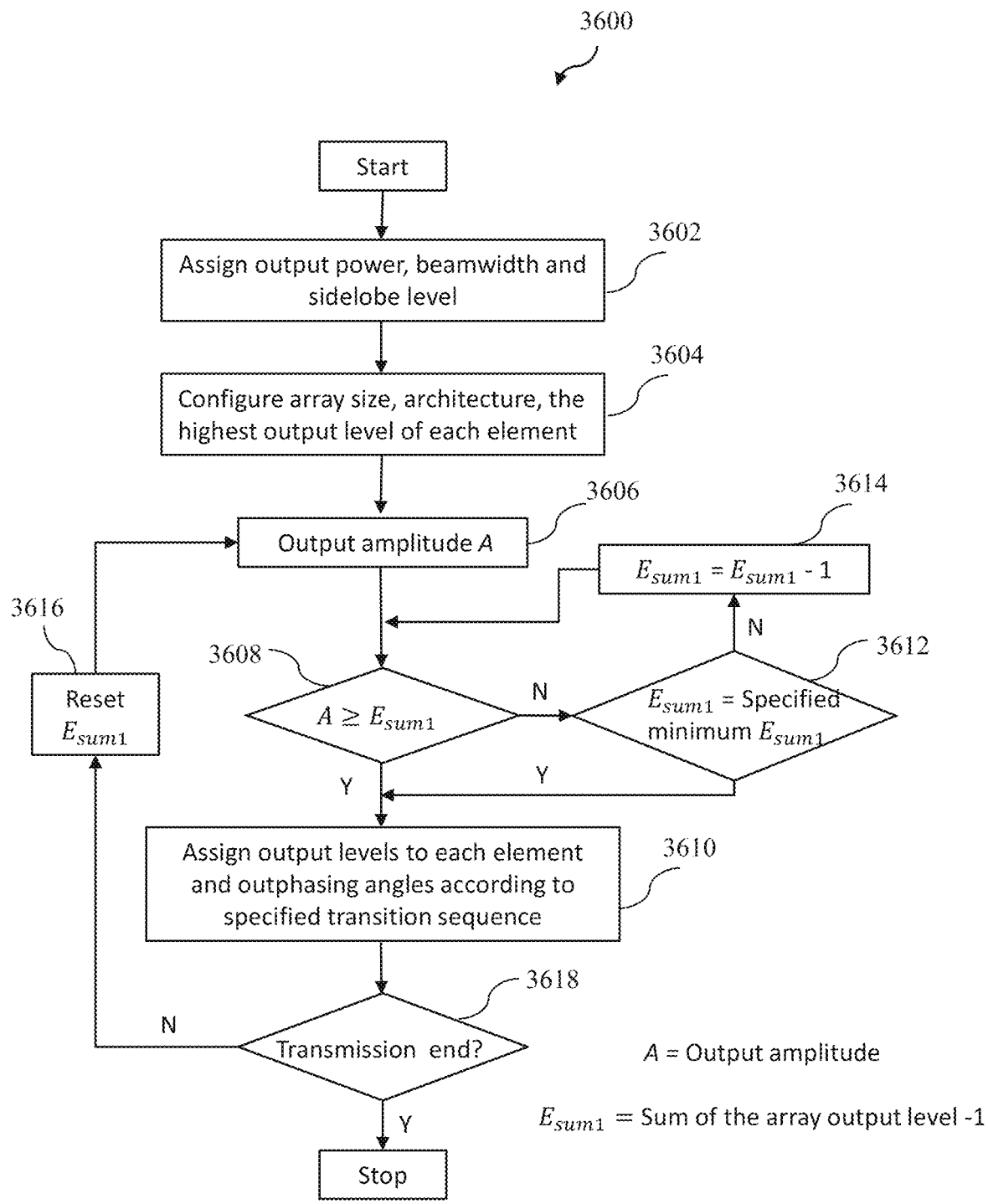
FIG. 36 depicts a flow diagram of a tri-phasing spatial modulation method using an antenna array, according to various example embodiments of the present invention.

FIG. 36 depicts a flow diagram of a tri-phasing spatial modulation method 3600 using an antenna array according to various example embodiments of the present invention. The method 3600 comprises: assigning (at 3602) output power, beamwidth and sidelobe level; and configuring (at 3604) the antenna array size, architecture, the highest output amplitude level of the antenna array and of each antenna element. For example, the antenna array size may be configured based on the required beamwidth. For example, the highest output amplitude level of the antenna array may be configured based on the required output power. For example, based on the side level requirement, the output amplitude level of each antenna element may be defined according to its taper values. At 3606, the output amplitude (A) (amplitude of the output signal to be formed in space by the antenna array based on an input signal) may be determined. At 3608, it is determined whether the output amplitude (A) is determined to be greater than or equal to the current output amplitude level (e.g., corresponding to a sum of the current output amplitude levels of the plurality of antenna elements) of the antenna array minus 1 ($E_{sum1}$). If so, at 3610, a plurality of output amplitude levels determined may be assigned to the plurality of antenna elements, respectively. In addition, a first signal may be sent to antenna elements, respectively, of the first subarray, a second signal may be sent to antenna elements, respectively, of the second subarray and a third signal may be sent to antenna elements of the third subarray for transmission therefrom to form a combined signal in space. In this regard, the first and second signals are complementary constant envelop outphasing signals and the third signal is an inphasing signal. If not, at 3612, it is determined whether the current output amplitude level of the antenna array minus 1 ($E_{sum1}$) is equal to a specified or predefined minimum output amplitude level of the antenna array minus 1 ($E_{sum1}$). If so, the method 3600 proceeds to 3610. If not, at 3614, the current output amplitude level of the antenna array minus 1 ($E_{sum1}$) may be decreased to an immediately preceding output amplitude level (e.g., by 1) (or equivalently, the current output amplitude level of the antenna array may be decreased to an immediately preceding output amplitude level), and the method 3600 loops back to 3608. At 3618, if transmission by the antenna array ends, the method 3600 may thus stop. On the other hand, if transmission by the antenna array is to continue, at 3616, the current output amplitude level of the antenna array may be reset to a predefined highest output amplitude level of the antenna array minus 1 and the method 3600 loops back to 3606 to obtain the amplitude (A) of a new output signal to be formed in space by the antenna array based on a new input signal.

Accordingly, four example types of spatial modulators and a number of transition sequences with multilevel element have been described hereinbefore according to various example embodiments of the present invention. As described hereinbefore, according to various example embodiments, all the transitions start from the concentric subarray element pairs along an edge portion to the center portion of the antenna array when the output amplitude decreases, and vice versa when the output amplitude increases. In addition, either uniform or non-uniform transition levels may be implemented. It will be appreciated by a person skilled in the art that the antenna array configuration is not limited to rectangular array or linear array. For example, a number of other example antenna array configurations with multilevel concentric antenna element pairs have been shown. In the multilevel configurations, although mainly 4 levels have been described, the actual number of levels can be from 1 to from 1 to as large as desired or as appropriate, and each level can be equal or unequal.

In various example embodiments, there is provided a outphasing spatial modulator comprising two arrays of a plurality of radiating elements in each array are symmetrically arranged whereby a radiating element of a first subarray is adjacent to radiating elements of a second subarray array; and the radiating element of the second subarray is adjacent to radiating elements of the first subarray, each radiating element connected and driven by high efficiency constant envelop power amplifier with a sequence of multilevel outphasing signals received from a multilevel outphasing signal generator to generate a linear modulation signal in free space.

In various example embodiments, the outphasing signal to each of the two subarrays may be divided into a number of levels. The output level may be modified by changing the level of the signal that is fed into the radiating elements.

In various example embodiment, the sequence of multilevel outphasing signals may be configured based on predetermined bandwidth and sidelobe levels.

In various example embodiments, other than an outphasing spatial modulator, the phase spatial modulator may also be a linear, quadrature or tri-phasing phased array spatial modulator.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of spatial modulation using an antenna array comprising a plurality of radiating elements having a plurality of power amplifiers communicatively coupled thereto, respectively, the method comprising:
- determining an amplitude of an output signal to be formed in space by the antenna array based on an input signal;
- determining a plurality of output amplitude levels for the plurality of radiating elements, respectively, based on the amplitude of the output signal and a current output amplitude level of the antenna array;
- generating one or more first signals for a first subarray of the antenna array and one or more second signals for a second subarray of the antenna array based on the input signal;
- assigning the plurality of output amplitude levels determined to the plurality of power amplifiers of the plurality of radiating elements, respectively; and
- sending the one or more first signals to radiating elements of the first subarray and sending the one or more second signals to radiating elements of the second subarray for transmission therefrom to form a combined signal in space as the output signal, wherein
- the current output amplitude level of the antenna array corresponds to a candidate output amplitude level of an ordered set of candidate output amplitude levels configured for the antenna array based on an output amplitude range of the antenna array, and
- the first subarray comprises one or more first concentric radiating element pairs and the second subarray comprises one or more second concentric radiating element pairs.

2. The method according to claim 1, wherein
the plurality of radiating elements are symmetrically arranged in a two-dimensional (2D) plane, and
the first subarray and the second subarray are each symmetrical about an origin of the 2D plane.

3. The method according to claim 1, wherein the plurality of output amplitude levels for the plurality of radiating elements are determined further based on an output amplitude level transition sequence associated with the ordered set of candidate output amplitude levels configured for the antenna array, the output amplitude level transition sequence comprising, for each candidate output amplitude level of the ordered set of candidate output amplitude levels, a plurality of output amplitude level settings for the plurality of radiating elements, respectively, associated with the candidate output amplitude level.

4. The method according to claim 3, wherein said determining the plurality of output amplitude levels for the plurality of radiating elements comprises:
- determining whether the amplitude of the output signal is greater than or equal to an output amplitude value corresponding to an immediately preceding candidate output amplitude level in the ordered set of candidate output amplitude levels with respect to the candidate output amplitude level corresponding the current output amplitude level of the antenna array, wherein
- the plurality of output amplitude levels for the plurality of radiating elements are determined according to the plurality of output amplitude level settings for the plurality of radiating elements, respectively, associated with the candidate output amplitude level corresponding to the current output amplitude level of the antenna array if the amplitude of the output signal is determined to be greater than or equal to the output amplitude value corresponding to the immediately preceding candidate output amplitude level, and
- the current output amplitude level of the antenna array is decreased according to the immediately preceding candidate output amplitude level in the ordered set of candidate output amplitude levels if the amplitude of the output signal is determined to be less than the output amplitude value corresponding to the immediately preceding candidate output amplitude level.

5. The method according to claim 3, wherein according to the output amplitude level transition sequence associated with the ordered set of candidate output amplitude levels configured for the antenna array,
- for a transition from a highest candidate output amplitude level to an immediately preceding candidate output amplitude level, output amplitude level settings for radiating elements of an outermost first concentric radiating element pair of the one or more first concentric radiating element pairs and for radiating elements of an outermost second concentric radiating element pair of the one or more second concentric radiating element pairs are each decreased according to an immediately preceding output amplitude level, and
- for a transition from a lowest candidate output amplitude level to an immediately subsequent candidate output amplitude level, output amplitude level settings for radiating elements of an innermost first concentric radiating element pair of the one or more first concentric radiating element pairs and for radiating elements of an innermost second concentric radiating element pair of the one or more second concentric radiating element pairs are each increased to an immediately subsequent output amplitude level.

6. The method according to claim 3, wherein
each radiating element of the first subarray and the second subarray has an ordered set of candidate output amplitude levels configured for the radiating element based on an output amplitude range of the radiating element, wherein the output amplitude level of the radiating element determined corresponds to a candidate output amplitude level of the ordered set of candidate output amplitude levels configured for the radiating element and the radiating element has an output weighting corresponding to the output amplitude level of the radiating element, and
a total output weighting of the first subarray and a total output weighting of the second subarray are the same after said assigning the plurality of output amplitude levels determined to the plurality of power amplifiers of the plurality of radiating elements, respectively.

7. The method according to claim 3, wherein
the radiating elements of the first subarray and the radiating elements of the second subarray are alternately arranged in at least one direction along the 2D plane, and
the one or more first signals is a first constant envelop outphasing signal and the one or more second signals is a second constant envelop outphasing signal, wherein the first and second constant envelop outphasing signals are complementary constant envelop outphasing signals.

8. The method according to claim 7, further comprising:
generating a third signal for a third subarray of the antenna array based on the input signal; and
sending the third signal to radiating elements of the third subarray, wherein
the third subarray comprises radiating elements of the plurality of radiating elements that neither belong to the first subarray nor the second subarray, and
the third signal is a constant envelop in-phasing signal.

9. The method according to claim 3, further comprising:
dynamically configuring the first subarray comprising the one or more first concentric radiating element pairs and the second subarray comprises the one or more second concentric radiating element pairs based on which candidate output amplitude level of the ordered set of candidate output amplitude levels configured for the antenna array the current output amplitude level of the antenna array corresponds to, wherein the one or more first signals are a plurality of constant envelop signals, wherein said sending the one or more first signals comprises sending the plurality of constant envelop signals to the radiating elements, respectively, of the first subarray, and the one or more second signals are a plurality of linear signals, wherein said sending the one or more second signals comprises sending the plurality of linear signals to the radiating elements, respectively, of the second subarray.

10. The method according to claim 3, further comprising:
generating a plurality of third signals for a third subarray of the antenna array and a plurality of fourth signals for a fourth subarray of the antenna array based on the input signal; and sending the plurality of third signals to radiating elements, respectively, of the third subarray and sending the plurality of fourth signals to radiating elements, respectively, of the fourth subarray for transmission therefrom to form the combined signal in space, wherein the third subarray comprises one or more third concentric radiating element pairs and the fourth subarray comprises one or more fourth concentric radiating element pairs, the input signal is a quadrature amplitude modulation signal comprising a quadrature signal component and an inphase signal component, the one or more first signals for the first subarray are a plurality of constant envelop signals generated based on the inphase signal component, the one or more second signals for the second subarray are a plurality of linear signals generated based on the inphase signal component, the plurality of third signals for the third subarray are a plurality of constant envelop signals generated based on the quadrature signal component, the plurality of fourth signals for the fourth subarray are a plurality of linear signals generated based on the quadrature signal component, the current output amplitude level of the antenna array comprises a current inphase output amplitude level of an inphase subarray comprising the first and second subarrays corresponding to a candidate inphase output amplitude level of an ordered set of candidate inphase output amplitude levels configured for the inphase subarray based on an output amplitude range of the inphase subarray, and a current quadrature output amplitude level of an quadrature subarray comprising the third and fourth subarrays corresponding to a candidate quadrature output amplitude level of an ordered set of candidate quadrature output amplitude levels configured for the quadrature subarray based on an output amplitude range of the quadrature subarray, and the method further comprises dynamically configuring the first subarray comprising the one or more first concentric radiating element pairs and the second subarray comprising the one or more second concentric radiating element pairs based on which candidate inphase output amplitude level of the ordered set of candidate inphase output amplitude levels configured for the inphase subarray the current inphase output amplitude level of the inphase subarray corresponds to, and dynamically configuring the third subarray comprising the one or more third concentric radiating element pairs and the fourth subarray comprising the one or more fourth concentric radiating element pairs based on which candidate quadrature output amplitude level of the ordered set of candidate quadrature output amplitude levels configured for the quadrature subarray the current quadrature output amplitude level of the quadrature subarray corresponds to.

11. A spatial modulation system comprising:
an antenna array comprising a plurality of radiating elements having a plurality of power amplifiers communicatively coupled thereto, respectively;

a memory; and at least one processor communicatively coupled to the memory and the antenna array, and configured to:

determine an amplitude of an output signal to be formed in space by the antenna array based on an input signal;

determine a plurality of output amplitude levels for the plurality of radiating elements, respectively, based on the amplitude of the output signal and a current output amplitude level of the antenna array;

generate one or more first signals for a first subarray of the antenna array and one or more second signals for a second subarray of the antenna array based on the input signal;

assign the plurality of output amplitude levels determined to the plurality of power amplifiers of the plurality of radiating elements, respectively; and send the one or more first signals to radiating elements of the first sub array and sending the one or more second signals to radiating elements of the second subarray for transmission therefrom to form a combined signal in space as the output signal, wherein the current output amplitude level of the antenna array corresponds to a candidate output amplitude level of an ordered set of candidate output amplitude levels configured for the antenna array based on an output amplitude range of the antenna array, and the first subarray comprises one or more first concentric radiating element pairs and the second subarray comprises one or more second concentric radiating element pairs.

12. The spatial modulation system according to claim 11, wherein the plurality of radiating elements are symmetrically arranged in a two-dimensional (2D) plane, and the first subarray and the second subarray are each symmetrical about an origin of the 2D plane.

13. The spatial modulation system according to claim 11, wherein the plurality of output amplitude levels for the plurality of radiating elements are determined further based on an output amplitude level transition sequence associated with the ordered set of candidate output amplitude levels configured for the antenna array, the output amplitude level transition sequence comprising, for each candidate output amplitude level of the ordered set of candidate output amplitude levels, a plurality of output amplitude level settings for the plurality of radiating elements, respectively, associated with the candidate output amplitude level.

14. The spatial modulation system according to claim 13, wherein said determine the plurality of output amplitude levels for the plurality of radiating elements comprises:

determining whether the amplitude of the output signal is greater than or equal to an output amplitude value corresponding to an immediately preceding candidate output amplitude level in the ordered set of candidate output amplitude levels with respect to the candidate output amplitude level corresponding the current output amplitude level of the antenna array, wherein the plurality of output amplitude levels for the plurality of radiating elements are determined according to the plurality of output amplitude level settings for the plurality of radiating elements, respectively, associated with the candidate output amplitude level corresponding to the current output amplitude level of the antenna array if the amplitude of the output signal is determined to be greater than or equal to the output amplitude value corresponding to the immediately preceding candidate output amplitude level, and the current output amplitude level of the antenna array is decreased according to the immediately preceding candidate output amplitude level in the ordered set of candidate output amplitude levels if the amplitude of the output signal is determined to be less than the output amplitude value corresponding to the immediately preceding candidate output amplitude level.

15. The spatial modulation system according to claim 13, wherein according to the output amplitude level transition sequence associated with the ordered set of candidate output amplitude levels configured for the antenna array, for a transition from a highest candidate output amplitude level to an immediately preceding candidate output amplitude level, output amplitude level settings for radiating elements of an outermost first concentric radiating element pair of the one or more first concentric radiating element pairs and for radiating elements of an outermost second concentric radiating element pair of the one or more second concentric radiating element pairs are each decreased according to an immediately preceding output amplitude level, and for a transition from a lowest candidate output amplitude level to an immediately subsequent candidate output amplitude level, output amplitude level settings for radiating elements of an innermost first concentric radiating element pair of the one or more first concentric radiating element pairs and for radiating elements of an innermost second concentric radiating element pair of the one or more second concentric radiating element pairs are each increased to an immediately subsequent output amplitude level.

16. The spatial modulation system according to claim 13, wherein each radiating element of the first subarray and the second subarray has an ordered set of candidate output amplitude levels configured for the radiating element based on an output amplitude range of the radiating element, wherein the output amplitude level of the radiating element determined corresponds to a candidate output amplitude level of the ordered set of candidate output amplitude levels configured for the radiating element and the radiating element has an output weighting corresponding to the output amplitude level of the radiating element, and a total output weighting of the first subarray and a total output weighting of the second subarray are the same after said assigning the plurality of output amplitude levels determined to the plurality of power amplifiers of the plurality of radiating elements, respectively.

17. The spatial modulation system according to claim 13, wherein the radiating elements of the first subarray and the radiating elements of the second subarray are alternately arranged in at least one direction along the 2D plane, and the one or more first signals is a first constant envelop outphasing signal and the one or more second signals is a second constant envelop outphasing signal, wherein the first and second constant envelop outphasing signals are complementary constant envelop outphasing signals.

18. The spatial modulation system according to claim 17, wherein the at least one processor is further configured to:

generate a third signal for a third subarray of the antenna array based on the input signal; and send the third signal to radiating elements of the third subarray, wherein the third subarray comprises radiating elements of the plurality of radiating elements that neither belong to the first subarray nor the second subarray, and the third signal is a constant envelop in-phasing signal.

19. The spatial modulation system according to claim 13, wherein the at least one processor is further configured to:

dynamically configure the first subarray comprising the one or more first concentric radiating element pairs and the second subarray comprises the one or more second concentric radiating element pairs based on which candidate output amplitude level of the ordered set of candidate output amplitude levels configured for the antenna array the current output amplitude level of the antenna array corresponds to, wherein the one or more first signals are a plurality of constant envelop signals, wherein said send the one or more first signals comprises sending the plurality of constant envelop signals to the radiating elements, respectively, of the first subarray, and the one or more second signals are a plurality of linear signals, wherein said send the one or more second signals comprises sending the plurality of linear signals to the radiating elements, respectively, of the second subarray.

20. The spatial modulation system according to claim 13, wherein the at least one processor is further configured to:

generate a plurality of third signals for a third subarray of the antenna array and a plurality of fourth signals for a fourth subarray of the antenna array based on the input signal; and send the plurality of third signals to radiating elements, respectively, of the third subarray and sending the plurality of fourth signals to radiating elements, respectively, of the fourth subarray for transmission therefrom to form the combined signal in space, wherein the third subarray comprises one or more third concentric radiating element pairs and the fourth subarray comprises one or more fourth concentric radiating element pairs the input signal is a quadrature amplitude modulation signal comprising a quadrature signal component and an inphase signal component, the one or more first signals for the first subarray are a plurality of constant envelop signals generated based on the inphase signal component, the one or more second signals for the second subarray are a plurality of linear signals generated based on the inphase signal component, the plurality of third signals for the third subarray are a plurality of constant envelop signals generated based on the quadrature signal component, the plurality of fourth signals for the fourth subarray are a plurality of linear signals generated based on the quadrature signal component, the current output amplitude level of the antenna array comprises a current inphase output amplitude level of an inphase subarray comprising the first and second subarrays corresponding to a candidate inphase output amplitude level of an ordered set of candidate inphase output amplitude levels configured for the inphase subarray based on an output amplitude range of the inphase subarray, and a current quadrature output amplitude level of an quadrature subarray comprising the third and fourth subarrays corresponding to a candidate quadrature output amplitude level of an ordered set of candidate quadrature output amplitude levels configured for the quadrature subarray based on an output amplitude range of the quadrature subarray, and the at least one processor is further configured to dynamically configure the first subarray comprising the one or more first concentric radiating element pairs and the second subarray comprising the one or more second concentric radiating element pairs based on which candidate inphase output amplitude level of the ordered set of candidate inphase output amplitude levels configured for the inphase subarray the current inphase output amplitude level of the inphase subarray corresponds to, and dynamically configure the third subarray comprising the one or more third concentric radiating element pairs and the fourth subarray comprising the one or more fourth concentric radiating element pairs based on which candidate quadrature output amplitude level of the ordered set of candidate quadrature output amplitude levels configured for the quadrature subarray the current quadrature output amplitude level of the quadrature subarray corresponds to.

\* \* \* \* \*